US012637377B2

(12) United States Patent
Moon et al.

(10) Patent No.: US 12,637,377 B2
(45) Date of Patent: *May 26, 2026

(54) WATER PURIFIER HAVING COMPOSITE FILTER

(71) Applicant: COWAY CO., LTD., Gongju-si (KR)

(72) Inventors: Tae Hun Moon, Gongju-si (KR); Chan Jung Park, Gongju-si (KR); Jung Hun Lee, Gongju-si (KR); Doo Won Han, Gongju-si (KR); Sung Han Yun, Gongju-si (KR); Woo Jin Kang, Gongju-si (KR); Ju Hyuk Eom, Gongju-si (KR); Keun Hwan Kim, Gongju-si (KR)

(73) Assignee: COWAY CO., LTD., Gongju-si (KR)

( * ) Notice: Subject to any disclaimer, the term of this patent is extended or adjusted under 35 U.S.C. 154(b) by 323 days.

This patent is subject to a terminal disclaimer.

(21) Appl. No.: 18/571,514

(22) PCT Filed: Jun. 17, 2022

(86) PCT No.: PCT/KR2022/008583
§ 371 (c)(1),
(2) Date: Dec. 18, 2023

(87) PCT Pub. No.: WO2022/265443
PCT Pub. Date: Dec. 22, 2022

(65) Prior Publication Data
US 2024/0286943 A1 Aug. 29, 2024

(30) Foreign Application Priority Data

| | | |
|---|---|---|
| Jun. 18, 2021 | (KR) | 10-2021-0079238 |
| Aug. 20, 2021 | (KR) | 10-2021-0109979 |
| Oct. 6, 2021 | (KR) | 10-2021-0132416 |

(51) Int. Cl.
*C02F 9/00* (2023.01)
*B01D 29/13* (2006.01)
(Continued)

(52) U.S. Cl.
CPC .............. *C02F 9/00* (2013.01); *B01D 29/13* (2013.01); *B01D 29/58* (2013.01); *B01D 61/147* (2013.01);
(Continued)

(58) Field of Classification Search
CPC .. C02F 9/00; C02F 1/001; C02F 1/441; C02F 1/444; C02F 1/4691; C02F 1/4695;
(Continued)

(56) References Cited

FOREIGN PATENT DOCUMENTS

| | | |
|---|---|---|
| CN | 207498155 U | 6/2018 |
| CN | 209307056 U | 8/2019 |

(Continued)

OTHER PUBLICATIONS

Japanese Notice of Allowance issued Dec. 10, 2024, in corresponding Japanese Patent Application No. 2023-577816, 3 pages.
(Continued)

*Primary Examiner* — Waqaas Ali
(74) *Attorney, Agent, or Firm* — Oblon, McClelland, Maier & Neustadt, L.L.P.

(57) ABSTRACT

The present invention relates to a water purifier provided with a composite filter, and more particularly, to a water purifier provided with a composite filter, which enables the implementation of an additional function using an external treatment member in a process in which raw water passes through a composite filter as the water purifier cannot only receive raw water, discharge second purified water, receive externally treated water, discharge third purified water, but also discharge residential water.

20 Claims, 27 Drawing Sheets

1300 : 1310, 1320, 1330, 1340, 1350

(51) Int. Cl.

| | | |
|---|---|---|
| *B01D 29/58* | (2006.01) |
| *B01D 61/14* | (2006.01) |
| *B01D 61/58* | (2006.01) |
| *B01D 63/02* | (2006.01) |
| *B01D 63/10* | (2006.01) |
| *B03C 5/02* | (2006.01) |
| *B01D 61/02* | (2006.01) |
| *C02F 1/00* | (2023.01) |
| *C02F 1/44* | (2023.01) |
| *C02F 1/469* | (2023.01) |
| *C02F 101/20* | (2006.01) |

(52) U.S. Cl.
CPC ............. *B01D 61/58* (2013.01); *B01D 63/02* (2013.01); *B01D 63/10* (2013.01); *B03C 5/02* (2013.01); *B01D 61/025* (2013.01); *B01D 2201/0415* (2013.01); *B01D 2201/302* (2013.01); *C02F 1/001* (2013.01); *C02F 2001/007* (2013.01); *C02F 1/441* (2013.01); *C02F 1/444* (2013.01); *C02F 1/4691* (2013.01); *C02F 1/4695* (2013.01); *C02F 2101/20* (2013.01); *C02F 2201/007* (2013.01)

(58) Field of Classification Search
CPC ............. C02F 2001/007; C02F 2101/20; C02F 2201/007; C02F 1/283; C02F 1/32; C02F 1/469; C02F 2201/003; C02F 2201/004; C02F 2201/006; C02F 2301/026; C02F 9/20; B01D 29/13; B01D 29/58; B01D 61/58; B01D 63/02; B01D 63/10; B01D 61/025; B01D 61/147; B01D 2201/0415; B01D 2201/302; B01D 61/02; B01D 69/08; B03C 5/02
See application file for complete search history.

(56) References Cited

FOREIGN PATENT DOCUMENTS

| | | | | |
|---|---|---|---|---|
| CN | 111137995 | A | 5/2020 |
| CN | 111186921 | A | 5/2020 |
| CN | 111217464 | A | 6/2020 |
| CN | 212151806 | U | 12/2020 |
| JP | 4-247286 | A | 9/1992 |
| KR | 2003-0096867 | A | 12/2003 |
| KR | 10-2004-0042180 | A | 5/2004 |
| KR | 10-0888647 | B1 | 3/2009 |
| KR | 10-2010-0127132 | A | 12/2010 |
| KR | 10-2019-0060390 | A | 6/2019 |
| KR | 10-2019-0109834 | A | 9/2019 |
| KR | 10-2021-0039233 | A | 4/2021 |
| KR | 10-2021-0040502 | A | 4/2021 |
| KR | 10-2021-0046980 | A | 4/2021 |
| KR | 20210046980 | A | * 4/2021 ............. B01D 35/30 |

OTHER PUBLICATIONS

Partial Supplementary European Search Report issued May 9, 2025, in corresponding European Patent Application No. 22825366.2, 12 pages.
International Search Report issued Sep. 30, 2022 in PCT/KR2022/008583, filed on Jun. 17, 2022, 2 pages.
Office Action dated Jan. 20, 2026, in corresponding CN Application 202280042954 (with English translation).

* cited by examiner

1300 : 1310, 1320, 1330, 1340, 1350

3300 (3310, 3320, 3330, 3340, 3350)

WATER PURIFIER HAVING COMPOSITE FILTER

CROSS-REFERENCE TO RELATED APPLICATIONS

The present application is a 35 U.S.C. § 371 National Stage Application of International Patent Application PCT/KR2022/008583, filed Jun. 17, 2022, which is based on and claims the benefit of priority to Korean Patent Application No. 10-2021-0079238, filed on Jun. 18, 2021; Korean Patent Application No. 10-2021-0109979, filed on Aug. 20, 2021; and Korean Patent Application No. 10-2021-0132416, filed on Oct. 6, 2021. The entire contents of these applications are incorporated herein by reference.

BACKGROUND

1. Field of the Invention

The present invention relates to a water purifier provided with a composite filter, and more particularly, to a water purifier provided with a composite filter, which enables the implementation of an additional function using an external treatment member in a process in which raw water passes through a composite filter as it may not only receive the raw water, discharge second purified water, receive externally treated water, discharge third purified water, but also discharge residential water.

2. Discussion of Related Art

In general, a water purifier is a device for filtering received raw water to generate drinkable purified water for a user and providing the filtered purified water to the user. Since the water purifier uses a combination of multiple filters to filter the raw water, there is a problem in that when each filter is used in combination, a layout inside the water purifier becomes complicated and a volume of the filter inside the water purifier is increased, thereby increasing the overall volume of the water purifier. Therefore, in order to solve this problem, a composite filter in which filters are integrated is used in some cases.

The water purifier disclosed in Korean Patent Application Laid-Open No. 2021-0040502 by Coway Co., Ltd. includes a composite filter for filtering raw water. The composite filter includes a first filter material and a second filter material, and each of the filter materials may be selected among known filter materials such as a single filter element, for example, a sediment filter, a free carbon filter, a post carbon filter, an antibacterial filter, and various functional filters. However, since the composite filter only has a flow path through which the raw water, first purified water, and second purified water flow and do not include an external treatment member for further processing the discharged first purified water externally, there is a problem in that since the implementation of an additional function using the external treatment member is limited, and a flow path through which concentrated residential water discharged through a reverse osmosis filter flows is not provided, the composite filter may not use a composite filter integrated with the reverse osmosis filter.

The conventional composite filter is disclosed in Korean Patent Application Laid-Open No. 2019-0060390 by Alkamedi Co., Ltd. A carbon filter, a nano filter, and a calcium filter are integrally formed and mounted on an upper cap of the composite filter so that received raw water is filtered by passing through the filters sequentially. However, since the composite filter is configured to enable only sequential water treatment between internal filters, there is a problem in that the implementation of an additional function using an external treatment member is limited in a process in which the raw water passes through the composite filter.

The composite filter for a water purifier disclosed in Korean Patent Application Laid-Open No. 2003-0096867 by Woongjin Coway Co., Ltd. includes a composite filter for filtering raw water. The composite filter includes a sediment filter disposed outward and includes a first filter unit in which an activated carbon fiber (ACF) filter is disposed to overlap, a second filter unit in which a flat-type ACF filter is disposed, and a third filter unit in which an activated carbon (AC) filter and an ultrafiltration (UF) filter, which are disposed inward. When the composite filter is manufactured, the composite filter is manufactured by a method of sequentially stacking the first to third filter units inside a housing and then fusing the housing and a cap. However, when the composite filter is manufactured as described above, there is a problem in that workability is degraded because much time is required in the process of stacking each filter unit. In addition, since an inlet through which raw water is received is positioned on a lower portion of the composite filter and an outlet through which purified water is discharged is positioned on an upper portion thereof, there is a problem in that each of tubes through which the raw water and the purified water flow are disposed on one of the upper and lower portions of the composite filter, thereby making the installation and replacement of the composite filter difficult and degrading space efficiency due to a complicated layout.

Chinese Utility Model No. 212151806 by GUANGDONG SHUIHUDUN HEALTH TECH CO., LTD. discloses the conventional composite filter and discloses a configuration in which the composite filter includes a pre-treatment filter and a post-treatment filter disposed to be stacked inside a reverse osmosis (RO) filter. However, since the composite filter is configured so that received raw water only sequentially passes through the filters, there is a problem in that the implementation of an additional function using an external treatment member is limited. In addition, since the pre-treatment filter and the post-treatment filter are stacked inside the RO filter, there is a problem in that an RO filter with a general structure (structure in which a membrane is wound around a central tube) may not be used.

Chinese Utility Model No. 209307056 by MIDEA GROUP CO., LTD. discloses the conventional composite filter and discloses a configuration in which the composite filter includes a powdered activated carbon (PAC) filter and a carbon filter disposed to be stacked inside an RO filter. However, there are problems in that since the composite filter is also configured so that received raw water only sequentially passes through the filters, the implementation of an additional function using an external treatment member is limited, and since the PAC filter and the carbon filter are disposed to be stacked inside the RO filter, an RO filter with a general structure (structure in which a membrane is wound around a central tube) may not be used.

RELATED ART DOCUMENTS (Patent Document 1) Korean Patent Application Laid-Open No. 2021-0040502

(Patent Document 2) Korean Patent Application Laid-Open No. 2019-0060390

(Patent Document 3) Korean Patent Application Laid-Open No. 2003-0096867

(Patent Document 4) Chinese Utility Model No. 212151806

(Patent Document 5) Chinese Utility Model No. 209307056

SUMMARY OF THE INVENTION

In order to solve the problems, a water purifier provided with a composite filter according to one aspect of the present invention is directed to enabling the implementation of an additional function using an external treatment member in a process in which raw water passes through the composite filter as the water purifier may not only receive the raw water, discharge second purified water, receive externally treated water, and discharge third purified water, but also discharge residential water, improving a user's convenience by constituting the composite filter by integrating three internal filter members including a spiral wound type filter member to facilitate the miniaturization and replacement of the water purifier, and in addition, improving productivity by constituting the composite filter by a method of modularizing each filter through a first module including a pre-treatment internal filter and the spiral wound type internal filter and a second module including a post-treatment internal filter member, improving productivity by constituting the composite filter by a method of stacking the first module and the second module, securing operational stability of the water purifier by arranging a discharge tube member to pass through a central portion of the first module so that the third purified water generated from the second module disposed under the first module is discharged to the outside to prevent the third purified water from being mixed with the second purified water, and in addition, further improving a degree of freedom in layout design of other portions by providing first to fourth partition walls in a head member of a housing unit so that independent flow paths for preventing the raw water, the second purified water, the externally treated water, the third purified water, and residential water from being mixed are formed to concentrate tubes through which the raw water, the second purified water, the externally treated water, the third purified water, and the residential water flow on an upper portion of the composite filter.

The water purifier provided with the composite filter according to one embodiment of the present invention is also directed to enhancing operation reliability through a smooth flow of second purified water while a second purified flow path is maintained stably by arranging a spiral wound type internal filter member to be spirally wound around a central tube and forming a second purified water through hole so that the second purified water flows through the second purified water flow path in the central tube, and arranging a discharge tube member inserted to pass through a central portion of the central tube to be spaced a predetermined distance from the central tube.

The water purifier provided with the composite filter according to one embodiment of the present invention is also directed to enhancing the operational stability of the water purifier by arranging a fourth partition wall to extend in an axial direction along a discharge tube member to effectively prevent discharged third purified water from being mixed with discharged second purified water.

The water purifier provided with the composite filter according to one embodiment of the present invention is also directed to enhancing the operational stability of the water purifier by arranging a third partition wall to extend in an axial direction along a central tube to effectively prevent discharged second purified water from being mixed with discharged residential water.

The water purifier provided with the composite filter according to one embodiment of the present invention is also directed to enhancing the operational stability of the water purifier by discharging discharged residential water to the outside through a residential water flow path formed between a first upward guide provided in a first upper cap member and a central tube to prevent the discharged residential water from being mixed with received raw water or discharged second purified water.

The water purifier provided with the composite filter according to one embodiment of the present invention is also directed to enhancing the operational stability of the water purifier by arranging a second partition wall to extend in an axial direction along a first upward guide to effectively prevent received raw water from being mixed with discharged residential water.

The water purifier provided with the composite filter according to one embodiment of the present invention is also directed to enhancing workability by fixing a pre-treatment internal filter member by a method of respectively arranging a first upper cap member and a first lower cap member above and under the pre-treatment internal filter member to enable the modularization of a first module through a sub assembly process.

The water purifier provided with the composite filter according to one embodiment of the present invention is also directed to improving structural stability by allowing an internal guide to support an inner surface of a pre-treatment internal filter member and enhancing the operational stability of the water purifier by allowing first purified water smoothly flows into the water purifier through a first purified water through hole formed in the internal guide.

The water purifier provided with the composite filter according to one embodiment of the present invention is also directed to enhancing the structural stability of a first module by arranging an internal guide to connect a first upper cap member to a first lower cap member.

The water purifier provided with the composite filter according to one embodiment of the present invention is also directed to enhancing the operational stability of the water purifier by stably forming a first purified water flow path through which first purified water flows between an internal guide and a spiral wound type internal filter member because the internal guide is disposed to be spaced apart from an outer surface of the spiral wound type internal filter member and allowing the first purified water flowing into the water purifier through a first purified water through hole formed in the internal guide to stably flow to a lower portion of the spiral wound type internal filter member because the first purified water flow path is formed to extend to the lower portion of the spiral wound type internal filter member.

The water purifier provided with the composite filter according to one embodiment of the present invention is also directed to enhancing user satisfaction by securing a smooth flow of received raw water by arranging a second upper cap member to be spaced apart from an upper portion of a first upper cap member to stably form a raw water flow path and preventing raw water flowing into a first module from being mixed with externally treated water received while discharged to the outside of the first module to prevent a degradation in water qualities of the externally treated water and third purified water by arranging a second downward support guide to extend to a first lower cap member.

The water purifier provided with the composite filter according to one embodiment of the present invention is also directed to enhancing product reliability by securing a raw water flow path so that received raw water flows through a periphery of a first upper cap member by providing first support protrusions formed to protrude outward in a radial direction from an outer circumferential surface of a first upper cap member to allow the first upper cap member to support an inner surface of a second upper cap member and improving a flow of the raw water by arranging the first support protrusions at an equal distance to allow the raw water to equally flow in a circumferential direction of the first upper cap member.

The water purifier provided with the composite filter according to one embodiment of the present invention is also directed to enhancing the operational stability of the water purifier by allowing received raw water to flow through a raw water flow path formed between a second upward guide provided in a second upper cap member and a first upward guide provided in a first upper cap member to prevent the received raw water from being mixed with received externally treated water or discharged residential water.

The water purifier provided with the composite filter according to one embodiment of the present invention is also directed to enhancing the operational stability of the water purifier by arranging a first partition wall to extend in an axial direction along a second upward guide to effectively prevent received raw water from being mixed with received externally treated water.

The water purifier provided with the composite filter according to one embodiment of the present invention is also directed to improving workability by enabling a sub assembly of a second module through a third upper cap member and a third lower cap member, and enhancing productivity by arranging a discharge tube member to pass through the third upper cap member while extending upward from the third lower cap member to stably form a third purified water flow path in a process in which a first module and the second module are disposed to be stacked.

The water purifier provided with the composite filter according to one embodiment of the present invention is also directed to enhancing productivity by simply coupling a first module to a second module by a method of coupling an upward rib extending upward from a connector body to a central tube in a state in which the connector body of a connector member is fixedly press-fitted into a first lower cap member and coupling a downward rib extending downward from the connector body to a third upper cap member.

The water purifier provided with the composite filter according to one embodiment of the present invention is also directed to improving productivity by forming a third upward guide to extend upward in an axial direction to facilitate the coupling between a connector member and a third upper cap member, and in particular, enhancing productivity by enabling stable coupling even when a worker couples a first module to a second module after flipping over the connector member in a process of coupling the first module to the second module using the connector member because an upward rib and a downward rib may be formed in a symmetrical shape when the third upward guide is formed to have an outer diameter that is the same as a diameter of a central tube.

The water purifier provided with the composite filter according to one embodiment of the present invention is also directed to enhancing product reliability by controlling a valve unit through a control unit to control flows of raw water, purified water, and residential water and effectively preventing these fluids from flowing back.

A water purifier provided with a composite filter according to another aspect of the present invention is directed to enabling the implementation of an additional function using an external filter in a process in which raw water passes through the composite filter as the water purifier may receive raw water, discharge first purified water, receive second purified water, and discharge third purified water, as well as discharge residential water, enhancing a user's convenience by constituting the composite filter by integrating a spiral wound type internal filter member such as a reverse osmosis filter or a hollow fiber membrane filter, enhancing a degree of freedom in layout design of other portions by providing first to fourth partition walls in a head member of a housing unit so that independent flow paths for preventing the raw water, the purified water, and the residential water from being mixed are formed to concentrate tubes through which the raw water, the purified water, and the residential water flow on an upper portion of the composite filter, enabling miniaturization by arranging a first upper cap member and a second upper cap member to be stacked and forming a first through hole in the first upper cap member so that discharged residential water flows through a residential water flow path formed between the first upper cap member and the second upper cap member in a filtering unit to reduce a height of the composite filter in an axial direction, and enhancing productivity through configuration simplification.

The water purifier provided with the composite filter according to another embodiment of the present invention is also directed to allowing discharged first purified water to flow into a first upward guide formed in a first upper cap member and discharged residential water to flow into a second upward guide formed in a second upper cap member, forming an independent flow path in which the first purified water and the residential water are not mixed by arranging a first upper cap member and the second upper cap member to be spaced a predetermined distance from each other so that a residential water flow path is formed, and enhancing productivity through configuration simplification.

The water purifier provided with the composite filter according to another embodiment of the present invention is also directed to enhancing the operational stability of the water purifier by improving the durability of the water purifier by stably fixing a spiral wound type internal filter member through a first downward guide formed to extend downward from a lower surface of a first upper cap member and allowing the residential water generated through the spiral wound type internal filter member to be discharged through a first through hole.

The water purifier provided with the composite filter according to another embodiment of the present invention is also directed to enhancing productivity through configuration simplification by arranging a third upper cap member and a fourth upper cap member to be stacked and allowing second purified water received from the outside to flow through a second purified water flow path formed between the third upper cap member and the fourth upper cap member in a state in which a post-treatment internal filter member is fixedly disposed under the third upper cap member.

The water purifier provided with the composite filter according to another embodiment of the present invention is also directed to allowing discharged third purified water to flow into a third upward guide formed in a third upper cap member and received second purified water to flow into a fourth upward guide formed in a fourth upper cap member, forming an independent flow path in which the second purified water and the third purified water are not mixed by arranging the third upper cap member and the fourth upper cap member to be spaced a predetermined distance from each other so that a second purified flow path is formed, and enhancing productivity through configuration simplification.

The water purifier provided with the composite filter according to another embodiment of the present invention is also directed to enhancing the durability of the water purifier by forming a post-treatment internal filter to be stably fixed through a third downward guide formed to extend downward from a lower surface of a third upper cap member.

The water purifier provided with the composite filter according to another embodiment of the present invention is also directed to enhancing the durability of the water purifier by forming a fourth downward guide formed to extend downward from a lower surface of a fourth upper cap member to extend downward to surround an outer circumferential surface of a third upper cap member and a post-treatment internal filter member to be stably fixed by arranging the fourth downward guide to extend to an outer circumferential surface of a second upper cap member.

The water purifier provided with the composite filter according to another embodiment of the present invention is also directed to improving the durability of the water purifier by stably fixing a post-treatment internal filter member through a lower guide formed to extend upward from an upper surface of a lower cap member, and enhancing workability by being configured to enable the modularization of the composite filter through a sub assembly process by fixing the post-treatment internal filter member may be fixed through third and fourth upper cap members and the lower cap member.

The water purifier provided with the composite filter according to another embodiment of the present invention is also directed to enhancing the operational stability of the water purifier while first purified water and residential water are stably generated in a separated state by forming a raw water flow path between a body member and a spiral wound type internal filter member and raw water may flow to a lower portion of the spiral wound type internal filter member and then pass through the spiral wound type internal filter member because the spiral wound type internal filter member is spaced apart from a lower surface of the body member so that the raw water flow path is formed to extend to the lower portion of the spiral wound type internal filter member.

The water purifier provided with the composite filter according to another embodiment of the present invention is also directed to enhancing operational stability through a smooth flow of first purified water by providing a central tube on an inner circumferential surface of a spiral wound type internal filter member so that the spiral wound type internal filter member is disposed to be spirally wound around the central tube, and at the same time, a first purified water flow path formed inside the spiral wound type internal filter member is stably maintained.

The water purifier provided with the composite filter according to another embodiment of the present invention is also directed to enhancing product reliability by securing a raw water flow path so that raw water received through an upper portion of a housing unit flows to a filtering unit by forming first support protrusions formed to protrude outward in a radial direction from an outer circumferential surface of a fourth upper cap member to support an inner surface of a body member and improving a flow of the raw water by arranging the first support protrusions at an equal distance to allow the raw water to equally flow in a circumferential direction of the fourth upper cap member.

The water purifier provided with the composite filter according to another embodiment of the present invention is also directed to enhancing product reliability by controlling a valve unit through a control unit to control flows of raw water, purified water, and residential water and effectively preventing these fluids from flowing back.

A water purifier provided with a composite filter according to still another aspect of the present invention is directed to enabling the implementation of an additional function using an external treatment member in a process in which raw water passes through the composite filter as the water purifier may not only receive the raw water, discharge first purified water, receive externally treated water, and discharge third purified water, but also discharge residential water, improving a user's convenience by constituting the composite filter by integrating a spiral wound type internal filter member, enhancing a degree of freedom in layout design of other portions by providing first to fourth partition walls in a head member of a housing unit so that independent flow paths for preventing the raw water, the first purified water, the externally treated water, the third purified water, and the residential water from being mixed are formed to concentrate tubes through which the raw water, the first purified water, the externally treated water, the third purified water, and the residential water flow on an upper portion of the composite filter, and enhancing productivity by manufacturing the composite filter using a previously manufactured spiral wound type internal filter member by arranging a pre-treatment internal filter member and a post-treatment internal filter member to be stacked through a first upper cap member and a second upper cap member in a filtering unit and arranging a spiral wound type internal filter member inside the internal filter members in a radial direction.

The water purifier provided with the composite filter according to still another embodiment of the present invention is also directed to enhancing the operational stability of the water purifier by providing a connecting tube in a second lower cap member for fixing a post-treatment internal filter member and a spiral wound type internal filter member and forming the connecting tube to extend in an axial direction inside a pre-treatment internal filter member and the post-treatment internal filter member to prevent first purified water passing through the pre-treatment internal filter member and third purified water passing through the post-treatment internal filter member from being mixed with received externally treated water.

The water purifier provided with the composite filter according to still another embodiment of the present invention is also directed to enhancing the operational stability of the water purifier as first purified water is stably discharged by arranging a third upper cap member under a first upper cap member and arranging the third upper cap member to be spaced apart from the first upper cap member so that a first purified water flow path through which the first purified water flows is formed.

The water purifier provided with the composite filter according to still another embodiment of the present invention is also directed to enhancing the structural stability of the composite filter by supporting an upper surface of a third upper cap member by a first spacer formed to extend downward from a lower surface of a first upper cap member to stably maintain a separation distance between the first upper cap member and the third upper cap member.

The water purifier provided with the composite filter according to still another embodiment of the present invention is also directed to enhancing the operational stability of the water purifier by forming a first purified water flow path to extend while a first upward guide and a third upward guide are disposed to be spaced apart from each other so that first purified water is discharged smoothly.

The water purifier provided with the composite filter according to still another embodiment of the present invention is also directed to enhancing user satisfaction through the improvement in water quality of finally discharged third purified water by arranging a first partition wall to extend in an axial direction along a first upward guide to effectively prevent discharged first purified water from being mixed with received raw water.

The water purifier provided with the composite filter according to still another embodiment of the present invention is also directed to enhancing user satisfaction through the prevention of a degradation in water quality of externally treated water and the improvement in water quality of finally discharged third purified water by arranging a second partition wall to extend in an axial direction along a third upward guide to effectively prevent discharged first purified water from being mixed with received externally treated water.

The water purifier provided with the composite filter according to still another embodiment of the present invention is also directed to enhancing user satisfaction through the prevention of a degradation in water quality of externally treated water and the improvement in water quality of finally discharged third purified water by coupling a third downward support guide formed to extend downward from a third upper cap member to a connecting tube to effectively prevent discharged first purified water from being mixed with the received externally purified water.

The water purifier provided with the composite filter according to still another embodiment of the present invention is also directed to enhancing the operational stability of the water purifier as externally treated water stably flows by arranging a fourth upper cap member under a third upper cap member and arranging the fourth upper cap member to be spaced apart from the third upper cap member so that an externally treated water flow path through which the externally treated water flows is formed.

The water purifier provided with the composite filter according to still another embodiment of the present invention is also directed to enhancing the structural stability of the composite filter by supporting an upper surface of a fourth upper cap member by a second spacer formed to extend downward from a lower surface of a third upper cap member to stably maintain a separation distance between the third upper cap member and the fourth upper cap member.

The water purifier provided with the composite filter according to still another embodiment of the present invention is also directed to enhancing the operational stability of the water purifier by arranging a fourth upward guide and a third upward guide to be spaced apart from each other to form an externally treated water flow path to smoothly discharge received externally treated water.

The water purifier provided with the composite filter according to still another embodiment of the present invention is also directed to enhancing user satisfaction through the prevention of a degradation in water quality of externally treated water and the improvement in water quality of finally discharged third purified water by arranging a third partition wall to extend in an axial direction along a fourth upward guide to effectively prevent the received externally treated water from being mixed with discharged residential water.

The water purifier provided with the composite filter according to still another embodiment of the present invention is also directed to enhancing the structural stability of the composite filter by supporting a spiral wound type internal filter member by a fourth downward support guide.

The water purifier provided with the composite filter according to still another embodiment of the present invention is also directed to improving the structural stability by allowing second purified water to flow into a central tube through a second purified water through hole in a state in which a spiral wound type internal filter member is supported to be spirally wound around the central tube, and enhancing the operational stability of the water purifier by arranging the central tube to pass through a second lower cap member to allow the second purified water to stably flow to a lower portion of a second lower cap member.

The water purifier provided with the composite filter according to still another embodiment of the present invention is also directed to enhancing operational stability of the water purifier by stably maintaining a separation state between a second lower cap member and a lower surface of a housing unit by allowing a second downward guide to support the lower surface of the housing unit and allowing the second purified water flowing to a lower portion of the second lower cap member to smoothly flow through a third through hole formed in the second downward guide.

The water purifier provided with the composite filter according to still another embodiment of the present invention is also directed to improving workability by fixing a pre-treatment internal filter member by a method of arranging a first upper cap member and a first lower cap member above and under the pre-treatment internal filter member, respectively to enable the modularization of the composite filter through a sub assembly process, and enhancing the operational stability of the water purifier by forming a third spacer supported by an upper surface of a second upper cap member to extend downward from a lower surface of the first lower cap member to allow third purified water to smoothly flow while a distance between the first lower cap member and the second upper cap member is maintained.

The water purifier provided with the composite filter according to still another embodiment of the present invention is also directed to enhancing the operational stability of the water purifier as raw water stably flows by arranging a fifth upper cap member above a first upper cap member and arranging the fifth upper cap member to be spaced apart from the first upper cap member so that a raw water flow path through which the raw water flows is formed.

The water purifier provided with the composite filter according to still another embodiment of the present invention is also directed to enhancing the operational stability of the water purifier by arranging a fifth upward guide to be spaced apart from a first upward guide to form a raw water flow path to allow received raw water to flow smoothly.

The water purifier provided with the composite filter according to still another embodiment of the present invention is also directed to enhancing user satisfaction through the prevention in a degradation in water quality of externally treated water and the improvement in water quality of finally discharged third purified water by arranging a fourth partition wall to extend in an axial direction along a fifth upward guide to effectively prevent the received externally treated water from being mixed with discharged residential water.

The water purifier provided with the composite filter according to still another embodiment of the present invention is also directed to enhancing the operational stability of the water purifier by arranging a fifth downward support guide to extend from a first upper cap member to a first lower cap member to prevent received raw water from being mixed with discharged third purified water.

The water purifier provided with the composite filter according to still another embodiment of the present invention is also directed to enhancing product reliability by controlling a valve unit through a control unit to control flows of raw water, first purified water, externally treated water, third purified water, and residential water and effectively preventing these fluids from flowing back.

According to an aspect of the present invention, there is provided a water purifier provided with a composite filter, including a housing unit including a raw water receiving port through which raw water is received, a second purified water discharging port through which filtered second purified water is discharged, an externally treated water receiving port through which externally treated water generated while treating the second purified water externally is received, a third purified water discharging port through which filtered third purified water is discharged, and a residential water discharging port through which residential water generated in a filtering process is discharged, and a filtering unit including a pre-treatment internal filter member disposed inside the housing unit to filter the raw water and generate first purified water, a spiral wound type internal filter member disposed inside the housing unit to filter the first purified water and generate the second purified water, an external treatment member disposed outside the housing unit to treat the second purified water and generate the externally treated water, and a post-treatment internal filter member disposed inside the housing unit to filter the received externally treated water and generate the third purified water, wherein the housing unit includes a head member including a first partition wall for preventing the raw water from being mixed with the externally treated water, a second partition wall for preventing the raw water from being mixed with the residential water, a third partition wall for preventing the second purified water from being mixed with the residential water, and a fourth partition wall for preventing the second purified water from being mixed with the third purified water, and a body member which extends from the head member and in which the filtering unit is disposed, the filtering unit includes a first module in which the pre-treatment internal filter member and the spiral wound type internal filter member are provided sequentially, and a second module disposed to be stacked under the first module and provided with the post-treatment internal filter member, and the second module includes a discharge tube member disposed to pass through a central portion of the first module so that the third purified water is discharged to the outside.

In the water purifier provided with the composite filter according to one embodiment of the present invention, the first module may include a central tube which supports the spiral wound type internal filter member to be wound spirally and in which a second purified water through hole is formed so that the second purified water flows into the first module, and the discharge tube member may be disposed to pass through a central portion of the central tube and disposed to be spaced a predetermined distance from the central tube so that a second purified water flow path through which the second purified water flows is formed between the central tube and the discharge tube member.

In the water purifier provided with the composite filter according to one embodiment of the present invention, the fourth partition wall may be disposed to extend in an axial direction along the discharge tube member.

In the water purifier provided with the composite filter according to one embodiment of the present invention, the third partition wall may be disposed to extend in an axial direction along the central tube.

In the water purifier provided with the composite filter according to one embodiment of the present invention, the first module may include a first upper cap member outside which the pre-treatment internal filter member is disposed in a radial direction and inside which the spiral wound type internal filter member is disposed in the radial direction, and the first upper cap member may include a first upward guide disposed to be spaced a predetermined distance from the central tube so that a residential water flow path through which the discharged residential water flows is formed.

In the water purifier provided with the composite filter according to one embodiment of the present invention, the second partition wall may be disposed to extend in an axial direction along the first upward guide.

In the water purifier provided with the composite filter according to one embodiment of the present invention, the first module may further include a first lower cap member on which the pre-treatment internal filter member is disposed fixedly.

In the water purifier provided with the composite filter according to one embodiment of the present invention, the first module may further include an internal guide which supports an inner surface of the pre-treatment internal filter member and in which a first purified water through hole is formed so that the first purified water flows into the first module.

In the water purifier provided with the composite filter according to one embodiment of the present invention, the internal guide may be disposed to connect the first upper cap member to the first lower cap member.

In the water purifier provided with the composite filter according to one embodiment of the present invention, the internal guide may be disposed to be spaced apart from an outer surface of the spiral wound type internal filter member so that a first purified water flow path through which the first purified water flows is formed to extend to a lower portion of the spiral wound type internal filter member.

In the water purifier provided with the composite filter according to one embodiment of the present invention, the first module may further include a second upper cap member disposed to be stacked on the first upper cap member and disposed to be spaced apart from the first upper cap member so that a raw water flow path is formed, and the second upper cap member may include a second downward support guide disposed to extend to the first lower cap member.

In the water purifier provided with the composite filter according to one embodiment of the present invention, the first upper cap member may include at least two first support protrusions formed to protrude outward in a radial direction from an outer circumferential surface thereof, and the first support protrusions may be disposed to be spaced an equal distance from each other.

In the water purifier provided with the composite filter according to one embodiment of the present invention, the second upper cap member may include a second upward guide disposed to be spaced a predetermined distance from the first upward guide so that a raw water flow path through which received raw water flows is formed.

In the water purifier provided with the composite filter according to one embodiment of the present invention, the first partition wall may be disposed to extend in an axial direction along the second upward guide.

In the water purifier provided with the composite filter according to one embodiment of the present invention, the second module may include a third upper cap member and a third lower cap member on which the post-treatment internal filter member is disposed fixedly, and the discharge tube member may extend upward from the third lower cap member and be disposed to pass through the third upper cap member.

In the water purifier provided with the composite filter according to one embodiment of the present invention, a connector member for connecting the first module to the second module may be provided, and the connector member may include a connector body fixedly press-fitted into the first lower cap member, an upward rib extending upward from the connector body to be coupled to the central tube, and a downward rib extending downward from the connector body to be coupled to the third upper cap member.

In the water purifier provided with the composite filter according to one embodiment of the present invention, the third upper cap member may include a third upward guide extending upward in an axial direction to be coupled to an inner surface of the downward rib, and the third upward guide may have an outer diameter that is the same as a diameter of the central tube.

The water purifier provided with the composite filter according to one embodiment of the present invention may further include a valve unit configured to control flows of the raw water, the second purified water, the externally treated water, the third purified water, and the residential water, and a control unit configured to control an operation of the valve unit.

According to another aspect of the present invention, there is provided a water purifier provided with a composite filter, including a housing unit including a raw water receiving port through which raw water is received, a first purified water discharging port through which filtered first purified water is discharged, a second purified water receiving port through which externally filtered second purified water is received, a third purified water discharging port through which filtered third purified water is discharged, and a residential water discharging port through which residential water generated in a filtering process is discharged, and a filtering unit including a spiral wound type internal filter member disposed inside the housing unit to filter the raw water and generate the first purified water, an external treatment member disposed outside the housing unit to filter the first purified water and generate the second purified water, and a post-treatment internal filter member disposed inside the housing unit to filter the second purified water and generate the third purified water, wherein the housing unit includes a head member including a first partition wall for preventing the raw water from being mixed with the second purified water, a second partition wall for preventing the second purified water from being mixed with the third purified water, a third partition wall for preventing the third purified water from being mixed with the residential water, and a fourth partition wall for preventing the residential water from being mixed with the first purified water, and a body member which extends from the head member and in which the filtering unit is disposed, the filtering unit includes a first upper cap member under which the spiral wound type internal filter member is fixedly disposed, and a second upper cap member disposed to be spaced a predetermined distance from an upper surface of the first upper cap member so that a residential water flow path through which the residential water discharged from the spiral wound type internal filter member flows is provided, and the first upper cap member includes a first through hole allowing an inside of the spiral wound type internal filter member to communicate with the residential water flow path so that the residential water discharged from the spiral wound type internal filter member disposed under the first upper cap member flows through the residential water flow path.

In the water purifier provided with the composite filter according to another embodiment of the present invention, the first upper cap member may include a first upward guide extending upward so that the first purified water flows, the second upper cap member may include a second upward guide extending upward so that the residential water flows, and the first upward guide and the second upward guide may be disposed to be spaced a predetermined distance from each other so that the residential water flow path is formed to extend.

In the water purifier provided with the composite filter according to another embodiment of the present invention, the first upper cap member may include a first downward guide extending downward so that the spiral wound type internal filter member is disposed fixedly.

In the water purifier provided with the composite filter according to another embodiment of the present invention, the filtering unit may include a third upper cap member disposed to be stacked to allow the post-treatment internal filter member to be fixed in a state of being disposed on the second upper cap member, and a fourth upper cap member disposed to be spaced a predetermined distance from an upper surface of the third upper cap member so that a second purified water flow path through which the externally received second purified water flows is provided. In the water purifier provided with the composite filter according to another embodiment of the present invention, the third upper cap member may include a third upward guide extending upward so that the third purified water flows, the fourth upper cap member may include a fourth upward guide extending upward so that the second purified water flows, and the third upward guide and the fourth upward guide may be disposed to be spaced a predetermined distance from each other so that the second purified water flow path is formed to extend.

In the water purifier provided with the composite filter according to another embodiment of the present invention, the third upper cap member may include a third downward guide extending downward so that the post-treatment internal filter member is disposed fixedly.

In the water purifier provided with the composite filter according to another embodiment of the present invention, the fourth upper cap member may include a fourth downward guide extending downward to surround an outer circumferential surface of the third upper cap member, and the fourth downward guide may be disposed to extend to an outer circumferential surface of the second upper cap member.

In the water purifier provided with the composite filter according to another embodiment of the present invention, the filtering unit may further include a lower cap member provided with a lower guide extending upward so that the post-treatment internal filter member is fixedly disposed in an upper portion of the filtering unit.

In the water purifier provided with the composite filter according to another embodiment of the present invention, a raw water flow path through which the raw water flows may be provided between an inner circumferential surface of the body member and an outer circumferential surface of the spiral wound type internal filter member, and the spiral wound type internal filter member may be disposed to be spaced apart from a lower surface of the body member so that raw water flow path is formed to extend inward in a radial direction to the lower portion of the spiral wound type internal filter member.

In the water purifier provided with the composite filter according to another embodiment of the present invention, a central tube which supports the spiral wound type internal filter member to be wound spirally and in which a second through hole is formed so that the first purified water flows through a first purified water flow path formed inside the spiral wound type internal filter member may be provided on the inner circumferential surface of the spiral wound type internal filter member.

In the water purifier provided with the composite filter according to another embodiment of the present invention, the fourth upper cap member may include at least two first support protrusions formed to protrude outward in the radial direction from an outer circumferential surface thereof, and the first support protrusions may be disposed to be spaced an equal distance from each other.

The water purifier provided with the composite filter according to another embodiment of the present invention may further include a valve unit configured to control flows of the raw water, the purified water, and the residential water, and a control unit configured to control an operation of the valve unit.

According to still another aspect of the present invention, there is provided a water purifier provided with a composite filter, including a housing unit including a raw water receiving port through which raw water is received, a first purified water discharging port through which filtered first purified water is discharged, an externally treated water receiving port through which externally treated water generated while treating the first purified water externally is received, a third purified water discharging port through which filtered third purified water is discharged, and a residential water discharging port through which residential water generated in a filtering process is discharged, and a filtering unit including a pre-treatment internal filter member disposed inside the housing unit to filter the raw water and generate the first purified water, an external treatment member disposed outside the housing unit to filter the first purified water and generate the externally treated water, a spiral wound type internal filter member disposed inside the housing unit to filter the externally treated water and generate the second purified water, and a post-treatment internal filter member disposed inside the housing unit to filter the second purified water and generate the third purified water and disposed to be stacked under the pre-treatment internal filter member, wherein the housing unit includes a head member including a first partition wall for preventing the raw water from being mixed with the first purified water, a second partition wall for preventing the first purified water from being mixed with the externally treated water, a third partition wall for preventing the externally treated water from being mixed with the residential water, and a fourth partition wall for preventing the third purified water from being mixed with the raw water, and a body member which extends from the head member and in which the filtering unit is disposed, and the filtering unit includes a first upper cap member under which the pre-treatment internal filter member disposed outward in a radial direction and the spiral wound type internal filter member disposed inward in the radial direction are disposed, and a second upper cap member under which the post-treatment internal filter member disposed outward in the radial direction is disposed and through which the spiral wound type internal filter member disposed inside in the radial direction is disposed to pass.

In the water purifier provided with the composite filter according to still another embodiment of the present invention, the filtering unit may further include a second lower cap member on which the post-treatment internal filter member and the spiral wound type internal filter member are fixedly disposed, and the second lower cap member may include a connecting tube disposed outside the spiral wound type internal filter member in the radial direction to prevent the first purified water and the third purified water from being mixed with the externally treated water.

In the water purifier provided with the composite filter according to still another embodiment of the present invention, the filtering unit may further include a third upper cap member disposed to be stacked under the first upper cap member and disposed to be spaced apart from the first upper cap member so that the first purified water is discharged to the outside through a first purified water flow path.

In the water purifier provided with the composite filter according to still another embodiment of the present invention, a first spacer extending downward to support an upper surface of the third upper cap member may be provided on a lower surface of the first upper cap member.

In the water purifier provided with the composite filter according to still another embodiment of the present invention, the first upper cap member may include a first upward guide extending upward, the third upper cap member may include a third upward guide extending upward, and the first upward guide and the third upward guide may be disposed to be spaced from each other so that the first purified water flow path is formed.

In the water purifier provided with the composite filter according to still another embodiment of the present invention, the first partition wall may be disposed to extend in an axial direction along the first upward guide.

In the water purifier provided with the composite filter according to still another embodiment of the present invention, the second partition wall may be disposed to extend in an axial direction along the third upward guide.

In the water purifier provided with the composite filter according to still another embodiment of the present invention, the third upper cap member may include a third downward support guide disposed to extend downward to be coupled to the connecting tube to prevent the first purified water from being mixed with the externally treated water.

In the water purifier provided with the composite filter according to still another embodiment of the present invention, the filtering unit may further include a fourth upper cap member disposed to be stacked under the third upper cap member and disposed to be spaced apart from the third upper cap member so that the externally treated water flows through an externally treated water flow path.

In the water purifier provided with the composite filter according to still another embodiment of the present invention, a second spacer extending downward to support an upper surface of the fourth upper cap member may be provided on a lower surface of the third upper cap member.

In the water purifier provided with the composite filter according to still another embodiment of the present invention, the fourth upper cap member may include a fourth upward guide extending upward, and the fourth upward guide may be disposed to be spaced apart from the third upper cap member so that the externally treated water flow path is formed.

In the water purifier provided with the composite filter according to still another embodiment of the present invention, the third partition wall may be disposed to extend in an axial direction along the fourth upward guide.

In the water purifier provided with the composite filter according to still another embodiment of the present invention, the fourth upper cap member may include a fourth downward support guide disposed to extend downward in an axial direction to surround the spiral wound type internal filter member.

In the water purifier provided with the composite filter according to still another embodiment of the present invention, the filtering unit may further include a central tube which supports the spiral wound type internal filter member to be wound spirally and in which a second purified water through hole is formed so that the second purified water flows into the filtering unit, and the second lower cap member includes a second through hole through which the central tube is disposed to pass so that the second purified water flowing through the central tube flows downward.

In the water purifier provided with the composite filter according to still another embodiment of the present invention, the second lower cap member may include a second downward guide extending downward, and the second downward guide may include a third through hole through which the second purified water flowing to a lower portion of the second lower cap member flows.

In the water purifier provided with the composite filter according to still another embodiment of the present invention, the filtering unit may further include a first lower cap member using which the post-treatment internal filter member is fixedly disposed in an upper portion of the filtering unit, and the first lower cap member may include a third spacer disposed to be stacked on the second upper cap member and extending downward to be supported by an upper surface of the second lower cap member so that a third purified water flow path through which the third purified water flows is formed.

In the water purifier provided with the composite filter according to still another embodiment of the present invention, the filtering unit may further include a fifth upper cap member disposed to be stacked on the first upper cap member and disposed to be spaced apart from the first upper cap member so that a raw water flows through a raw water flow path, and the fifth upper cap member may include a fourth spacer extending downward to be supported by an upper surface of the first upper cap member.

In the water purifier provided with the composite filter according to still another embodiment of the present invention, the fifth upper cap member may include a fifth upward guide extending upward, and the fifth upward guide may be disposed to be spaced apart from the first upward guide so that the raw water flow path is formed.

In the water purifier provided with the composite filter according to still another embodiment of the present invention, the fourth partition wall may be disposed to extend in an axial direction along the fifth upward guide.

In the water purifier provided with the composite filter according to still another embodiment of the present invention, the fifth upper cap member may include a fifth downward support guide extending downward, and the fifth downward support guide may be disposed to extend to a first lower cap member.

The water purifier provided with the composite filter according to still another embodiment of the present invention may further include a valve unit configured to control flows of the raw water, the first purified water, the externally treated water, the third purified water, and the residential water, and a control unit configured to control an operation of the valve unit.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which.

DETAILED DESCRIPTION OF EXEMPLARY EMBODIMENTS

Words and terms used in the specification and the claims should not be construed as being limited to their usual or dictionary meanings and should be construed as meaning and concept consistent with the technical spirit of the present invention according to a principle in which the inventors can define terms and a concept in order to describe their inventions in the best method.

Therefore, since embodiments described in the specification and configurations illustrated in drawings correspond to exemplary embodiments of the present invention and do not represent all of the technical spirit of the present invention, various equivalents and modifications of the corresponding configurations capable of replacing the embodiments and the configurations may be present at the time of the application of the present invention.

In the specification, it should be understood that the term "comprise" or "have" is intended to describe that a feature, a number, a step, an operation, a component, a part, or a combination thereof described in the specification is present, but does not preclude the possibility of the presence or addition of one or more other features, numbers, steps, operations, components, parts, or combinations thereof.

When a first component is described as being "in front of," "behind," "above," or "under" a second component, it includes not only a case in which the first component is disposed "in front of," "behind," "above," or "under" the second component in direct contact therewith, but also a case in which a third component is disposed therebetween unless there are special circumstances. In addition, when a first component is described as being "connected" to a second component, it includes not only a case in which the first component and the second component are directly connected, but also a case in which the first component and the second component are indirectly connected unless there are special circumstances.

Figure 1:
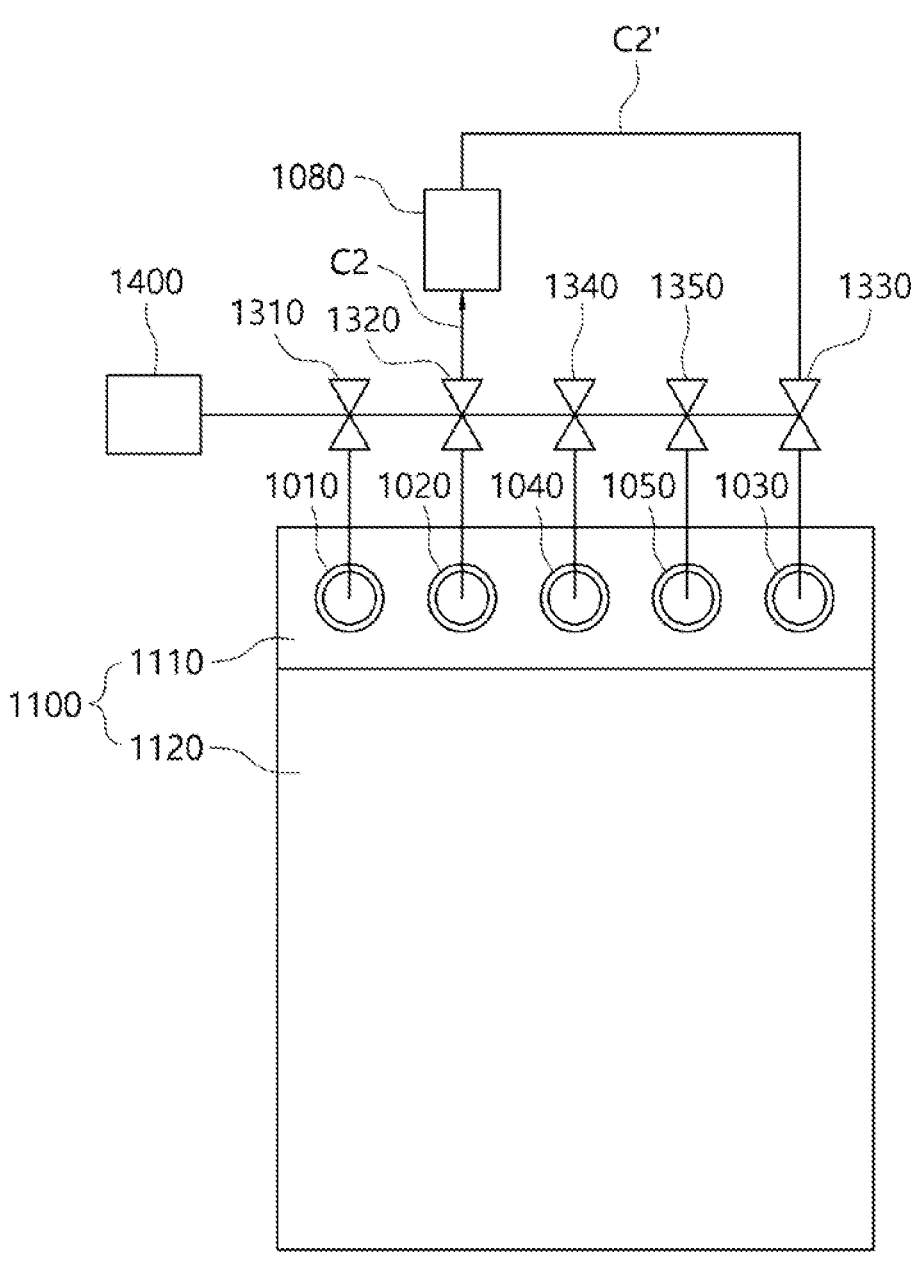
FIG. 1 is a configuration diagram illustrating a water purifier provided with a composite filter according to one embodiment of the present invention.
Figure 2:
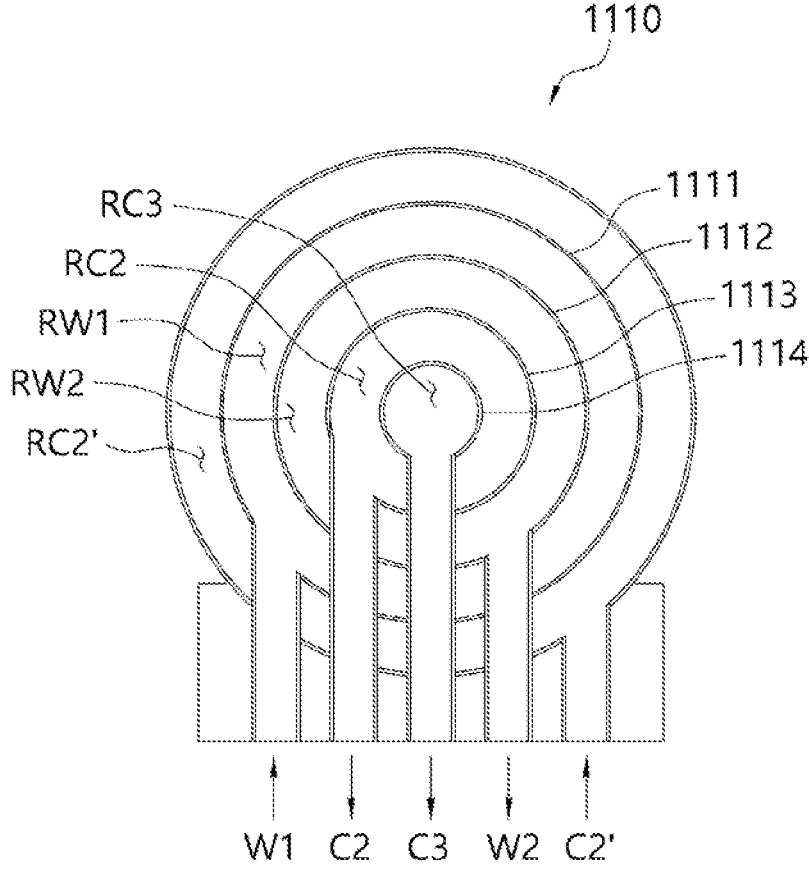
FIG. 2 is a plan view illustrating a head member of the water purifier provided with the composite filter according to one embodiment of the present invention.
Figure 3:
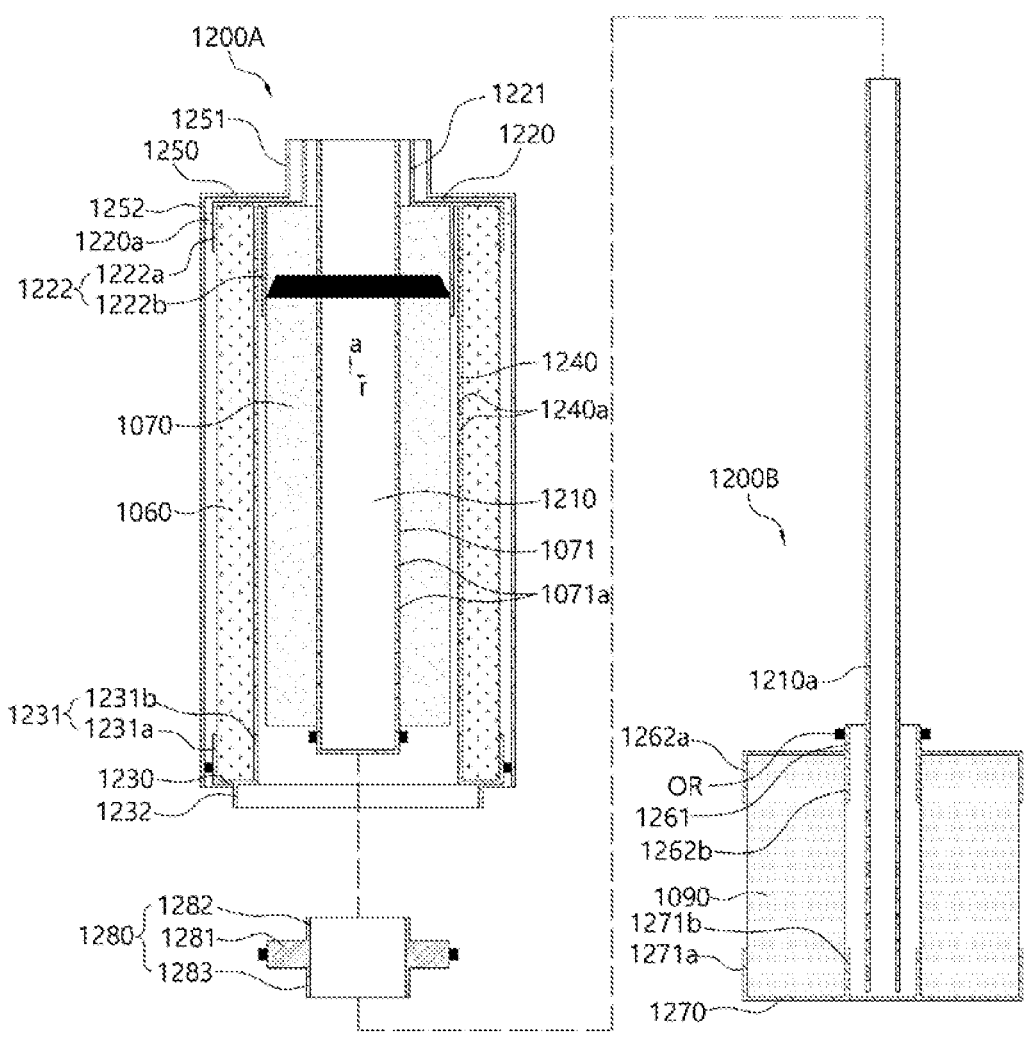
FIG. 3 is a cross-sectional view illustrating a state in which a first module and a second module of the water purifier provided with the composite filter according to one embodiment of the present invention are disassembled.
Figure 4:
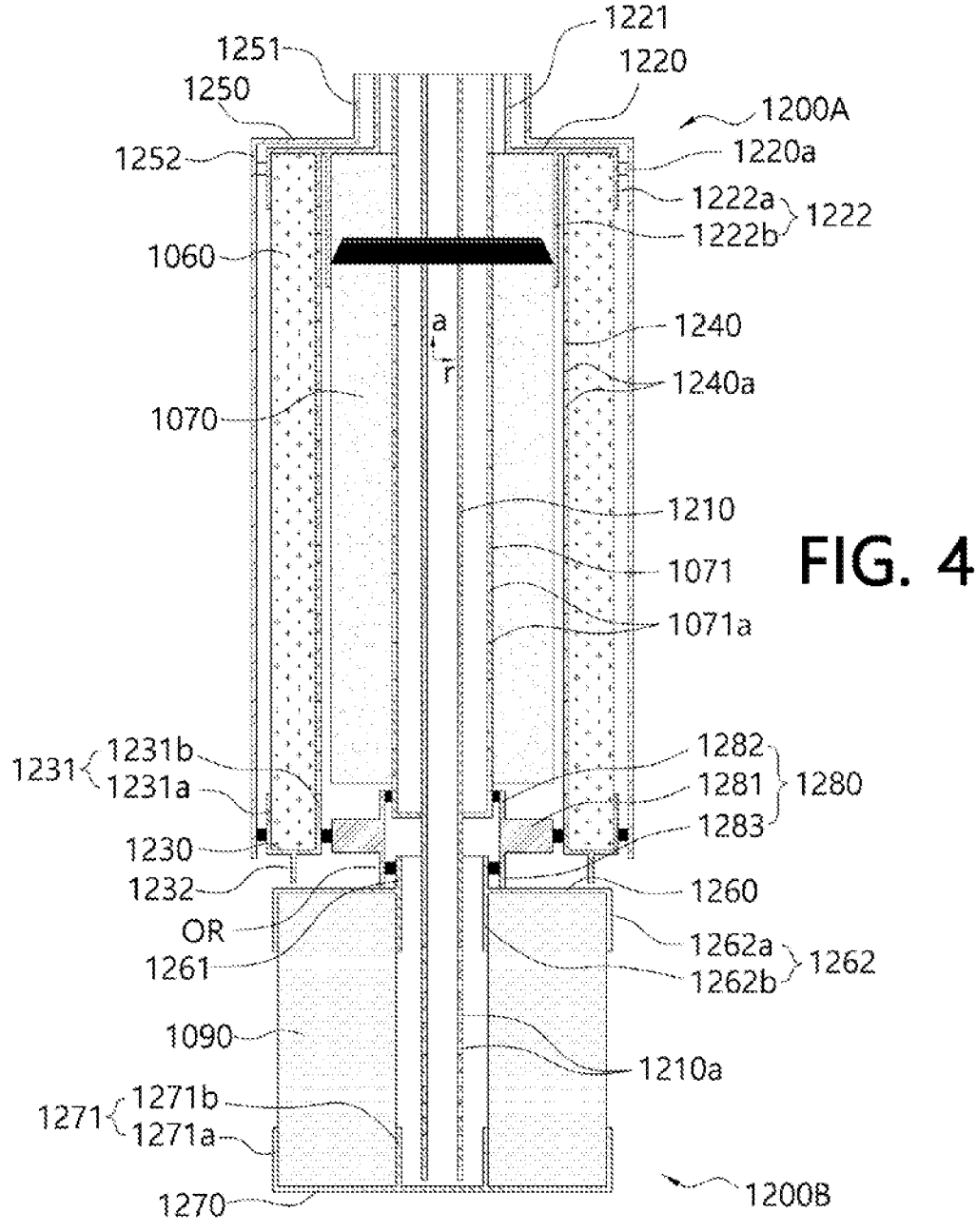
FIG. 4 is a cross-sectional view illustrating a state in which the first module and the second module of the water purifier provided with the composite filter according to one embodiment of the present invention are assembled.
Figure 5:
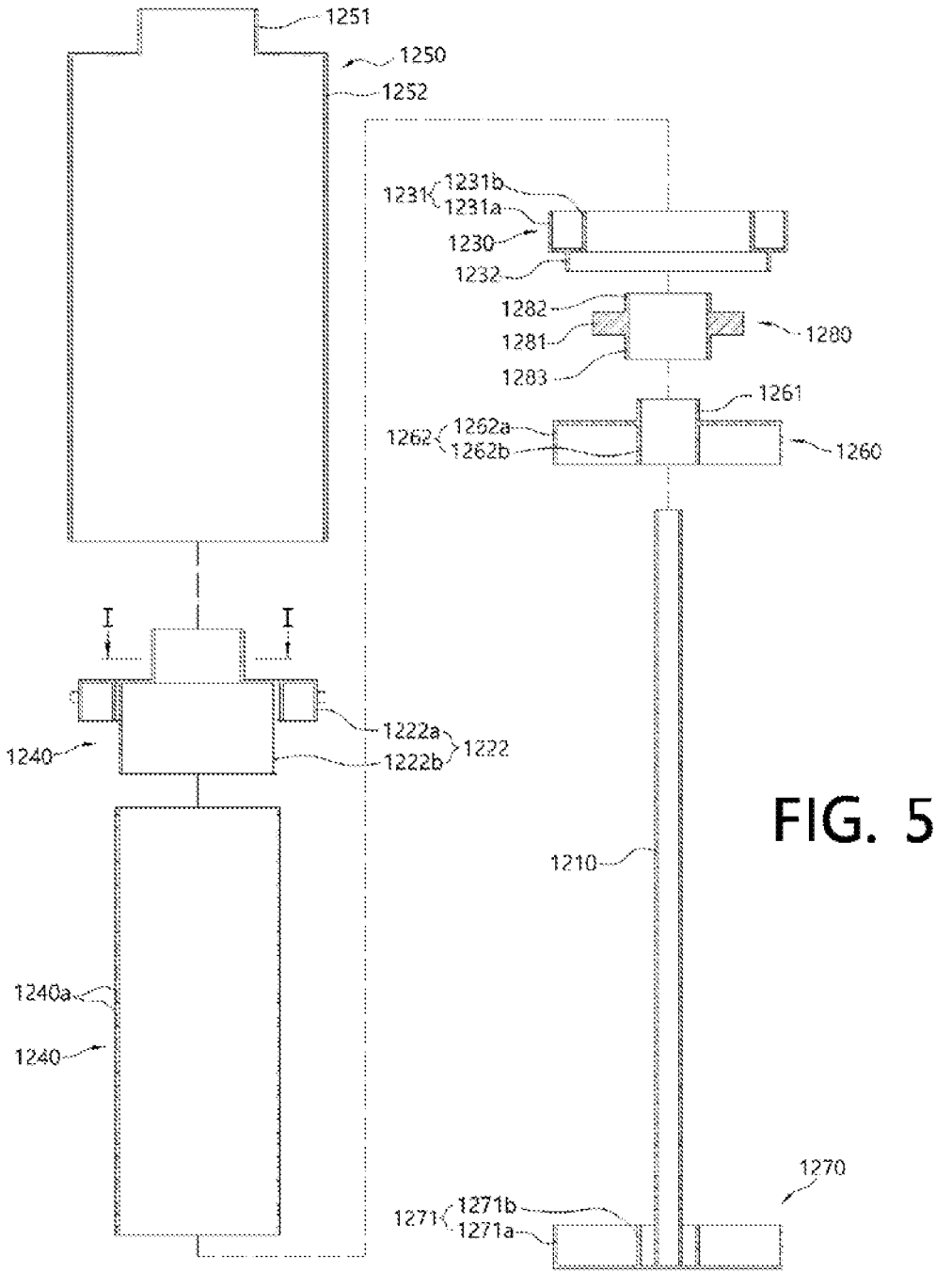
FIG. 5 is a cross-sectional view illustrating a state in which an upper cap member and a lower cap member of the water purifier provided with the composite filter according to one embodiment of the present invention are disassembled.
Figure 6:
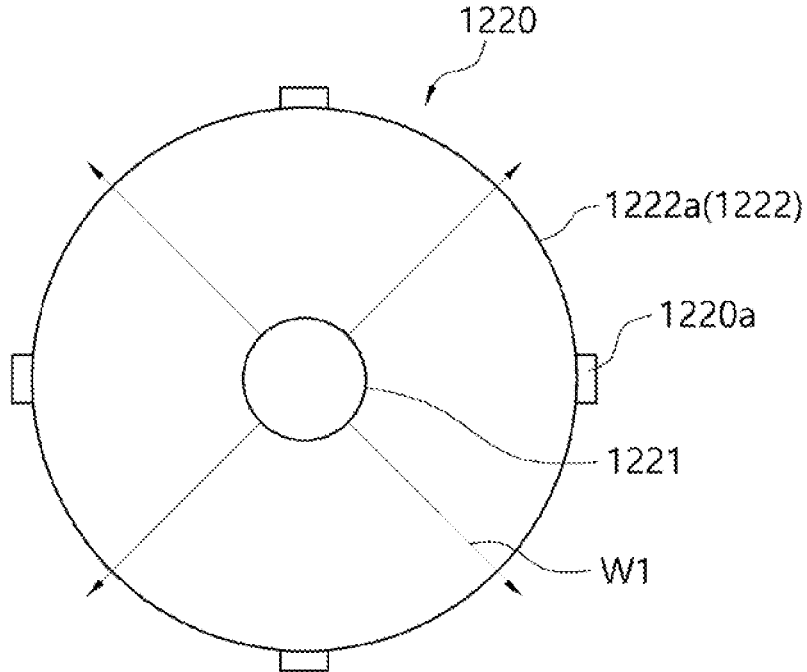
FIG. 6 is a cross-sectional view along line I-I in FIG. 5.
Figure 7:
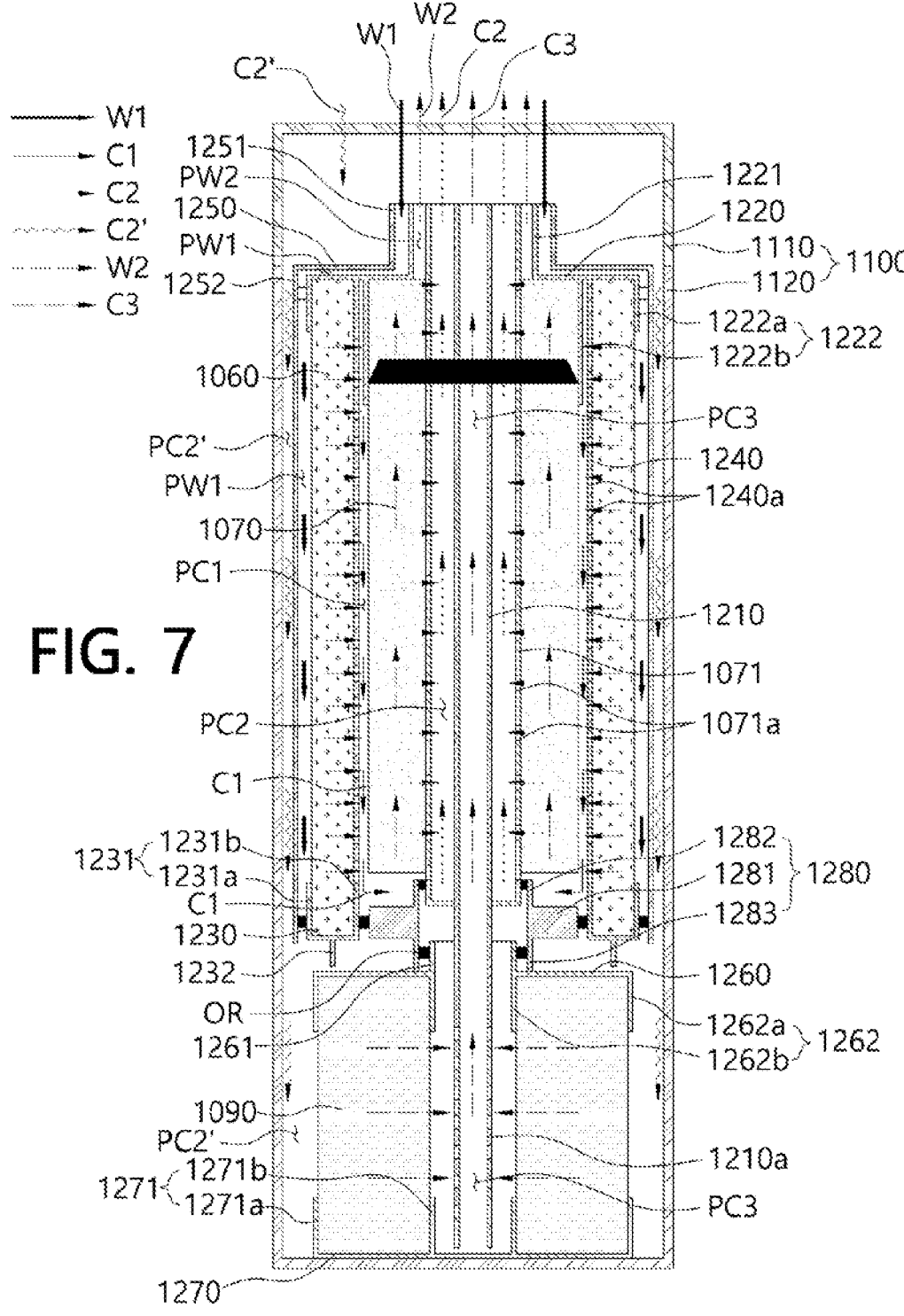
FIG. 7 is a cross-sectional view illustrating a state in which a filtering unit of the water purifier provided with the composite filter according to one embodiment of the present invention is installed in a housing unit.

Hereinafter, a water purifier provided with a composite filter according to the present invention will be described with reference to the accompanying drawings. FIG. 1 is a configuration diagram illustrating a water purifier provided with a composite filter according to one embodiment of the present invention, FIG. 2 is a plan view illustrating a head member of the water purifier provided with the composite filter according to one embodiment of the present invention, FIG. 3 is a cross-sectional view illustrating a state in which a first module and a second module of the water purifier provided with the composite filter according to one embodiment of the present invention are disassembled, FIG. 4 is a cross-sectional view illustrating a state in which the first module and the second module of the water purifier provided with the composite filter according to one embodiment of the present invention are assembled, FIG. 5 is a cross-sectional view illustrating a state in which an upper cap member and a lower cap member of the water purifier provided with the composite filter according to one embodiment of the present invention are disassembled, FIG. 6 is a cross-sectional view along line I-I in FIG. 5 and FIG. 7 is a cross-sectional view illustrating a state in which a filtering unit of the water purifier provided with the composite filter according to one embodiment of the present invention is installed in a housing unit. Here, a denotes an axial direction of the composite filter, and r denotes a radial direction of the composite filter. In order to clearly describe the present invention, parts not related to the description are omitted from the drawings.

As illustrated in FIGS. 1 to 4, the water purifier provided with the composite filter according to the present invention may include a housing unit 1100 including a raw water receiving port 1010 through which raw water W1 is received, a second purified water discharging port 1020 through which filtered second purified water C2 is discharged, an externally treated water receiving port 1030 through which externally treated water C2' generated while treating the second purified water C2 externally is received, a third purified water discharging port 1040 through which filtered third purified water C3 is discharged, and a residential water discharging port 1050 through which residential water W2 generated in a filtering process is discharged, and a filtering unit 1200 including a pre-treatment internal filter member 1060 disposed inside the housing unit 1100 to filter the raw water W1 and generate first purified water C1, a spiral wound type internal filter member 1070 disposed inside the housing unit 1100 to filter the first purified water C1 and generate the second purified water C2, an external treatment member 1080 disposed outside the housing unit 1100 to treat the second purified water C2 and generate the externally treated water C2', and a post-treatment internal filter member 1090 disposed inside the housing unit 1100 to filter the received externally treated water C2' and generate the third purified water C3. In other words, the raw water W1 received through the raw water receiving port 1010 may be discharged to the outside through the second purified water discharging port 1020 after sequentially passing through the pre-treatment internal filter member 1060 and the spiral wound type internal filter member 1070 provided in the filtering unit 1200, re-received through the externally treated water receiving port 1030 after passing through the external treatment member 1080, and then filtered while passing through the post-treatment internal filter member 1090, and the finally filtered third purified water C3 may be discharged through the third purified water discharging port 1040 and then provided to a user. Alternatively, the third purified water C3 may be stored in a separate purified water storage unit or supplied to a cold water generator, a hot water generator, and an ice generator to produce cold water, hot water, and ice. In this case, a raw water flow path PW1 and an externally treated water flow path PC2' through which the raw water W1 and the externally treated water C2' received through an upper portion of the housing unit 1100 may be provided inside the housing unit 1100. In addition, the first purified water C1 may flow to a lower side of the spiral wound type internal filter member 1070 and then flow into the spiral wound type internal filter member 1070, and the residential water W2 generated by filtering the first purified water C1 by the spiral wound type internal filter member 1070 may be discharged to the outside of the housing unit 1100 through the residential water discharging port 1050 and then discharged to the outside of the water purifier through a separate tube. It is possible to enable the implementation of an additional function using the external treatment member 1080 in a process in which the raw water W1 passes through the composite filter by not only receiving the raw water W1, discharging the second purified water C2, receiving the externally treated water C2' and discharging the third purified water C3, but also discharging the residential water W2, and improve the user's convenience by constituting the composite filter by integrating three internal filter members including the spiral wound type internal filter member 1070 to facilitate the miniaturization and replacement of the water purifier. In this case, the pre-treatment internal filter member 1060 may be a pre-carbon filter or a microfiltration (MF) filter, and the post-treatment internal filter member 1090 may be a post-carbon filter or the MF filter. Alternatively, the pre-treatment internal filter member 1060 and the post-treatment internal filter member 1090 may include an electrodeionization type filter. The electrodeionization type includes an electro deionization (EDI), continuous electro deionization (CEDI), and capacitive deionization (CDI). In this case, a separate filter member may be provided on an outer surface of the pre-treatment internal filter member 1060. For example, such a filter member may be a nano-trap (NT) filter member. The NT filter member may be made of a material with electrostatic electricity, such as a nano-trap material, to adsorb foreign substances included in the received raw water W1. The material may have a positive charge. Therefore, foreign substances having negative charges, such as viruses, bacteria, and fine particles, included in the raw water W1 may be adsorbed to the NT filter member by electrostatic electricity. In addition, such a filter member may be a sediment filter member. The spiral wound type internal filter member 1070 may be a reverse osmosis filter or a hollow fiber membrane filter. In this case, the external treatment member 1080 may be an additional separate functional filter (deionization filter for removing heavy metals) or a pump for increasing a pressure of the second purified water C2. Meanwhile, the external treatment member 1080 is not limited to a member for physically and chemically treating the second purified water C2 by another filter or the like and may include a temporary tank or the like for temporarily accommodating the second purified water C2.

As illustrated in FIG. 2, the housing unit 1100 includes a head member 1110 including a first partition wall 1111 for preventing the raw water W1 from being mixed with the externally treated water C2', a second partition wall 1112 for preventing the raw water W1 from being mixed with the residential water W2, a third partition wall 1113 for preventing the second purified water C2 from being mixed with the residential water W2, and a fourth partition wall 1114 for preventing the second purified water C2 from being mixed with the third purified water C3, and a body member 1120 which extends from the head member 1110 and in which the filtering unit 1200 is disposed. The filtering unit 1200 may include a first module 1200A in which the pre-treatment internal filter member 1060 and the spiral wound type internal filter member 1070 are provided sequentially and a second module 1200B disposed to be stacked under the first module 1200A and provided with the post-treatment internal filter member 1090, and the second module 1200B may include a discharge tube member 1210 disposed to pass through a central portion of the first module 1200A so that the third purified water C3 is discharged to the outside. In other words, by constituting the composite filter by a method of modularizing each filter through the first module 1200A in which the pre-treatment internal filter member 1060 and the spiral wound type internal filter member 1070 are provided and the second module 1200B in which the post-treatment internal filter member 1090 is provided and arranging the first module 1200A and the second module 1200B to be stacked, it is possible to improve productivity, and by arranging the discharge tube member 1210 provided with a third purified water flow path PC3 to pass through a central portion of the first module 1200A so that the third purified water C3 generated from the second module 1200B disposed under the first module 1200A is discharged to the outside, it is possible to prevent the third purified water C3 from being mixed with the second purified water C2, thereby securing the operational stability of the water purifier. In addition, the water purifier has a structure in which not only received raw water W1, but also discharged second purified water C2, received externally treated water C2', discharged third purified water C3, and discharged residential water W2 are received and discharged to an upper portion of the composite filter, and to this end, the head member 1110 includes a raw water area RW1 into which the raw water W1 is received, a second purified water area RC2 from which the second purified water C2 is discharged, an externally treated water area RC2' into which the externally treated water C2' is received, a third purified water area RC3 from which the third purified water C3 is discharged, and a residential water area RW2 from which the residential water W2 is discharged. To this end, since the head member 1110 of the housing unit 1100 includes the first to fourth partition walls 1111, 1112, 1113, and 1114 to form independent flow paths for preventing the raw water W1, the second purified water C2, the externally treated water C2', the third purified water C3, and the residential water W2 from being mixed so as to concentrate tubes through which the raw water W1, the second purified water C2, the externally treated water C2', the third purified water C3, and the residential water W2 flow on an upper portion of the composite filter, it is possible to improve a degree of freedom in layout design of other portions.

As illustrated in FIGS. 3 and 4, in the water purifier provided with the composite filter according to one embodiment of the present invention, the first module 1200A may include a central tube 1071 which supports the spiral wound type internal filter member 1070 to be wound spirally and in which second purified water through holes 1071a are formed so that the second purified water C2 flows into the first module 1200A, and the discharge tube member 1210 may be disposed to pass through a central portion of the central tube 1071 and disposed to be spaced a predetermined distance from the central tube 1071 so that the second purified water flow path PC2 through which the second purified water C2 flows is formed between the central tube 1071 and the discharge tube member 1210. The spiral wound type internal filter member 1070 is disposed to be spirally wound around the central tube 1071, the second purified water through holes 1071*a* are formed so that the second purified water C2 flows through the second purified water flow path PC2 provided therein, and the discharge tube member 1210 inserted by passing through the central portion of the central tube 1071 is disposed to be spaced the predetermined distance from the central tube 1071, and thus it is possible to secure operational reliability through a smooth flow of the second purified water C2 while the second purified water flow path PC2 is stably maintained. The central tube 1071 may support an inner surface of the spiral wound type internal filter member 1070 for the structural stability of the spiral wound type internal filter member 1070, and as described above, may be formed integrally with the spiral wound type internal filter member 1070 when the spiral wound type internal filter member 1070 is configured by a method of being wound around the central tube 1071, but is not necessarily limited thereto, and the spiral wound type internal filter member 1070 may be wound around the central tube 1071 in a state of being formed integrally with an upward rib 1282 of a connector member 1280 to be described below. In this case, since a separate O-ring may be provided between the central tube 1071 and the upward rib 1282 of the connector member 1280, it is possible to prevent the second purified water C2 from flowing into the third purified water flow path PC3.

Meanwhile, as illustrated in FIGS. 4 and 7, in the water purifier provided with the composite filter according to one embodiment of the present invention, the fourth partition wall 1114 may be disposed to extend in an axial direction a along the discharge tube member 1210. In this case, the fourth partition wall 1114 may be formed to extend in an axial direction a along the discharge tube member 1210, and when the head member 1110 and the body member 1120 are coupled, the head member 1110 and the body member 1120 may be coupled by a method in which the fourth partition wall 1114 covers an outer surface of the discharge tube member 1210, coupled by a method in which the fourth partition wall 1114 is fitted into an inner surface of the discharge tube member 1210, or coupled by a method in which the fourth partition wall 1114 is seated on an upper end of the discharge tube member 1210. As described above, since the fourth partition wall 1114 is disposed to extend in the axial direction a along the discharge tube member 1210, it is possible to effectively prevent the discharged third purified water C3 from being mixed with the discharged second purified water C2, thereby improving the operational stability of the water purifier.

In addition, as illustrated in FIGS. 4 and 7, in the water purifier provided with the composite filter according to one embodiment of the present invention, the third partition wall 1113 may be disposed to extend in the axial direction a along the central tube 1071. In this case, the third partition wall 1113 may be formed to extend in the axial direction a along the central tube 1071, and when the head member 1110 and the body member 1120 are coupled, the head member 1110 and the body member 1120 may be coupled by a method in which the third partition wall 1113 covers an outer surface of the central tube 1071, coupled by a method in which the third partition wall 1113 is fitted into the central tube 1071, or coupled by a method in which the third partition wall 1113 is seated on an upper end of the central tube 1071. As described above, since the third partition wall 1113 is disposed to extend in the axial direction a along the central tube 1071, it is possible to effectively prevent the discharged second purified water C2 from being mixed with the discharged residential water W2, thereby improving the operational stability of the water purifier.

As illustrated in FIGS. 3 and 4, in the water purifier provided with the composite filter according to one embodiment of the present invention, the first module 1200A may include a first upper cap member 1220 outside which the pre-treatment internal filter member 1060 disposed in the radial direction r and inside which the spiral wound type internal filter member 1070 disposed in the radial direction r, and the first upper cap member 1220 may include a first upward guide 1221 disposed to be spaced a predetermined distance from the central tube 1071 so that the residential water flow path PW2 through which the discharged residential water W2 flows is formed. The first upward guide 1221 extends upward in the axial direction a to be parallel with the central tube 1071 to guide the discharged residential water W2. In other words, since the discharged residential water W2 is discharged to the outside through the residential water flow path PW2 formed between the first upward guide 1221 provided in the first upper cap member 1220 and the central tube 1071, it is possible to prevent the discharged residential water W2 from being mixed with the received raw water W1 or the discharged second purified water C2, thereby improving the operational stability of the water purifier. A first downward support guide 1222 may be formed in the first upper cap member 1220, and the first downward support guide 1222 may include a 1-1 downward support guide 1222*a* disposed outward in the radial direction to fix the pre-treatment internal filter member 1060 and a 1-2 downward support guide 1222*b* disposed inward in the radial direction r to fix the spiral wound type internal filter member 1070. The 1-2 downward support guide 1222*b* may stably support the spiral wound type internal filter member 1070, and a separate packing supported by the 1-2 downward support guide 1222*b* may be provided in the spiral wound type internal filter member 1070. As described above, when the first downward support guide 1222 is formed, the pre-treatment internal filter member 1060 and the spiral wound type internal filter member 1070 are fixed stably, thereby improving the durability of the water purifier.

In addition, as illustrated in FIGS. 4 and 7, in the water purifier provided with the composite filter according to one embodiment of the present invention, the second partition wall 1112 may be disposed to extend in the axial direction a along the first upward guide 1221. In this case, the second partition wall 1112 may be formed to extend in the axial direction a along the first upward guide 1221, and when the head member 1110 and the body member 1120 are coupled, the head member 1110 and the body member 1120 may be coupled by a method in which the second partition wall 1112 covers an outer surface of the first upward guide 1221, coupled by a method in which the second partition wall 1112 is fitted into an inner surface of the first upward guide 1221, or coupled by a method in which the second partition wall 1112 is seated on an upper end of the first upward guide 1221. In other words, since the second partition wall 1112 is disposed to extend in the axial direction a along the first upward guide 1221, it is possible to effectively prevent the received raw water W1 from being mixed with the discharged residential water W2, thereby improving the operational stability of the water purifier.

As illustrated in FIGS. 3 and 4, in the water purifier provided with the composite filter according to one embodiment of the present invention, the first module 1200A may further include a first lower cap member 1230 on which the pre-treatment internal filter member 1060 is fixedly disposed. Since the pre-treatment internal filter member 1060 may be fixed by a method of arranging the first upper cap member 1220 and the first lower cap member 1230 on an upper portion and a lower portion of the pre-treatment internal filter member 1060, respectively, it is possible to enable the modularization of the first module 1200A through a sub assembly process, thereby improving workability. A first upward support guide 1231 may be formed in the first lower cap member 1230, and the first upward support guide 1231 may include a 1-1 upward support guide 1231$a$ disposed outward in the radial direction r and a 1-2 upward support guide 1231$b$ disposed inward in the radial direction r to fix the outer surface and the inner surface of the pre-treatment internal filter member 1060. As described above, when the first upward support guide 1231 is formed, the pre-treatment internal filter member 1060 is fixed stably, thereby improving the durability of the water purifier. In addition, a first downward guide 1232 may be provided in the first lower cap member 1230, and the first downward guide 1232 may be formed to extend downward in the axial direction a to support the upper surface of the second module 1200B, thereby improving the structural stability of the composite filter.

In addition, as illustrated in FIGS. 3 and 4, in the water purifier provided with the composite filter according to one embodiment of the present invention, the first module 1200A may further include an internal guide 1240 which supports the inner surface of the pre-treatment internal filter member 1060 and in which first purified water through holes 1240$a$ are formed so that the first purified water C1 flows therethrough. In other words, it is possible to improve structural stability because the internal guide 1240 supports the inner surface of the pre-treatment internal filter member 1060, and it is possible to improve the operational stability of the water purifier as the first purified water C1 smoothly flows into the first module 1200A through the first purified water through holes 1240$a$ formed in the internal guide 1240.

In this case, as illustrated in FIGS. 3 and 4, in the water purifier provided with the composite filter according to one embodiment of the present invention, the internal guide 1240 may be disposed to connect the first upper cap member 1220 to the first lower cap member 1230, and when the internal guide 1240 is disposed to connect the first upper cap member 1220 to the first lower cap member 1230 as described above, it is possible to improve the structural stability of the first module 1200A. The internal guide 1240 may be manufactured separately from the pre-treatment internal filter member 1060 and configured to support the inner surface of the pre-treatment internal filter member 1060 in an assembly process of the first module 1200A, but is not necessarily limited thereto, and the internal guide 1240 may be formed integrally with the pre-treatment internal filter member 1060 or configured so that the pre-treatment internal filter member 1060 is disposed outward in the radial direction r in a state of being formed integrally with the first upper cap member 1220 and the first lower cap member 1230.

In addition, as illustrated in FIGS. 3 and 4, in the water purifier provided with the composite filter according to one embodiment of the present invention, the internal guide 1240 may be disposed to be spaced apart from the outer surface of the spiral wound type internal filter member 1070 so that the first purified water flow path PC1 through which the first purified water C1 flows is formed to extend to a lower portion of the spiral wound type internal filter member 1070. In other words, since the internal guide 1240 is disposed to be spaced apart from the outer surface of the spiral wound type internal filter member 1070, the first purified water flow path PC1 through which the first purified water C1 flows is stably formed between the internal guide 1240 and the spiral wound type internal filter member 1070, and since the first purified water flow path PC1 is formed to extend to the lower portion of the spiral wound type internal filter member 1070, the first purified water C1 flowing into the first module 1200A through the first purified water through holes 1240$a$ formed in the internal guide 1240 stably flows to the lower portion of the spiral wound type internal filter member 1070, thereby improving the operational stability of the water purifier.

Meanwhile, as illustrated in FIGS. 3 and 4, in the water purifier provided with the composite filter according to one embodiment of the present invention, the first module 1200A may further include a second upper cap member 1250 disposed to be stacked on the first upper cap member 1220 and disposed to be spaced apart from the first upper cap member 1220 so that the raw water flow path PW1 is formed, and the second upper cap member 1250 may include a second downward support guide 1252 disposed to extend to the first lower cap member 1230. In other words, since the second upper cap member 1250 is disposed to be spaced apart from an upper portion of the first upper cap member 1220 so that the raw water flow path PW1 is formed stably, it is possible to secure a smooth flow of the received raw water W1, and since the second downward support guide 1252 is disposed to extend to the first lower cap member 1230, it is possible to prevent the raw water W1 flowing into the first module 1200A from being mixed with the received externally treated water C2' while leaked to the outside of the first module 1200A, thereby preventing the water qualities of the externally treated water C2' and the third purified water C3 and improving user satisfaction. Meanwhile, the second upper cap member 1250 may be disposed to be spaced apart from an inner surface of the housing unit 1100 so that the externally treated water flow path PC2' is formed.

In this case, as illustrated in FIGS. 3 and 4, in the water purifier provided with the composite filter according to one embodiment of the present invention, the first upper cap member 1220 may include at least two first support protrusions 1220$a$ formed to protrude outward in the radial direction r from an outer circumferential thereof, and the first support protrusions 1220$a$ may be disposed to be spaced an equal distance from each other. In other words, since the first support protrusions 1220$a$ formed to protrude outward in the radial direction r from the outer circumferential surface of the first upper cap member 1220 are provided so that the first upper cap member 1220 supports an inner surface of the second upper cap member 1250, it is possible to secure the raw water flow path PW1 so that the raw water W1 flows along the periphery of the first upper cap member 1220, and since the first support protrusions 1220$a$ are disposed at equal distances so that the raw water W1 may flow equally in a circumferential direction of the first upper cap member 1220, it is possible to improve product reliability through the improvement in flow of the raw water W1. Meanwhile, an O-ring OR for preventing leak of the received raw water W1 may be provided on the outer circumferential surface of the first lower cap member 1230.

In addition, as illustrated in FIGS. 3 and 4, in the water purifier provided with the composite filter according to one embodiment of the present invention, the second upper cap member 1250 may include a second upward guide 1251 disposed to be spaced a predetermined distance from the first upward guide 1221 so that the raw water flow path PW1 through which the received raw water W1 flows is formed. In other words, since the received raw water W1 flows through the raw water flow path PW1 formed between the second upward guide 1251 provided in the second upper cap member 1250 and the first upward guide 1221 provided in the first upper cap member 1220, it is possible to prevent the received raw water W1 from being mixed with the received externally treated water C2' or the discharged residential water W2, thereby improving the operational stability of the water purifier.

In this case, as illustrated in FIGS. 4 and 7, in the water purifier provided with the composite filter according to one embodiment of the present invention, the first partition wall 1111 may be disposed to extend in the axial direction a along the second upward guide 1251. In this case, the first partition wall 1111 may be formed to extend in the axial direction a along the second upward guide 1251, and when the head member 1110 and the body member 1120 are coupled, the head member 1110 and the body member 1120 may be coupled by a method in which the first partition wall 1111 covers an outer surface of the second upward guide 1251, coupled by a method in which the first partition wall 1111 is fitted into an inner surface of the second upward guide 1251, or coupled by a method in which the first partition wall 1111 is seated on an upper end of the second upward guide 1251. In other words, since the first partition wall 1111 is disposed to extend in the axial direction a along the second upward guide 1251, it is possible to prevent the received raw water W1 from being mixed with the received externally treated water C2', thereby improving the operational stability of the water purifier.

Meanwhile, as illustrated in FIGS. 3 and 4, in the water purifier provided with the composite filter according to one embodiment of the present invention, the second module 1200B may include a third upper cap member 1260 and a third lower cap member 1270 in which the post-treatment internal filter member 1090 is disposed fixedly, and the discharge tube member 1210 may be disposed to extend upward from the third lower cap member 1270 and pass through the third upper cap member 1260. A third purified water through hole 1210a may be formed in the discharge tube member 1210 so that the third purified water C3 passing through the post-treatment internal filter member 1090 flows into the discharged tube member 1210. In other words, it is possible to enable a sub assembly of the second module 1200B through the third upper cap member 1260 and the third lower cap member 1270, thereby improving workability, and since the discharge tube member 1210 is disposed to extend upward from the third lower cap member 1270 and pass through the third upper cap member 1260, it is possible to stably form the third purified water flow path PC3 in the process of arranging the first module 1200A and the second module 1200B to be stacked, thereby improving productivity. In this case, a third downward support guide 1262 extending downward in the axial direction a may be formed in the third upper cap member 1260. The third downward support guide 1262 may include a 3-1 downward support guide 1262a for fixing the outside of the post-treatment internal filter member 1090 in the radial direction r and a 3-2 downward support guide 1262b for fixing the inside of the post-treatment internal filter member 1090 in the radial direction r. In addition, a third upward support guide 1271 extending upward in the axial direction a may be formed in the third lower cap member 1270. The third upward support guide 1271 may include a 3-1 upward support guide 1271a for fixing the outside of the post-treatment internal filter member 1090 in the radial direction r and a 3-2 upward support guide 1271b for fixing the inside of the post-treatment internal filter member 1090 in the radial direction r. In other words, the post-treatment internal filter member 1090 is fixed stably through the third upward support guide 1271 and the third downward support guide 1262, thereby improving the durability of the water purifier.

In addition, as illustrated in FIGS. 3 and 4, in the water purifier provided with the composite filter according to one embodiment of the present invention, a connector member 1280 coupling the first module 1200A to the second module 1200B may be provided, and the connector member 1280 may include a connector body 1281 fixedly press-fitted into the first lower cap member 1230, an upward rib 1282 extending upward from the connector body 1281 to be coupled to the central tube 1071, and a downward rib 1283 extending downward from the connector body 1281 to be coupled to the third upper cap member 1260. In other words, basically, the first module 1200A and the second module 1200B are simply coupled by a method of coupling the upward rib 1282 extending upward from the connector body 1281 to the central tube 1071 and coupling the downward rib 1283 extending downward from the connector body 1281 to the third upper cap member 1260 in a state in which the connector body 1281 of the connector member 1280 is fixedly press-fitted into the first lower cap member 1230, thereby improving productivity. In this case, an O-ring OR for preventing leak of the first purified water C1 and the third purified water C3 may be provided on an outer circumferential surface of the connector body 1281 of the connector member 1280, an inner circumferential surface of the upward rib 1282, and an inner circumferential surface of the downward rib 1283.

In this case, as illustrated in FIGS. 3 and 4, in the water purifier provided with the composite filter according to one embodiment of the present invention, the third upper cap member 1260 may include a third upward guide 1261 extending upward in the axial direction a to be coupled to the inner surface of the downward rib 1283, and the third upward guide 1261 may be configured to have an outer diameter that is the same as a diameter of the central tube 1071. In other words, since the third upward guide 1261 is formed to extend upward in the axial direction a, it is possible to facilitate the coupling between the connector member 1280 and the third upper cap member 1260, thereby securing workability, and in particular, when the outer diameter of the third upward guide 1261 is formed identically to the diameter of the central tube 1071, the upward rib 1282 and the downward rib 1283 may be formed in a symmetrical shape, and thus even when the connector member 1280 flips over to be coupled in the process of coupling the first module 1200A to the second module 1200B by a worker using the connector member 1280, it is possible to enable the stable coupling, thereby improving productivity through misassembly prevention.

Figure 8:
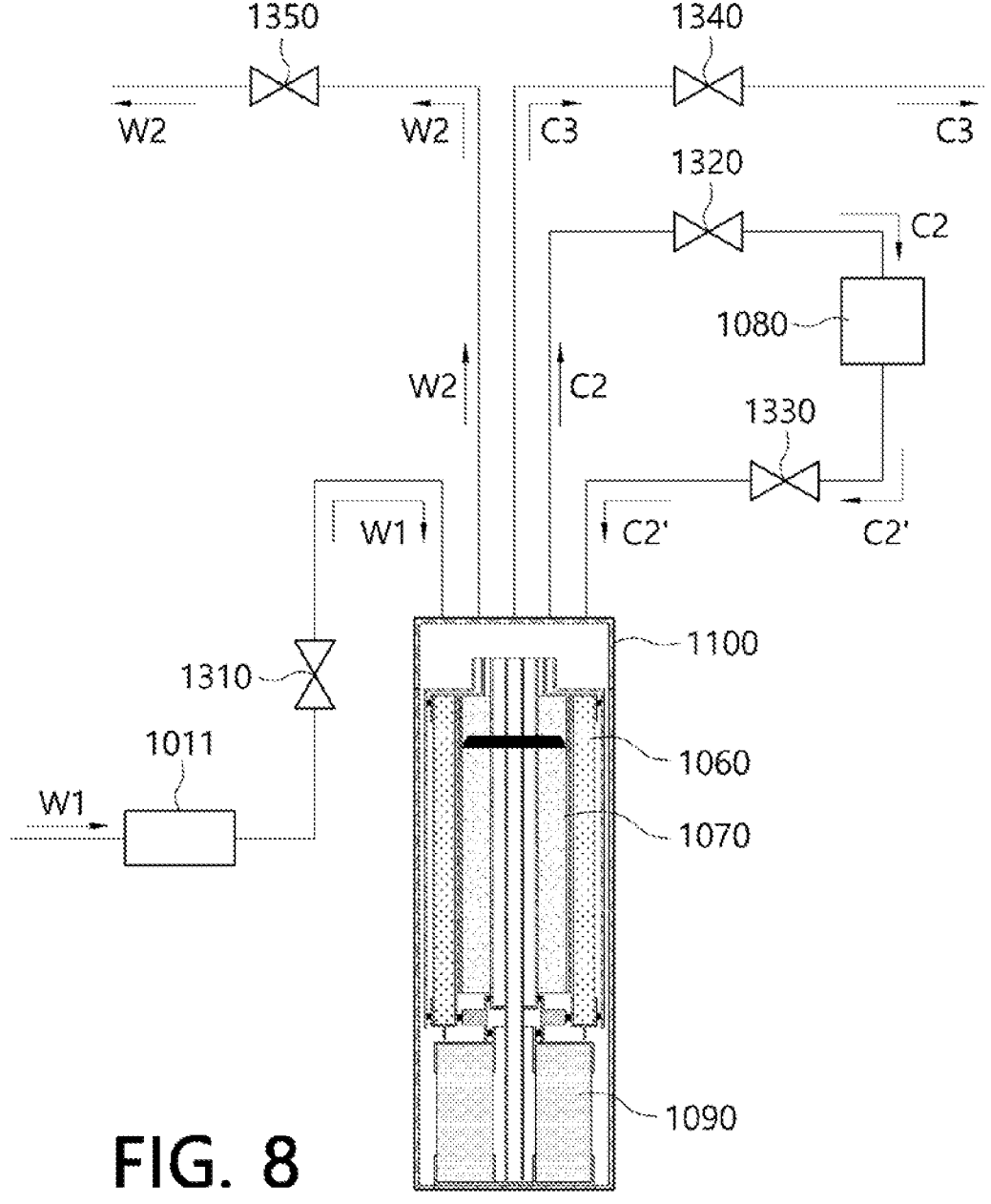
FIG. 8 is a configuration diagram illustrating an entire water piping diagram of the water purifier provided with the composite filter according to one embodiment of the present invention.

FIG. 8 is a configuration diagram illustrating an entire water piping diagram of the water purifier provided with the composite filter according to one embodiment of the present invention.

As illustrated in FIG. 8, the water purifier provided with the composite filter according to one embodiment of the present invention may further include a valve unit 1300 for controlling flows of the raw water W1, the second purified water C2, the externally treated water C2', the third purified water C3, and the residential water W2, and a control unit 1400 for controlling an operation of the valve unit 1300. The valve unit 1300 may include a first valve 1310 for controlling the flow of the raw water W1, a second valve 1320 for controlling the flow of the second purified water C2, a third valve 1330 for controlling the flow of the externally treated water C2', a fourth valve 1340 for controlling the flow of the third purified water C3, and a fifth valve 1350 for controlling the flow of the residential water W2. In this case, the received raw water W1 flows in a state in which a pressure is reduced while passing through a pressure reducing valve 1011. In other words, the control unit 1400 may control the flows of the raw water W1, the second purified water C2, the externally treated water C2', the third purified water C3, and the residential water W2 by controlling the valve unit 1300 and can effectively prevent these fluids from flowing back, thereby securing product reliability.

As described above, in the water purifier provided with the composite filter according to the present invention, as the water purifier may not only receive the raw water W1, discharge the second purified water C2, receive the externally treated water C2', and discharge the third purified water C3, but also discharge the residential water W2, it is possible to enable the implementation of an additional function using the external treatment member 1080 in the process in which the raw water W1 passes through the composite filter, by constituting the composite filter by integrating three internal filter members including the spiral wound type internal filter member 1070, it is possible to facilitate the miniaturization and replacement of the water purifier, thereby improving a user's convenience, by constituting the composite filter by the method of modularizing each filter through the first module 1200A in which the pre-treatment internal filter member 1060 and the spiral wound type internal filter member 1070 are provided and the second module 1200B in which the post-treatment internal filter member 1090 is provided and arranging the first module 1200A and the second module 1200B to be stacked, it is possible to improve productivity, by arranging the discharge tube member 1210 to pass through a central portion of the first module 1200A so that the third purified water C3 generated from the second module 1200B disposed under the first module 1200A is discharged to the outside, it is possible to prevent the third purified water C3 from being mixed with the second purified water C2, thereby securing the operational stability of the water purifier, and by providing the first to fourth partition walls 1111, 1112, 1113, and 1114 so that the independent flow paths for preventing the raw water W1, the second purified water C2, the externally treated water C2', the third purified water C3, and the residential water W2 from being mixed are formed to concentrate the tubes through which the raw water W1, the second purified water C2, the externally treated water C2', the third purified water C3, and the residential water W2 flow on an upper portion of the composite filter, thereby improving the degree of freedom in layout design of other portions.

Figure 9:
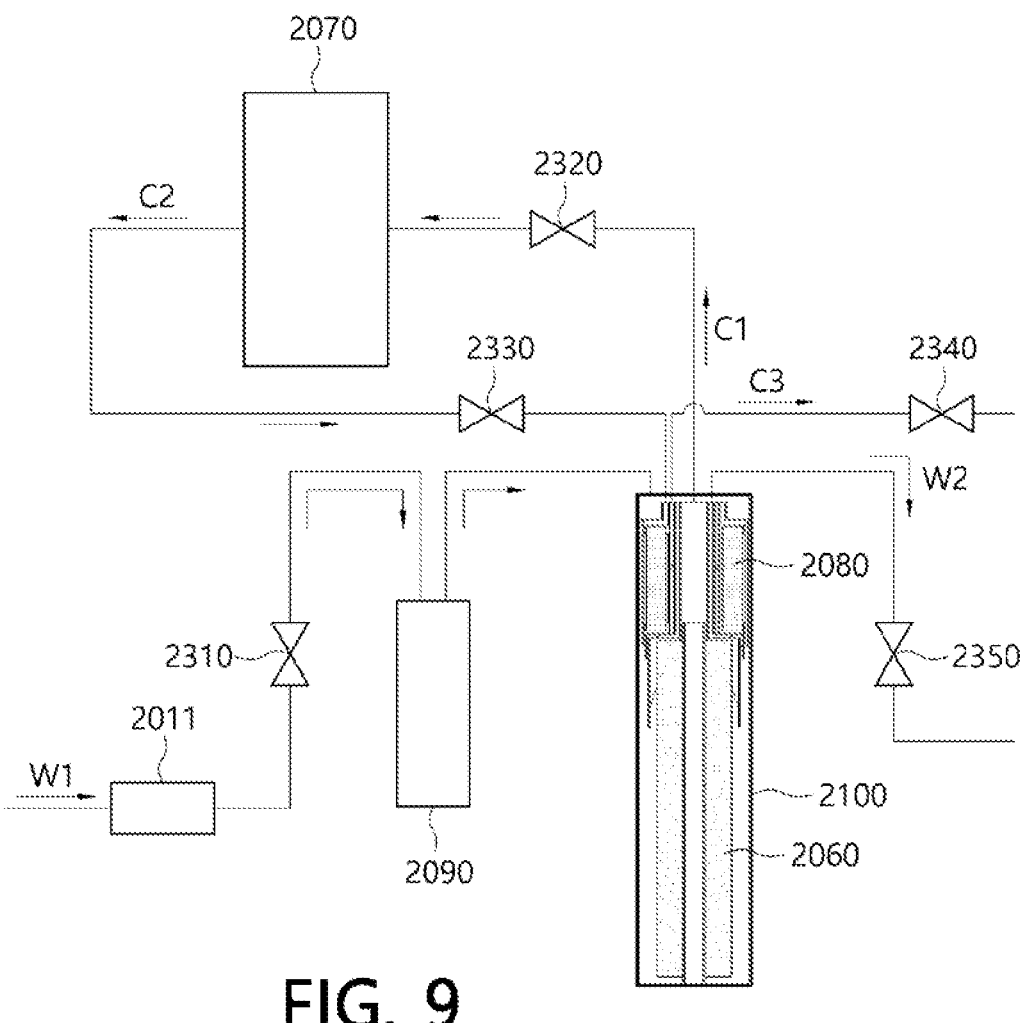
FIG. 9 is a configuration diagram illustrating an entire water piping diagram of a water purifier provided with a composite filter according to another embodiment of the present invention.
Figure 10:
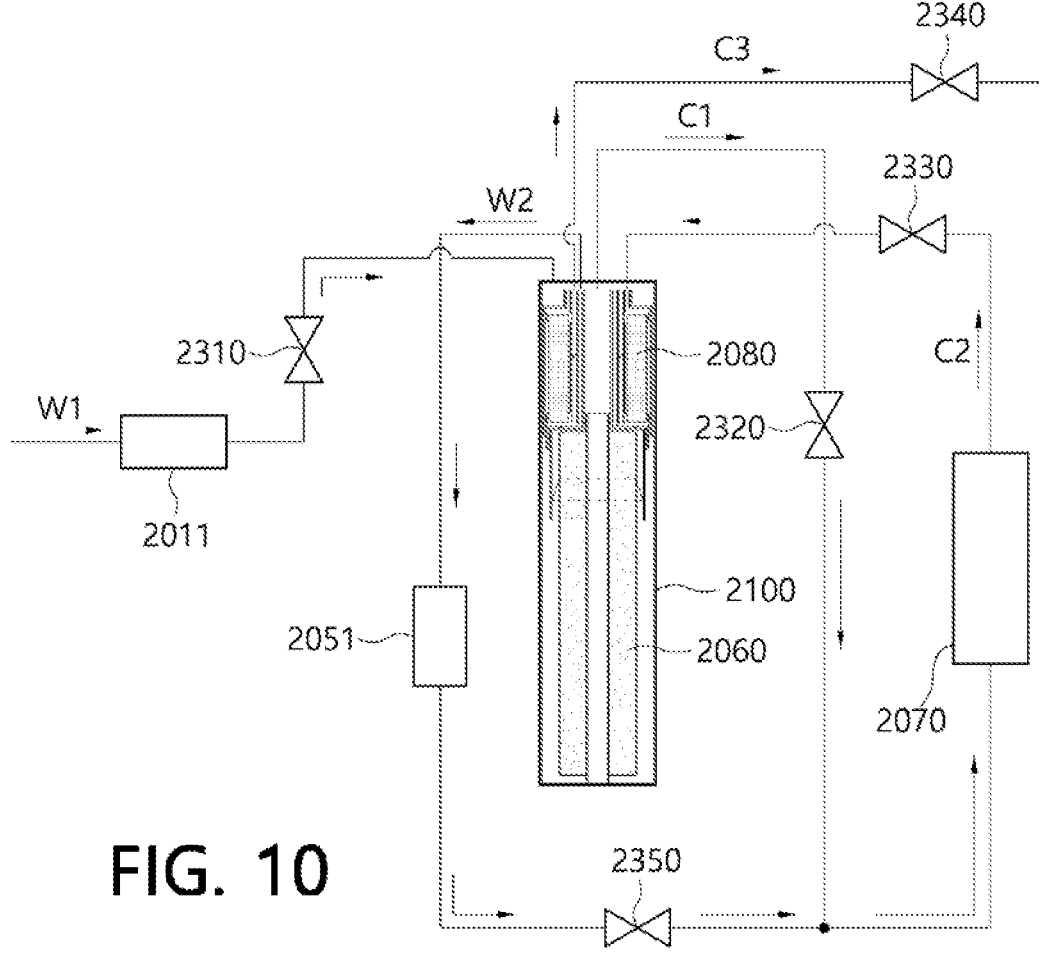
FIG. 10 is a configuration diagram illustrating an entire water piping diagram of a water purifier provided with a composite filter according to still another embodiment of the present invention.
Figure 11:
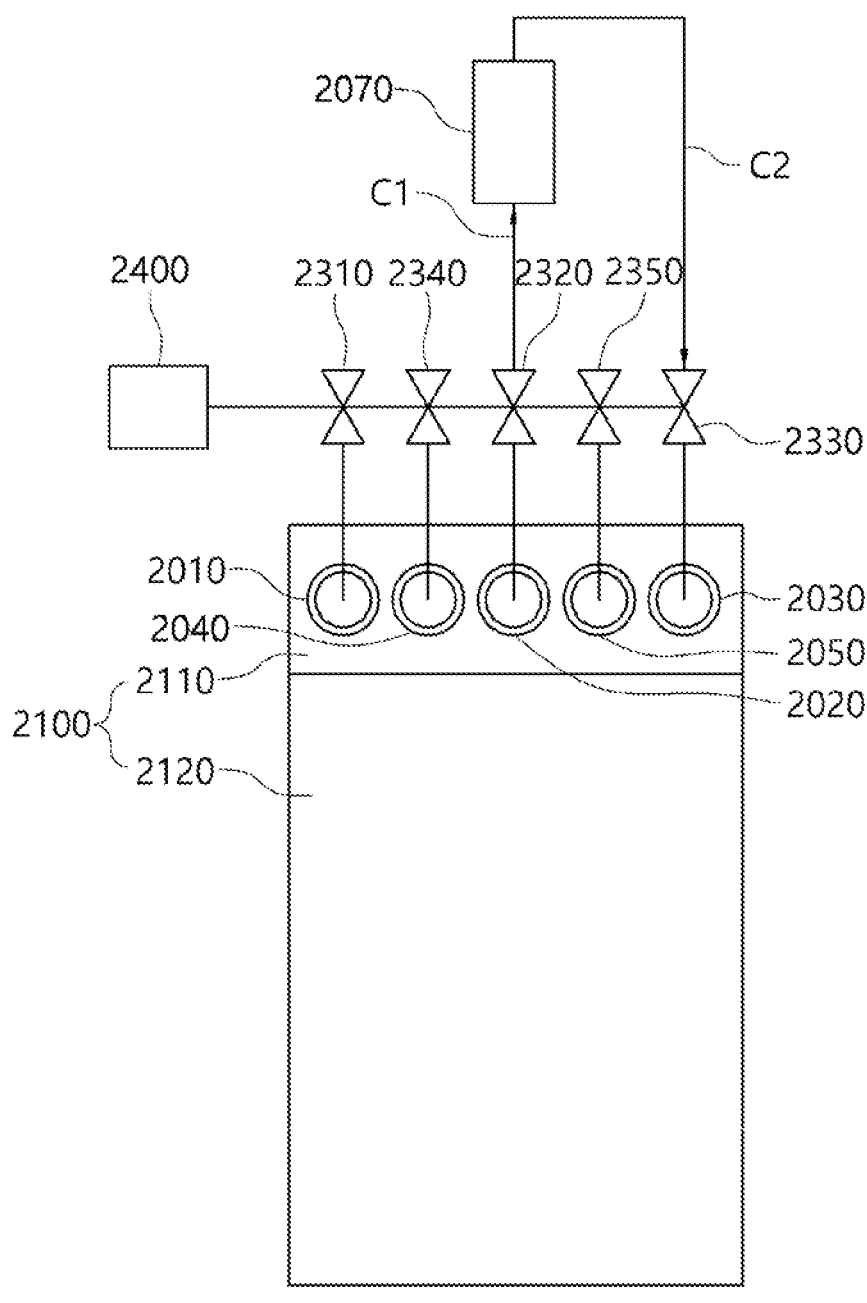
FIG. 11 is a configuration diagram illustrating the water purifier provided with the composite filter according to another embodiment of the present invention.
Figure 12:
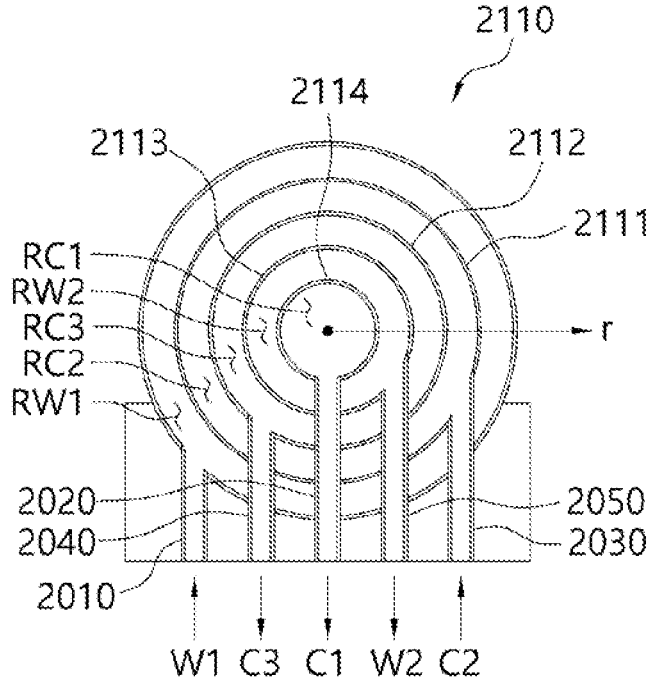
FIG. 12 is a plan view illustrating a head member of the water purifier provided with the composite filter according to another embodiment of the present invention.
Figure 13:
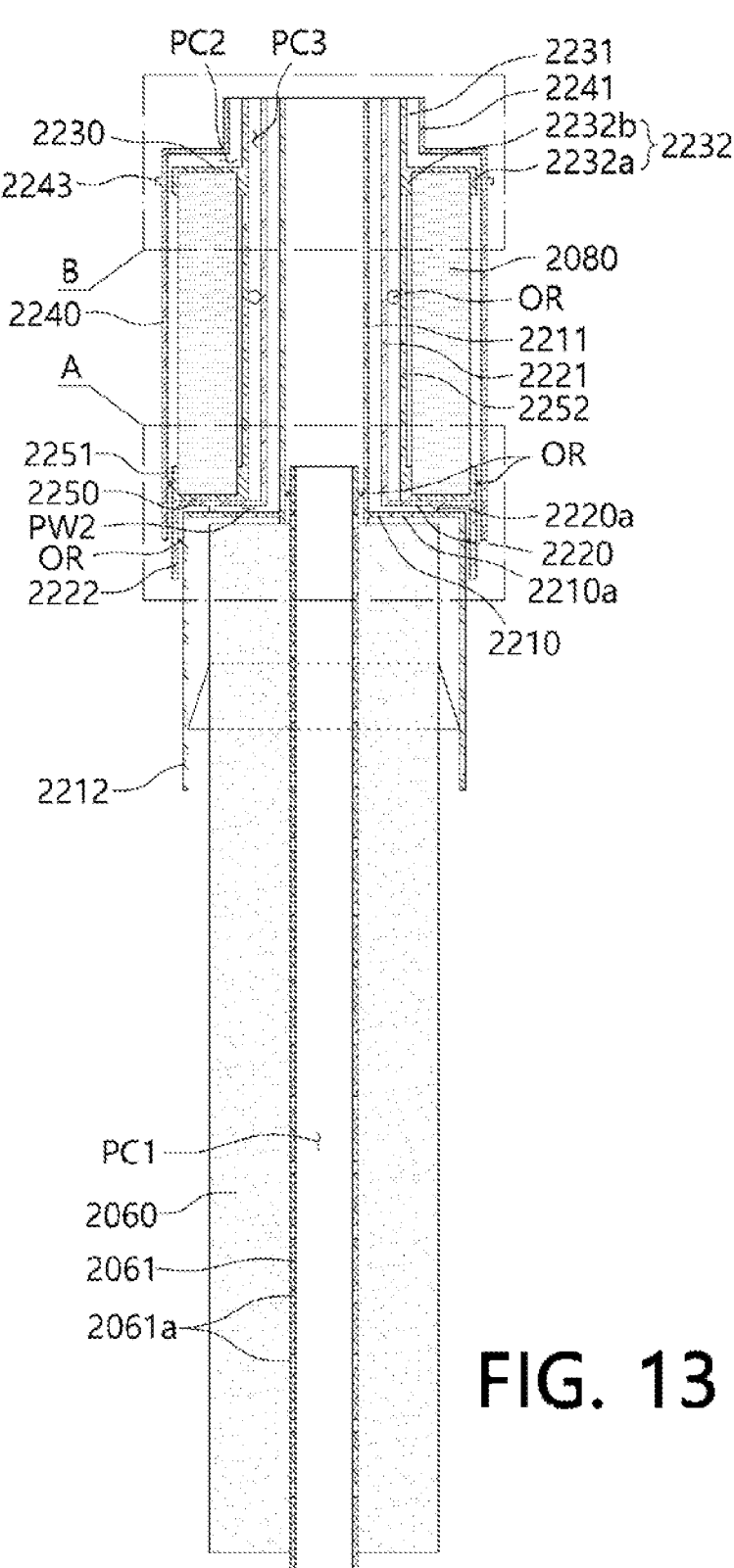
FIG. 13 is a cross-sectional view illustrating a filtering unit of the water purifier provided with the composite filter according to another embodiment of the present invention.
Figure 14:
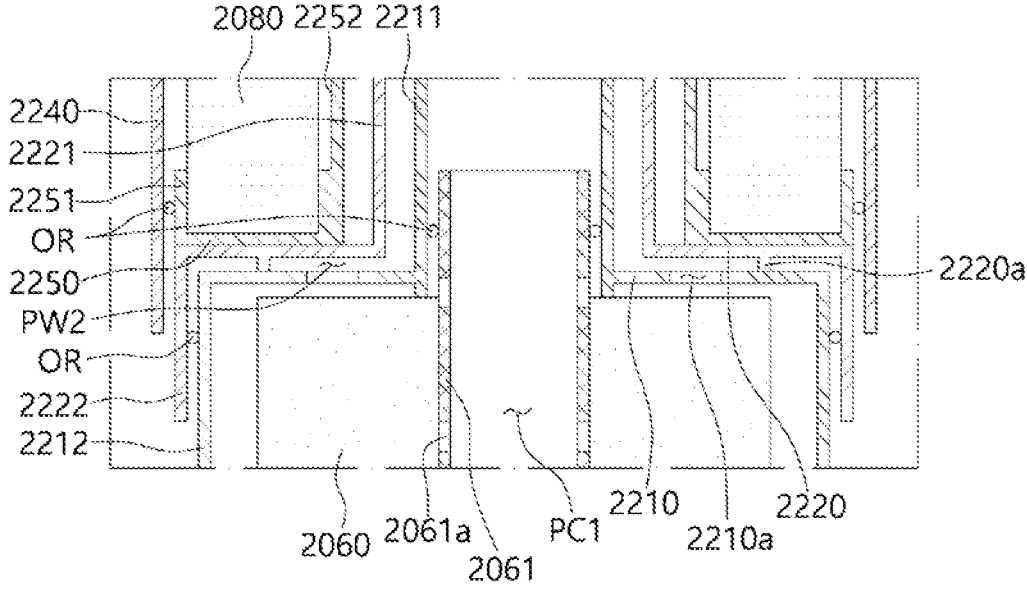
FIG. 14 is an enlarged cross-sectional view illustrating portion A in FIG. 13.
Figure 15:
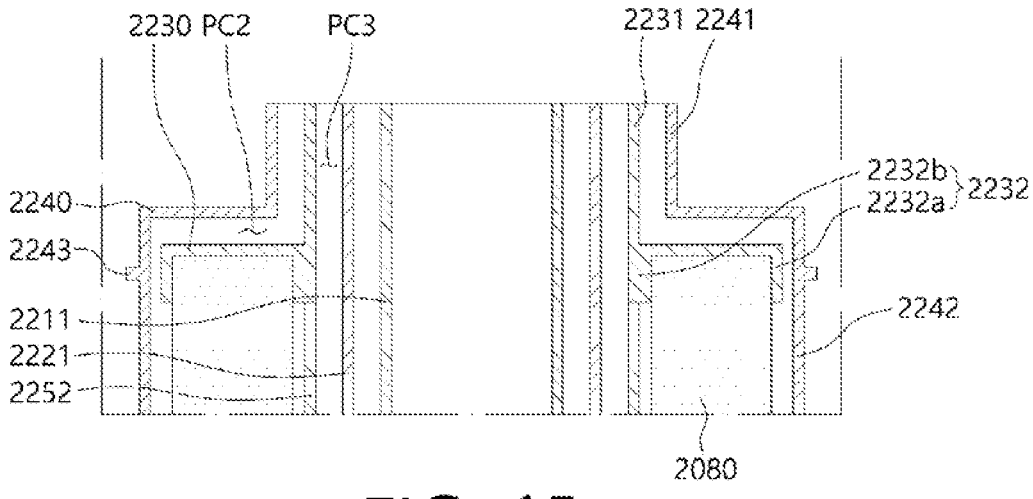
FIG. 15 is an enlarged cross-sectional view illustrating portion B in FIG. 13.

FIG. 9 is a configuration diagram illustrating an entire water piping diagram of a water purifier provided with a composite filter according to another embodiment of the present invention, FIG. 10 is a configuration diagram illustrating an entire water piping diagram of a water purifier provided with a composite filter according to still another embodiment of the present invention, FIG. 11 is a configuration diagram illustrating the water purifier provided with the composite filter according to another embodiment of the present invention, FIG. 12 is a plan view illustrating a head member of the water purifier provided with the composite filter according to another embodiment of the present invention, FIG. 13 is a cross-sectional view illustrating a filtering unit of the water purifier provided with the composite filter according to another embodiment of the present invention, FIG. 14 is an enlarged cross-sectional view illustrating portion A in FIG. 13, and FIG. 15 is an enlarged cross-sectional view illustrating portion B in FIG. 13.

As illustrated in FIG. 9, in the water purifier provided with the composite filter according to another embodiment of the present invention, the received raw water W1 flows in a state in which a pressure is reduced while passing through a pressure reducing valve 2011. In this case, the water purifier may be configured so that the received raw water W1 is filtered while passing through a separate pre-treatment filter 2090 such as a sediment filter or a carbon filter. The received raw water W1 flows to a spiral wound type internal filter member 2060. In this case, the spiral wound type internal filter member 2060 may be a spiral wound type reverse osmosis filter. The first purified water C1 filtered while passing through the spiral wound type internal filter member 2060 may be reverse osmosis treated water, and the first purified water W1 flows to an external filter 70 after discharged to the outside. The external filter 70 may be a mineral filter. In other words, the first purified water C1 such as reverse osmosis treated water is in a state in which all ions are removed, but by allowing the first purified water C1 to pass through a functional filter such as a mineral filter, the second purified water C2 may contain sufficient mineral. In other words, even when ions are removed by the reverse osmosis filter in the process in which the raw water W1 passes through the composite filter, it is possible to enable the implementation of an additional function adding mineral using the external filter 70 such as a mineral filter. The second purified water C2 flows to a post-treatment internal filter member 2080. The post-treatment internal filter member 2080 may be a carbon filter. In this case, the external filter 70 may be replaced with a separate purified water tank. In other words, since the first purified water C1 discharged to the outside is stored in a purified water tank, and the water purifier is configured so that the first purified water C1 stored in the purified water tank is discharged in a state of passing through the post-treatment internal filter member 2080 such as a carbon filter in a processing of providing drinking water to the user, it is possible to improve user satisfaction through the improvement in water quality. In this case, both the external filter 70 and the purified water tank may be disposed. In addition, the residential water W2 generated in the process in which the raw water W1 passes through the spiral wound type internal filter member 2060 is discharged to the outside. A first valve 2310 for controlling the flow of the raw water W1, a second valve 2320 for controlling the flow of the first purified water C1, a third valve 2330 for controlling the flow of the second purified water C2, a fourth valve 2340 for controlling the flow of the third purified water C3, and a fifth valve 2350 for controlling the flow of the residential water W2 may be provided in a valve unit 2300 to be described below.

Alternatively, as illustrated in FIG. 10, in the water purifier provided with the composite filter according to another embodiment of the present invention, the received raw water W1 flows in a state in which a pressure is reduced while passing through the pressure reducing valve 2011, and the flowing raw water W1 flows to the spiral wound type internal filter member 2060. In this case, the spiral wound type internal filter member 2060 may be a spiral wound type hollow fiber membrane filter capable of functioning as a pre-treatment filter. The first purified water C1 filtered while passing through the spiral wound type internal filter member 2060 may be ultra filtration (UF) treated water, and the first purified water W1 flows to the external filter 70 after discharged to the outside. The external filter 70 may be a reverse osmosis filter capable of functioning as a main filter. In other words, by allowing the first purified water C1 such as UF treated water to pass through the main filter such as a reverse osmosis filter, the user can safely drink the second purified water C2. In other words, by allowing the raw water W1 to pass through the external filter 70 such as a reverse osmosis filter after pre-treated by the hollow fiber membrane filter in the process of passing through the composite filter, it is possible to enable the implementation of the additional function of allowing the user to safely drink water. The second purified water C2 flows to the post-treatment internal filter member 2080. The post-treatment internal filter member 2080 may be a carbon filter. By constituting the water purifier so that the second purified water C2 is discharged in a state of passing through the post-treatment internal filter member 2080 such as a carbon filter, it is possible to improve user satisfaction through the improvement in water quality. In addition, the residential water W2 generated in the process in which the raw water W1 passes through the spiral wound type internal filter member 2060 may be UF residential water, and the UF residential water may be used as sterilized water sterilizing the external filter 70 such as a reverse osmosis filter and the water pipe after passing through a separate sterilization module 2051 dispose outside. The sterilization module 2051 may be a UV sterilization filter or a separate sterilization unit. In this case, the water purifier may be configured so that the UF residential water is simply discharged to the outside. The first valve 2310 for controlling the flow of the raw water W1, the second valve 2320 for controlling the flow of the first purified water C1, the third valve 2330 for controlling the flow of the second purified water C2, the fourth valve 2340 for controlling the flow of the third purified water C3, and the fifth valve 2350 for controlling the flow of the residential water W2 may be provided in the valve unit 2300 to be described below.

As illustrated in FIGS. 11 to 15, the water purifier provided with the composite filter according to the embodiment of the present invention may include a housing unit 2100 including a raw water receiving port 2010 through which the raw water W1 is received, a first purified water discharging port 2020 through which the filtered first purified water C1 is discharged, a second purified water receiving port 2030 through which the externally filtered second purified water C2 is received, a third purified water discharging port 2040 through which the filtered third purified water C3 is discharged, and a residential water discharging port 2050 through which the residential water generated in the filtering process is discharged, and a filtering unit 2200 including the spiral wound type internal filter member 2060 disposed inside the housing unit 2100 to filter the raw water W1 and generate the first purified water C1, an external filter member 2070 disposed outside the housing unit 2100 to filter the first purified water C1 and generate the second purified water C2, and the post-treatment internal filter member 2080 disposed inside the housing unit 2100 to filter the second purified water C2 and generate the third purified water C3.

As described above, the raw water W1 received through the raw water receiving port 2010 may be filtered while sequentially passing through the spiral wound type internal filter member 2060, the external filter member 2070, and the post-treatment internal filter member 2080 provided in the filtering unit 2200, and the finally filtered third purified water C3 may be provided to the user after discharged through the third purified water discharging port 2040. Alternatively, the finally filtered third purified water C3 may be stored in a separate purified water storage unit or supplied to a cold water generator, a hot water generator, and an ice generator to produce cold water, hot water, and ice. In addition, the residential water W2 generated from the spiral wound type internal filter member 2060 may be discharged to the outside of the housing unit 2100 through the residential water discharging port 2050 and then discharged to the outside of the water purifier through a separate tube. As described above, by constituting the water purifier to not only receive the raw water W1, discharge the first purified water C1, receive the second purified water C2, and discharge the third purified water C3, but also discharge the residential water W2, it is possible to enable the implementation of the additional function using the external filter member 2070 in the process in which the raw water W1 passes through the composite filter, and the composite filter may be configured by integrating the spiral wound type internal filter member 2060 such as a reverse osmosis filter or a hollow fiber membrane filter. In addition, the external filter member 2070 may include an electrodeionization type filter. The electrodeionization type includes an electro deionization (EDI), continuous electro deionization (CEDI), and capacitive deionization (CDI).

The housing unit 2100 may include a head member 2110 including a first partition wall 2111 for preventing the raw water W1 from being mixed with the second purified water C2, a second partition wall 2112 for preventing the second purified water C2 from being mixed with the third purified water C3, a third partition wall 2113 for preventing the third purified water C3 from being mixed with the residential water W2, and a fourth partition wall 2114 for preventing the residential water W2 from being mixed with the first purified water C1, and a body member 2120 which extends from the head member 2110 and in which the filtering unit 2200 is disposed. The first to fourth partition walls 2111, 2112, 2113, and 2114 are sequentially formed inward in the radial direction r. The filtering unit 2200 may include a first upper cap member 2210 under which the spiral wound internal filter member 2060 is fixedly disposed, and a second upper cap member 2220 disposed to be spaced a predetermined distance from an upper surface of the first upper cap member 2210 so that the residential water flow path PW2 through which the residential water W2 discharged from the spiral wound type internal filter member 2060 flows is provided. In other words, the water purifier may have a structure in which not only the received raw water W1 but also the discharged first purified water C1, the received second purified water C2, the discharged third purified water C3, and the discharged residential water W2 are received from the upper portion of the composite filter and discharged to the upper portion thereof, and to this end, the head member 2110 may include the raw water area RW1, the first purified water area RC1, the second purified water area RC2, the third purified water area RC3, and the residential water area RW2 in which the received raw water W1, the discharged first purified water C1, the received second purified water C2, the discharged third purified water C3, and the discharged residential water W2 flow, respectively. The first upper cap member 2210 and the second upper cap member 2220 may be disposed to be stacked, and the second upper cap member 2220 may be disposed to be spaced a prede-termined distance from the first upper cap member 2210 so that the residential water flow path PW2 through which the residential water W2 discharged from the spiral wound type internal filter member 2060 flows is formed between the first upper cap member 2210 and the second upper cap member 2220, and to this end, a spacer 2220*a* formed to extend downward from a lower surface of the second upper cap member 2220 may be provided. As described above, the first to fourth partition walls 2111, 2112, 2113, and 2114 may be sequentially formed inward in the radial direction r in the head member 2110 so that the independent flow paths for preventing the raw water W1, the first purified water C1, the second purified water C2, the third purified water C3, and the residential water W2 from being mixed are formed to concentrate tubes through which the raw water W1, the first purified water C1, the second purified water C2, the third purified water C3, and the residential water W2 flow on an upper portion of the composite filter, thereby improving a degree of freedom in layout design of other portions. In addition, since the first upper cap member 2210 and the second upper cap member 2220 are disposed to be stacked and a first through hole 2210*a* for allowing the inside of the spiral wound type internal filter member 2060 to commu-nicate with the residential water flow path PW2 so that the residential water W2 discharged from the spiral wound type internal filter member 2060 disposed under the first upper cap member 2210 flows therethrough is provided in the first upper cap member 2210, it is possible to enable miniatur-ization with a reduction in height of the composite filter in the axial direction and improve productivity with a simpli-fied configuration.

Figure 16:
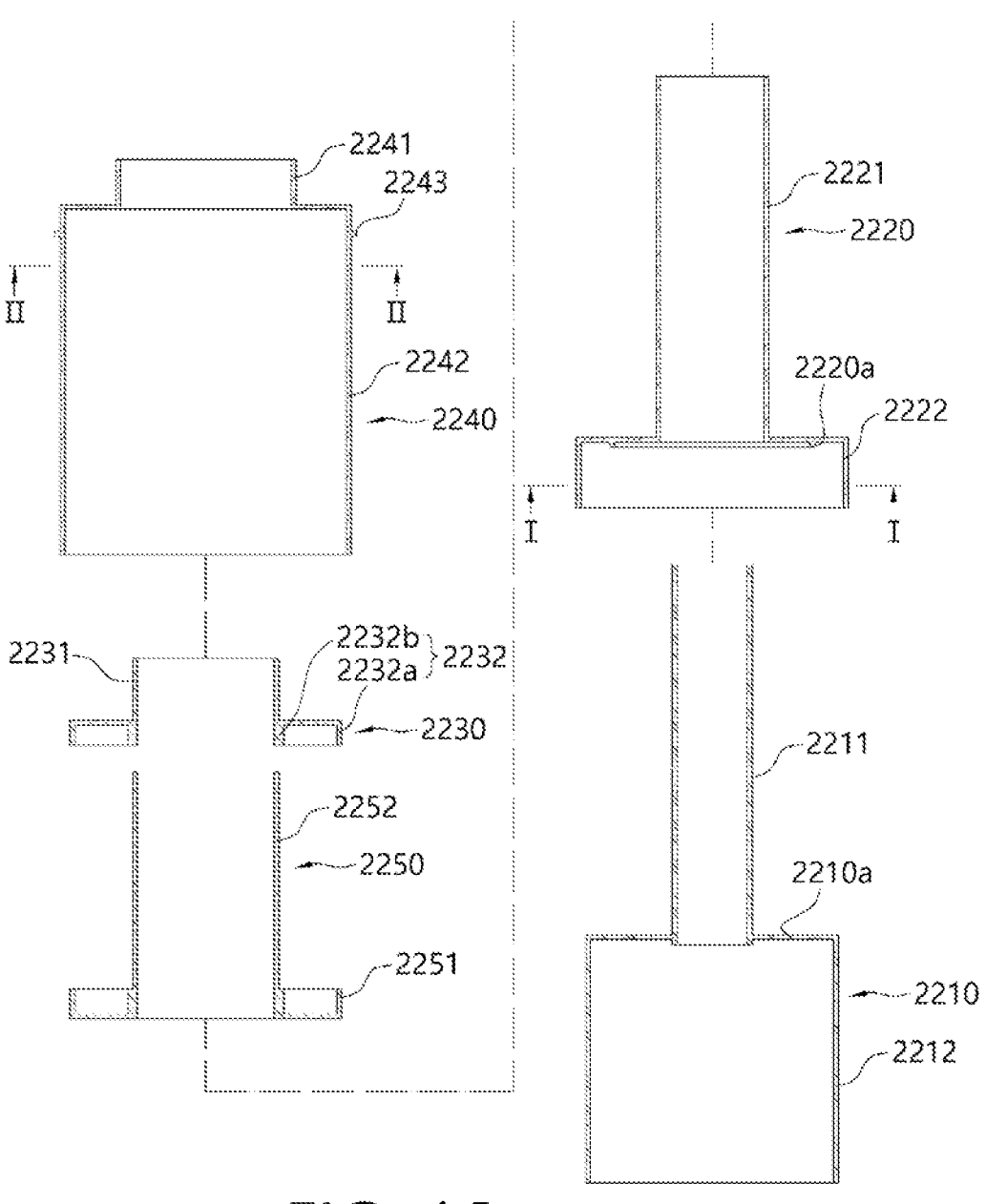
FIG. 16 is a cross-sectional view illustrating a state in which first to fourth upper cap members and a lower cap member of the water purifier provided with the composite filter according to another embodiment of the present invention are disassembled.
Figure 17:
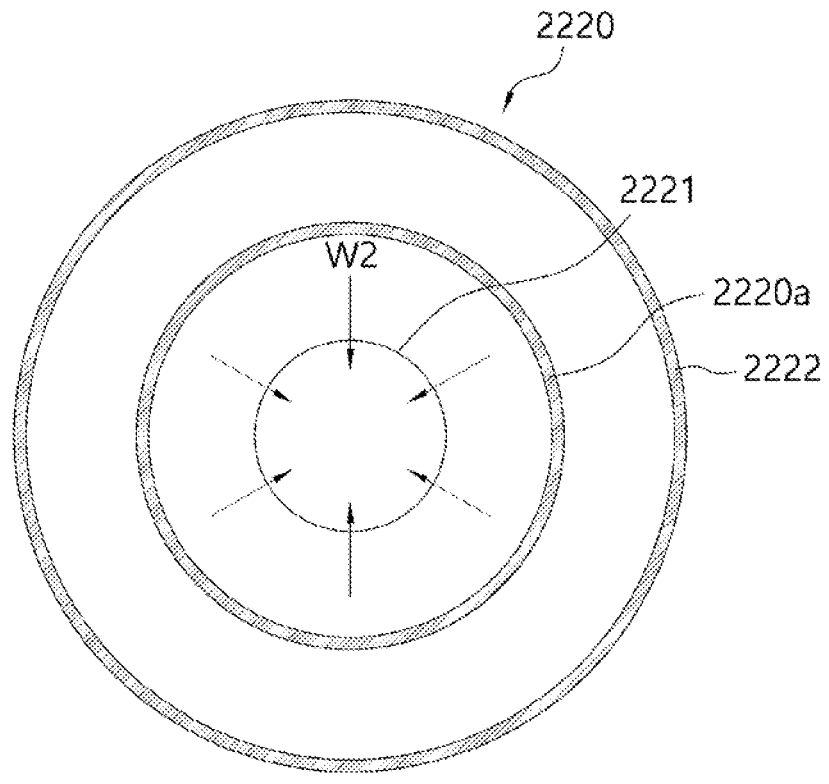
FIG. 17 is a cross-sectional view along line I-I in FIG. 16.
Figure 18:
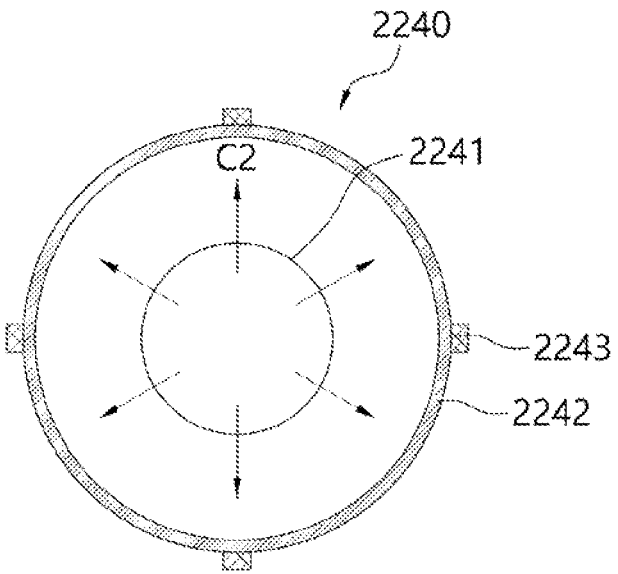
FIG. 18 is a cross-sectional view along line II-II in FIG. 16.

FIG. 16 is a cross-sectional view illustrating a state in which first to fourth upper cap members and a lower cap member of the water purifier provided with the composite filter according to another embodiment of the present inven-tion are disassembled, FIG. 17 is a cross-sectional view along line I-I in FIG. 16, and FIG. 18 is a cross-sectional view along line II-II in FIG. 16.

As illustrated in FIGS. 13 and 14, the water purifier provided with the composite filter according to another embodiment of the present invention, the first upper cap member 2210 may include a first upward guide 2211 extend-ing upward so that the first purified water C1 flows, the second upper cap member 2220 may include a second upward guide 2221 extending upward so that the residential water W2 flows, and the first upward guide 2211 and the second upward guide 2221 may be disposed to be spaced a predetermined distance from each other so that the residen-tial water flow path PW2 is formed to extend. In other words, since the water purifier is configured so that the first purified water C1 flows in the first upward guide 2211 formed in the first upper cap member 2210, the discharged residential water W2 flows in the second upward guide 2221 formed in the second upper cap member 2220, and the first upper cap member 2210 and the second upper cap member 2220 are spaced the predetermined distance from each other so that the residential water flow path PW2 is formed, it is possible to form the independent flow path in which the first purified water C1 and the residential water W2 are not mixed and improve productivity through configuration simplifica-tion. In this case, as illustrated in FIGS. 16 and 17, the spacer 2220*a* extending downward from the lower surface of the second upper cap member 2220 may be formed to extend integrally in a circumferential direction to prevent the dis-charged residential water W2 from being mixed with the raw water W1 while flowing back.

In addition, as illustrated in FIGS. 13 and 14, in the water purifier provided with the composite filter according to the embodiment of the present invention, the first upper cap member 2210 may include a first downward guide 2212 extending downward so that the spiral wound type internal filter member 2060 is disposed fixedly. In other words, since the spiral wound type internal filter member 2060 is fixed stably through the first downward guide 2212 formed to extend downward from the lower surface of the first upper cap member 2210, it is possible to improve the durability of the water purifier, and since the water purifier is configured so that the residential water W2 generated through the spiral wound type internal filter member 2060 is discharged through the first through hole 2210*a*, it is possible to improve the operational stability of the water purifier. In this case, since a second downward guide 2222 extending down-ward to surround an outer circumferential surface of the first upper cap member 2210 may also be formed in the second upper cap member 2220, it is possible to enable the stable coupling between the first upper cap member 2210 and the second upper cap member 2220. An O-ring OR for prevent-ing the discharged residential water W2 from flowing back to the raw water flow path PW1 may be provided between the first downward guide 2212 and the second downward guide 2222.

As illustrated in FIGS. 13 and 15, in the water purifier provided with the composite filter according to another embodiment of the present invention, the filtering unit 2200 may include a third upper cap member 2230 disposed to be stacked to allow the post-treatment internal filter member 2080 to be fixed in a state of being disposed on the second upper cap member 2220, and a fourth upper cap member 2240 disposed to be spaced a predetermined distance from an upper surface of the third upper cap member 2230 so that the second purified water flow path PC2 through which the second purified water C2 received from the outside flows is provided. In other words, since the third upper cap member 2230 and the fourth upper cap member 2240 are disposed to be stacked and the water purifier is configured so that the second purified water C2 received from the outside flows through the second purified water flow path PC2 formed between the third upper cap member 2230 and the fourth upper cap member 2240 in a state in which the post-treatment internal filter member 2080 is fixedly disposed under the third upper cap member 2230, it is possible to improve productivity through configuration simplification.

In this case, as illustrated in FIGS. 13 and 15, in the water purifier provided with the composite filter according to the embodiment of the present invention, the third upper cap member 2230 may include a third upward guide 2231 extending upward so that the third purified water C3 flows, the fourth upper cap member 2240 may include a fourth upward guide 2241 extending upward so that the second purified water C2 flows, and the third upward guide 2231 and the fourth upward guide 2241 may be disposed to be spaced a predetermined distance from each other so that the second purified water flow path PC2 is formed to extend. In other words, since the water purifier is configured so that the third purified water C3 flows in the third upward guide 2231 formed in the third upper cap member 2230, the received second purified water C2 flows in the fourth upward guide 2241 formed in the fourth upper cap member 2240 and the third upper cap member 2230 and the fourth upper cap member 2240 are spaced the predetermined distance from each other so that the second purified water flow path PC2 is formed, it is possible to form the independent flow path in which the second purified water C2 and the third purified water C3 are not mixed and improve productivity through configuration simplification. In addition, since the second upward guide 2221 and the third upward guide 2231 may be disposed to be spaced a predetermined distance from each other so that the third purified water flow path PC3 through which the discharged third purified water C3 flows is formed between the second upward guide 2221 and the third upward guide 2231, it is possible to enable the stable discharge of the third purified water C3 and prevent the discharged third purified water C3 from being mixed with the discharged residential water W2.

In addition, as illustrated in FIGS. 13 and 15, in the water purifier provided with the composite filter according to the embodiment of the present invention, the third upper cap member 2230 may include a third downward guide 2232 extending downward so that the post-treatment internal filter member 2080 is disposed fixedly. The third downward guide 2232 may include a 3-1 downward guide 2232a provided outside in the radial direction r to fix the outside of the post-treatment internal filter member 2080 and a 3-2 downward guide 2232b provided inside in the radial direction r to fix the inside of the post-treatment internal filter member 2080. In other words, the post-treatment internal filter member 2080 is fixed stably through the third downward guide 2232 formed to extend downward from a lower surface of the third upper cap member 2230, thereby improving the durability of the water purifier.

In addition, as illustrated in FIGS. 13 and 15, in the water purifier provided with the composite filter according to the embodiment of the present invention, the fourth upper cap member 2240 may include a fourth downward guide 2242 extending downward to surround an outer circumferential surface of the third upper cap member 2230, and the fourth downward guide 2242 may be disposed to extend to an outer circumferential surface of the second upper cap member 2220. In other words, since the fourth downward guide 2242 formed to extend downward from a lower surface of the fourth upper cap member 2240 extends downward to surround the outer circumferential surface of the third upper cap member 2230 and is disposed to extend to the outer circumferential surface of the second upper cap member 2220, it is possible to stably fix the post-treatment internal filter member 2080, thereby improving the durability of the water purifier.

In this case, as illustrated in FIGS. 13 and 14, in the water purifier provided with the composite filter according to the embodiment of the present invention, the filtering unit 2200 may further include a lower cap member 2250 provided with a lower guide 2251 extending upward so that the post-treatment internal filter member 2080 is fixedly disposed in an upper portion of the filtering unit 2200. The lower cap member 2250 may include an auxiliary lower guide 2252 disposed inside in the radial direction r. The auxiliary lower guide 2252 may include a first portion for supporting the inside of the post-treatment internal filter member 2080, and a second portion disposed to be spaced apart from the inner surface of the post-treatment internal filter member 2080 inward in the radial direction r, and the auxiliary lower guide 2252 may have a step structure so that the first portion and the second portion are formed. The third purified water C3 flows through a separation space between the second portion and the post-treatment internal filter member 2080. In other words, the post-treatment internal filter member 2080 may be fixed stably through the lower guide 2251 formed to extend upward from an upper surface of the lower cap member 2250, thereby improving the durability of the water purifier. In addition, since the post-treatment internal filter member 2080 may be fixed through the third and fourth upper cap members 2230 and 2240 and the lower cap member 2250, it is possible to enable the modularization of the composite filter through the sub assembly, thereby improving workability. In this case, an O-ring OR for preventing the received second purified water C2 from flowing back to the raw water flow path PW1 may be provided between the fourth downward guide 2242 and the lower guide 2251.

Figure 19:
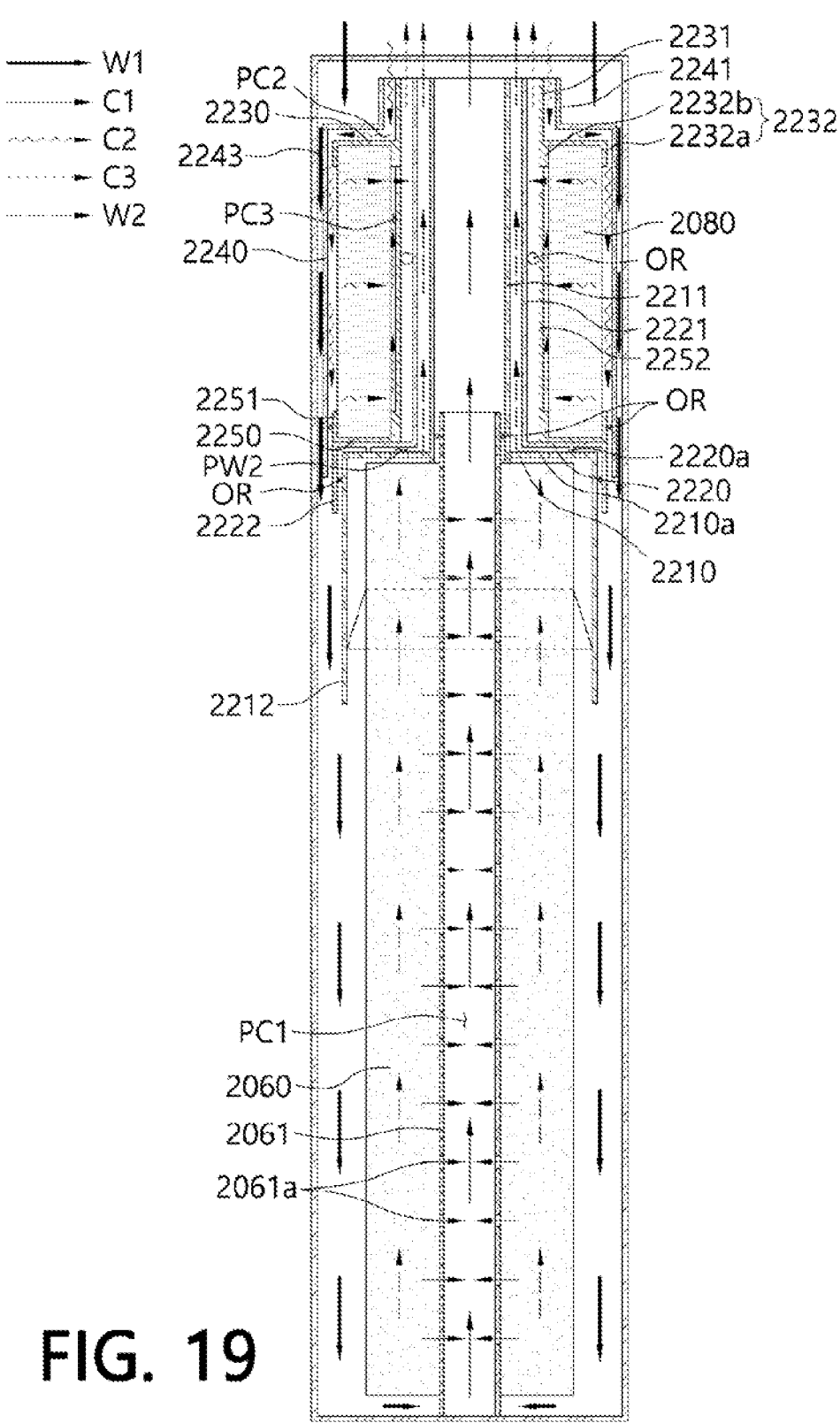
FIG. 19 is a cross-sectional view illustrating a state in which the filtering unit of the water purifier provided with the composite filter according to another embodiment of the present invention is installed in a housing unit.

FIG. 19 is a cross-sectional view illustrating a state in which the filtering unit of the water purifier provided with the composite filter according to another embodiment of the present invention is installed in a housing unit.

As illustrated in FIG. 19, in the water purifier provided with the composite filter according to the embodiment of the present invention, the raw water flow path PW1 through which the raw water W1 flows may be provided between an inner circumferential surface of the body member 2120 and an outer circumferential surface of the spiral wound type internal filter member 2060, and the spiral wound type internal filter member 2060 may be disposed to be spaced apart from a lower surface of the body member 2120 so that the raw water flow path PW1 is formed to extend inward in the radial direction r to the lower portion of the spiral wound type internal filter member 2060. In other words, since the raw water flow path PW1 may be formed between the body member 2120 and the spiral wound type internal filter member 2060 and the spiral wound type internal filter member 2060 is spaced apart from the lower surface of the body member 2120 so that the raw water flow path PW1 is formed to extend to the lower portion of the spiral wound type internal filter member 2060, the water purifier may be configured so that the raw water W1 may flow to the lower portion of the spiral wound type internal filter member 2060 and then pass through the spiral wound type internal filter member 2060, it is possible to secure the operational stability of the water purifier while the first purified water C1 and the residential water W2 are generated stably in a separated state.

As illustrated in FIG. 13, in the water purifier provided with the composite filter according to the embodiment of the present invention, the central tube 2061, which supports the spiral wound type internal filter member 2060 to be wound spirally and in which a second through hole 2061a is formed so that the first purified water C1 flows through the first purified water flow path PC1 formed inside the spiral wound type internal filter member 2060, may be provided on the inner circumferential surface of the spiral wound type internal filter member 2060. In other words, the first upper cap member 2210 may be seated on the spiral wound type internal filter member 2060 in a state in which the spiral wound type internal filter member 2060 is spirally wound around the central tube 2061, and the residential water W2 discharged to an upper surface of the spiral wound type internal filter member 2060 may flow to the residential water flow path PW2 through the first through hole 2210a and then be discharged to the outside. In this case, an O-ring OR for preventing the discharged residential water W2 from flowing into the first purified water flow path PC1 may be provided between an upper portion of the central tube 2061 and the first upward guide 2211. In addition, the first purified water C1 flowing through the inner surface of the spiral wound type internal filter member 2060 flows to the first purified water flow path PC1 through the second through hole 2061a of the central tube 2061. In other words, since the central tube 2061 is provided on the inner circumferential surface of the spiral wound type internal filter member 2060 and the spiral wound type internal filter member 2060 is disposed to be wound spirally and at the same time, configured so that the first purified water flow path PC1 formed inside the spiral wound type internal filter member 2060 is maintained stably, it is possible to secure the operational stability through the smooth flow of the first purified water C1.

In this case, as illustrated in FIG. 18, in the water purifier provided with the composite filter according to the embodiment of the present invention, the fourth upper cap member 2240 may include at least two first support protrusions 2243 formed to protrude outward in the radial direction r from the outer circumferential thereof, and the first support protrusions 2243 may be disposed to be spaced an equal distance from each other. In other words, since the first support protrusions 2243 formed to protrude outward in the radial direction r from the outer circumferential surface of the fourth upper cap member 2240 are formed to support the inner surface of the body member 2120, it is possible to secure the raw water flow path PW1 so that the raw water W1 received from the upper portion of the housing unit 2100 flows to the filtering unit 2200, and since the first support protrusions 2243 are disposed at equal distances to allow the raw water to flow equally in the circumferential direction of the fourth upper cap member 2240, it is possible to secure product reliability through the improvement in flow of the raw water W1. In this case, second support protrusions formed to protrude outward in the radial direction r from the outer circumferential surface of the third upper cap member 2230 may also be formed, and since the second support protrusions support the inner surface of the fourth upper cap member 2240, the second purified water C2 received from the outside may flow stably.

As illustrated in FIG. 11, the water purifier provided with the composite filter according to the embodiment of the present invention may further include the valve unit 2300 for controlling the flows of the raw water W1, the second purified water C2, the third purified water C3, and the residential water W2, and the control unit 2400 for controlling the operation of the valve unit 2300. The valve unit 2300 may include the first valve 2310 for controlling the flow of the raw water W1, the second valve 2320 for controlling the flow of the first purified water C1, the third valve 2330 for controlling the flow of the second purified water C2, the fourth valve 2340 for controlling the flow of the third purified water C3, and the fifth valve 2350 for controlling the flow of the residential water W2. In other words, the control unit 2400 may control the flows of the raw water W1, the first to third purified water C1, C2 and C3, and the residential water W2 by controlling the valve unit 2300 and can effectively prevent these fluids from flowing back, thereby securing product reliability.

As described above, by constituting the composite filter by integrating the spiral wound type internal filter member 2060 as the water purifier may not only receive the raw water W1, discharge the first purified water C1, receive the second purified water C2, and discharge the third purified water C3 but also discharge the residential water W2, it is possible to improve the user's convenience. In addition, since the first to fourth partition walls 2111, 2112, 2113, and 2114 are provided in the head member 2110 of the housing unit 2100 so that the independent flow paths for preventing the raw water W1, the first to third purified water C1, C2, and C3, and the residential water W2 from being mixed are formed to concentrate the tubes through which the raw water W1, the first to third purified water C1, C2, and C3, and the residential water W2 flow on an upper portion of the composite filter, it is possible to improve the degree of freedom in layout design of other portions, and since in the filtering unit 2200, the first upper cap member 2210 and the second upper cap member 2220 are disposed to be stacked and the first through hole 2210a is formed in the first upper cap member 2210 so that the discharged residential water W2 flows through the residential water flow path PW2 formed between the first upper cap member 2210 and the second upper cap member 2220, it is possible to enable miniaturization with a reduction in height of the composite filter in the axial direction and improve productivity with configuration simplification.

Figure 20:
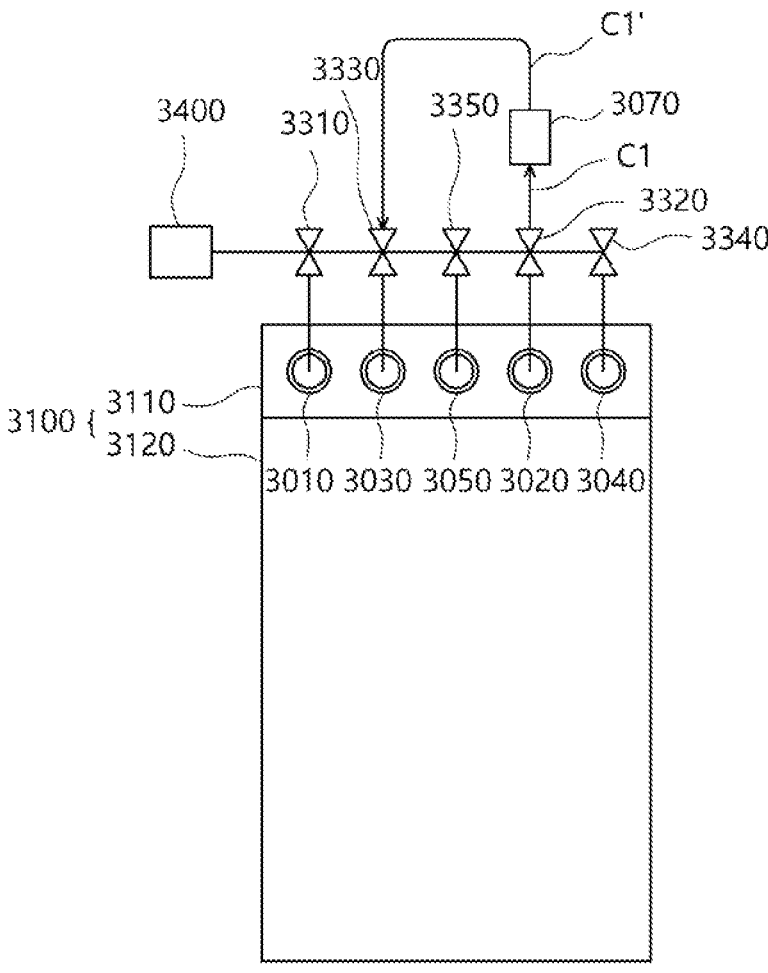
FIG. 20 is a configuration diagram illustrating the water purifier provided with the composite filter according to still another embodiment of the present invention.
Figure 21:
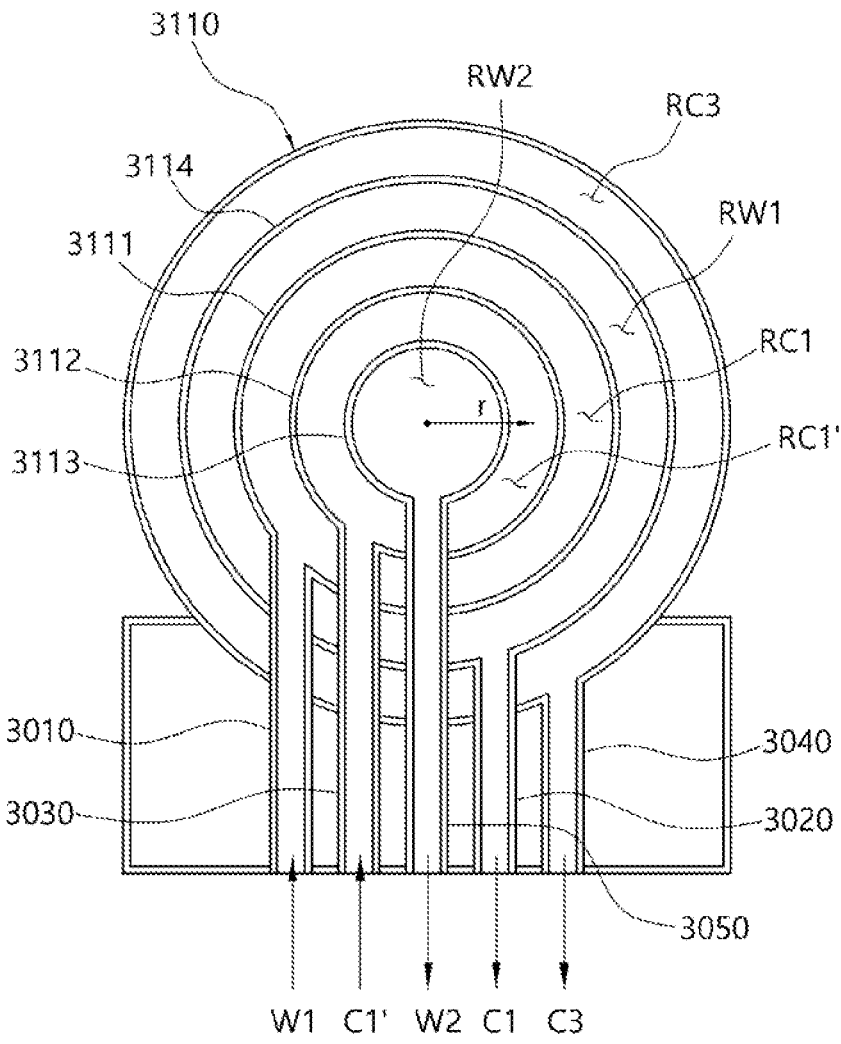
FIG. 21 is a plan view illustrating a head member of the water purifier provided with the composite filter according to still another embodiment of the present invention.
Figure 22:
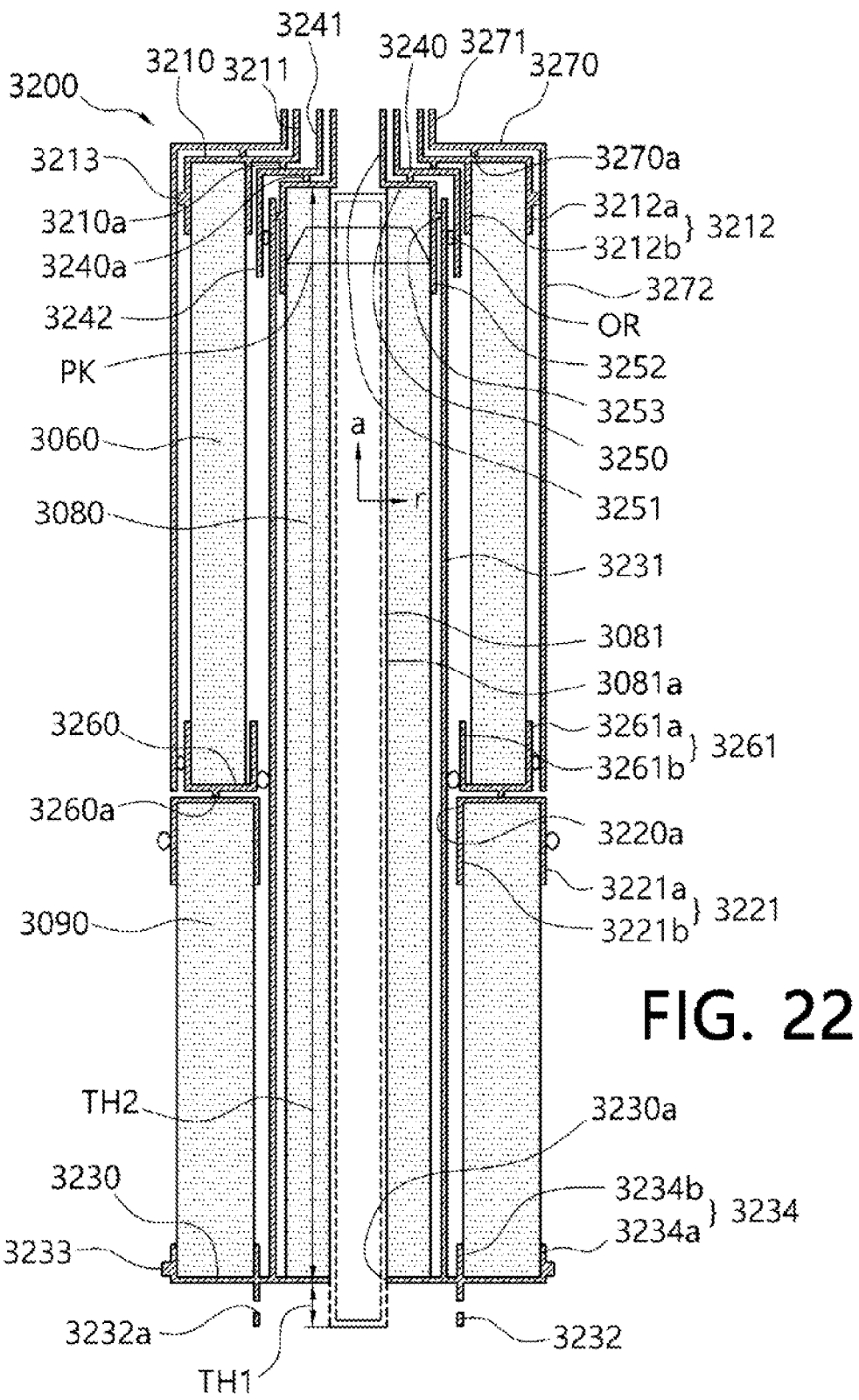
FIG. 22 is a cross-sectional view illustrating a state in which a filtering unit of the water purifier provided with the composite filter according to still another embodiment of the present invention is assembled.
Figure 23:
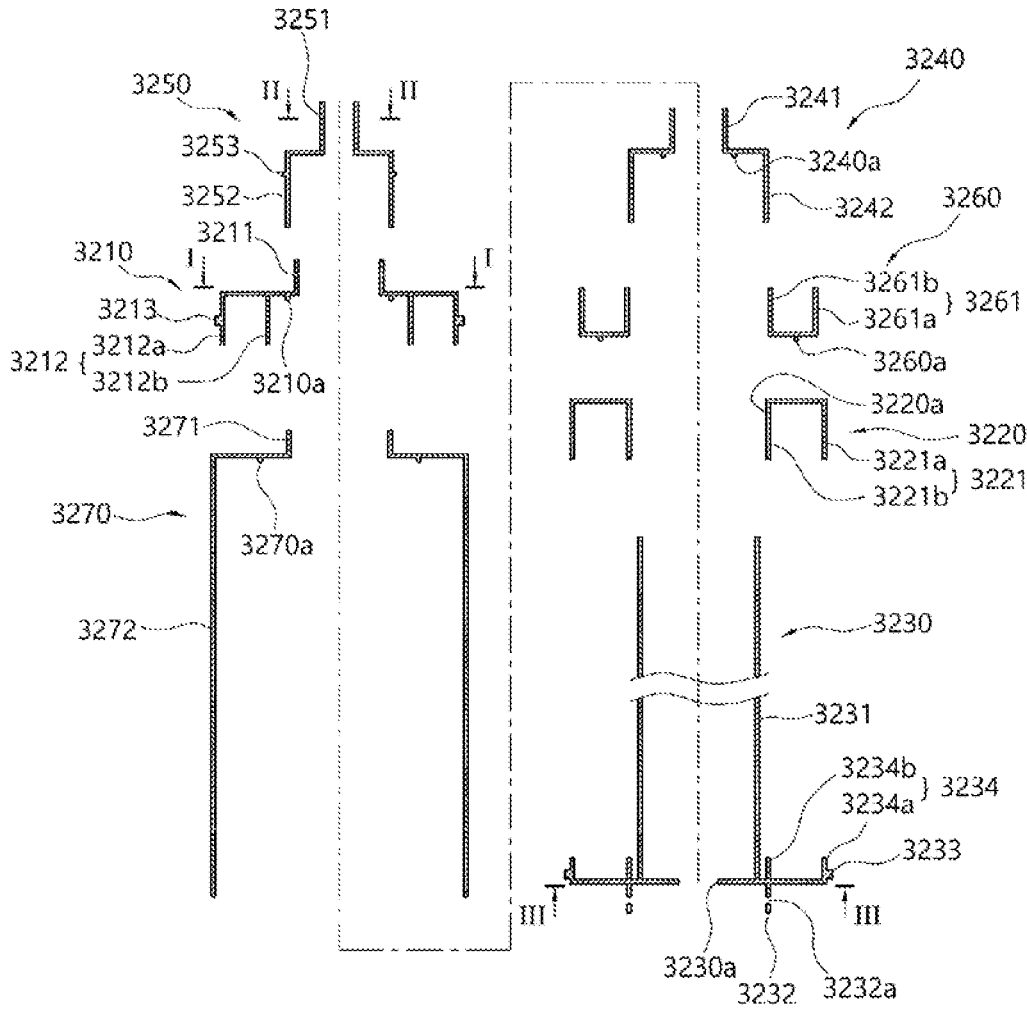
FIG. 23 is a cross-sectional view illustrating a state in which an upper cap member and a lower cap member of the water purifier provided with the composite filter according to still another embodiment of the present invention are disassembled.

FIG. 20 is a configuration diagram illustrating the water purifier provided with the composite filter according to still another embodiment of the present invention, FIG. 21 is a plan view illustrating a head member of the water purifier provided with the composite filter according to still another embodiment of the present invention, FIG. 22 is a cross-sectional view illustrating a state in which a filtering unit of the water purifier provided with the composite filter according to still another embodiment of the present invention is assembled, and FIG. 23 is a cross-sectional view illustrating a state in which an upper cap member and a lower cap member of the water purifier provided with the composite filter according to still another embodiment of the present invention are disassembled. Here, a denotes an axial direction of the composite filter, and r denotes a radial direction of the composite filter. In order to clearly describe the present invention, parts not related to the description are omitted from the drawings.

As illustrated in FIGS. 20 to 23, the water purifier provided with the composite filter according to the present invention may include a housing unit 3100 including a raw water receiving port 3010 through which the raw water W1 is received, a first purified water discharging port 3020 through which filtered first purified water C1 is discharged, an externally treated water receiving port 3030 through which externally treated water C1' generated while treating the first purified water C1 externally is received, a third purified water discharging port 3040 through which the filtered third purified water C3 is discharged, and a residential water discharging port 3050 through which the residential water W2 generated in the filtering process is discharged, and a filtering unit 3200 including a pre-treatment internal filter member 3060 disposed inside the housing unit 3100 to filter the raw water W1 and generate the first purified water C1, an external treatment member 3070 disposed outside the housing unit 3100 to filter the first purified water C1 and generate the externally treated water C1', a spiral wound type internal filter member 3080 disposed inside the housing unit 3100 to filter the externally treated water C1' and generate the second purified water C2, and a post-treatment internal filter member 3090 disposed inside the housing unit 3100 to filter the second purified water C2 and generate the third purified water C3 and disposed to be stacked under the pre-treatment internal filter member 3060. In other words, the raw water W1 received through the raw water receiving port 3010 may be discharged to the outside through the first purified water discharging port 3020 after passing through the pre-treatment internal filter member 3060 provided in the filtering unit 3200, re-received through the externally treated water receiving port 3030 after passing through the external treatment member 3070, and then filtered while sequentially passing through the spiral wound type internal filter member 3080 and the post-treatment internal filter member 3090, and the finally filtered third purified water C3 may be discharged through the third purified water discharging port 3040 and then provided to the user. Alternatively, the finally filtered third purified water C3 may be stored in a separate purified water storage unit or supplied to a cold water generator, a hot water generator, and an ice generator to produce cold water, hot water, and ice. In addition, the received externally treated water C1' may flow to a lower side of the spiral wound type internal filter member 3080 and then flow into the spiral wound type internal filter member 3080, and the residential water W2 generated by filtering the externally treated water C1' by the spiral wound type internal filter member 3080 may be discharged to the outside of the housing unit 3100 through the residential water discharging port 3050 and then discharged to the outside of the water purifier through a separate tube. As described above, by constituting the water purifier to not only receive the raw water W1 and discharge the purified water C but also discharge the residential water W2, it is possible to enable the implementation of an additional function using the external treatment member 3070 in the process in which the raw water W1 passes through the composite filter, and by constituting the composite filter by integrating the spiral wound type internal filter member 3080, it is possible to improve the user's convenience. In this case, the pre-treatment internal filter member 3060 may be a pre-carbon filter or a microfiltration (MF) filter, and the post-treatment internal filter member 3090 may be a post-carbon filter or the MF filter. Alternatively, the pre-treatment internal filter member 3060 and the post-treatment internal filter member 3090 may include an electrodeionization type filter. The electrodeionization type includes an electro deionization (EDI), continuous electro deionization (CEDI), and capacitive deionization (CDI). In this case, a separate filter member may be provided on an outer surface of the pre-treatment internal filter member 3060. For example, such a filter member may be a nano-trap (NT) filter member. The NT filter member may be made of a material with electrostatic electricity, such as a nano-trap material, to adsorb foreign substances included in the received raw water W1. The material may have a positive charge. Therefore, foreign substances having negative charges, such as viruses, bacteria, and fine particles, included in the raw water W1 may be adsorbed to the NT filter member by electrostatic electricity. In addition, such a filter member may be a sediment filter member. The spiral wound type internal filter member 3080 may be a reverse osmosis filter or a hollow fiber membrane filter. In this case, the external treatment member 3070 may be an additional separate functional filter (deionization filter for removing heavy metals) or a pump for increasing a pressure of the first purified water C1. Meanwhile, the external treatment member 3070 is not limited to a member for physically and chemically treating the first purified water C1 by another filter or the like and may include a temporary tank for temporarily accommodating the first purified water C1 or the like.

As illustrated in FIG. 21, the housing unit 3100 includes a head member 3110 including a first partition wall 3111 for preventing the raw water W1 from being mixed with the first purified water C1, a second partition wall 3112 for preventing the first purified water C1 from being mixed with the externally treated water C1', a third partition wall 3113 for preventing the externally treated water C1' from being mixed with the residential water W2, and a fourth partition wall 3114 for preventing the third purified water C3 from being mixed with the raw water W1, and a body member 3120 which extends from the head member 3110 and in which the filtering unit 3200 is disposed. In other words, the water purifier has a structure in which not only received raw water W1, but also discharged first purified water C1, received externally treated water C1', discharged third purified water C3, and discharged residential water W2 are received from the upper portion of the composite filter and discharged to the upper portion thereof, and to this end, the head member 3110 includes a raw water area RW1 into which the raw water W1 is received, a first purified water area RC1 from which the first purified water C1 is discharged, an externally treated water area RC1' into which the externally treated water C1' is received, a third purified water area RC3 from which the third purified water C3 is discharged, and a residential water area RW2 from which the residential water W2 is discharged. To this end, since the head member 3110 of the housing unit 3100 includes first to fourth partition walls 3111, 3112, 3113, and 3114 to form independent flow paths for preventing the raw water W1, the first purified water C1, the externally treated water C1', the third purified water C3, and the residential water W2 from being mixed so as to concentrate tubes through which the raw water W1, the first purified water C1, the externally treated water C1', the third purified water C3, and the residential water W2 flow on an upper portion of the composite filter, it is possible to improve a degree of freedom in layout design of other portions.

As illustrated in FIGS. 22 and 23, the filtering unit 3200 includes a first upper cap member 3210 under which the pre-treatment internal filter member 3060 disposed outward in the radial direction r and the spiral wound type internal filter member 3080 disposed inward in the radial direction r are disposed, and a second upper cap member 3220 under which the post-treatment internal filter member 3090 disposed outward in the radial direction r is disposed and through which the spiral wound type internal filter member 3080 disposed inward in the radial direction r passes. A first through hole 3220a through which the spiral wound type internal filter member 3080 passes may be formed in the second upper cap member 3220 for fixing the post-treatment internal filter member 3090 in a state in which the post-treatment internal filter member 3090 is disposed to be stacked under the pre-treatment internal filter member 3060. In addition, a first downward support guide 3212 extending downward in the axial direction a may be formed in the first upper cap member 3210. The first downward support guide 3212 may include a 1-1 downward support guide 3212a disposed outward in the radial direction r and a 1-2 downward support guide 3212b disposed inward in the radial direction r to fix the pre-treatment internal filter member 3060. In addition, a second downward support guide 3221 extending downward in the axial direction a may also be formed in the second upper cap member 3220. The second downward support guide 3221 may include a 2-1 downward support guide 3221a disposed outward in the radial direction r and a 2-2 downward support guide 3221b disposed inward in the radial direction r to fix the post-treatment internal filter member 3090. As described above, when the first downward support guide 3212 and the second downward support guide 3221 are formed, the pre-treatment internal filter member 3060 and the post-treatment internal filter member 3090 are fixed stably, thereby improving the durability of the water purifier. In other words, when the composite filter is manufactured using the previously manufactured spiral wound type internal filter member 3080 by arranging the pre-treatment internal filter member 3060 and the post-treatment internal filter member 3090 to be stacked through the first upper cap member 3210 and the second upper cap member 3220 and arranging the spiral wound type internal filter member 3080 inside these internal filter members in the radial direction r in the filtering unit 3200, it is possible to improve productivity. Even in the case of newly manufacturing the spiral wound type internal filter member 3080, it is possible to secure the same filtering performance even when the spiral wound type internal filter member 3080 is manufactured to have a smaller thickness when a length in the axial direction a is increased and at the same time, it is possible to make the composite filter slim.

Figure 24:
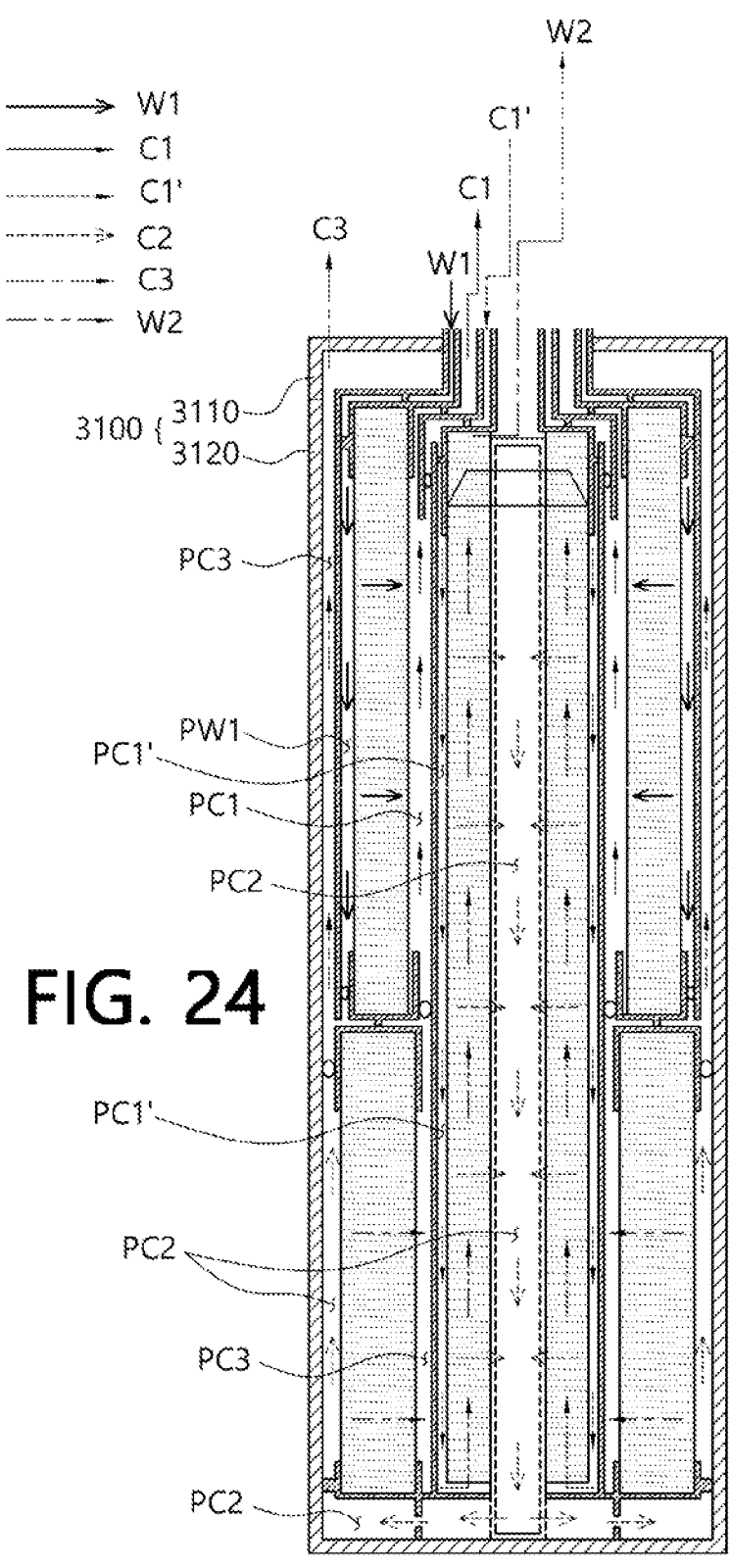
FIG. 24 is a cross-sectional view illustrating a state in which the filtering unit of the water purifier provided with the composite filter according to still another embodiment of the present invention is installed in a housing unit.

FIG. 24 is a cross-sectional view illustrating a state in which the filtering unit of the water purifier provided with the composite filter according to still another embodiment of the present invention is installed in a housing unit.

As illustrated in FIGS. 22 and 23, in the water purifier provided with the composite filter according to still another embodiment of the present invention, the filtering unit 3200 may further include a second lower cap member 3230 on which the post-treatment internal filter member 3090 and the spiral wound type internal filter member 3080 are fixedly disposed, and the second lower cap member 3230 may include a connecting tube 3231 disposed outside the spiral wound type internal filter member 3080 in the radial direction r to prevent the first purified water C1 and the third purified water C3 from being mixed with the externally treated water C1'. In this case, as illustrated in FIG. 24, the connecting tube 3231 is disposed between the pre-treatment internal filter member 3060 and the spiral wound type internal filter member 3080 and configured to partition the first purified water flow path PC1 and the externally treated water flow path PC1' and at the same time, partition the third purified water flow path PC3 and the externally treated water flow path PC1' disposed between the post-treatment internal filter member 3090 and the spiral wound type internal filter member 3080. In other words, since the connecting tube 3231 is provided in the second lower cap member 3230 for fixing the post-treatment internal filter member 3090 and the spiral wound type internal filter member 3080 and the connecting tube 3231 is formed to extend in the axial direction a inside the pre-treatment internal filter member 3060 and the post-treatment internal filter member 3090, it is possible to prevent the first purified water C1 passing through the pre-treatment internal filter member 3060 and the third purified water C3 passing through the post-treatment internal filter member 3090 from being mixed with the received externally treated water C1', thereby securing the operational stability of the water purifier.

As illustrated in FIGS. 22 and 23, in the water purifier provided with the composite filter according to still another embodiment of the present invention, the filtering unit 3200 may further include a third upper cap member 3240 disposed to be stacked under the first upper cap member 3210 and disposed to be spaced apart from the first upper cap member 3210 so that the first purified water C1 is discharged to the outside through the first purified water flow path PC1. In other words, since the third upper cap member 3240 is disposed under the first upper cap member 3210 and disposed to be spaced apart from the first upper cap member 3210 so that the first purified water flow path PC1 through which the first purified water C1 flows is formed, it is possible to secure the operational stability of the water purifier as the first purified water C1 is discharged stably.

In this case, as illustrated in FIGS. 22 and 23, in the water purifier provided with the composite filter according to still another embodiment of the present invention, a first spacer 3210a extending downward to support an upper surface of the third upper cap member 3240 may be provided on the lower surface of the first upper cap member 3210. In other words, since the first spacer 3210a formed to extend downward from the lower surface of the first upper cap member 3210 supports the upper surface of the third upper cap member 3240 to stably maintain a separation distance between the first upper cap member 3210 and the third upper cap member 3240, it is possible to improve the structural stability of the composite filter.

In addition, as illustrated in FIGS. 22 and 23, the water purifier provided with the composite filter according to still another embodiment of the present invention, the first upper cap member 3210 may include a first upward guide 3211 extending upward, the third upper cap member 3240 may include a third upward guide 3241 extending upward, and as illustrated in FIG. 24, the first upward guide 3211 and the third upward guide 3241 may be disposed to be spaced from each other so that the first purified water flow path PC1 is formed. In other words, since the first upward guide 3211 and the third upward guide 3241 are disposed to be spaced apart from each other and the first purified water flow path PC1 is formed to extend so that the first purified water C1 is discharged smoothly, it is possible to secure the operational stability of the water purifier.

In this case, as illustrated in FIGS. 22 and 23, in the water purifier provided with the composite filter according to still another embodiment of the present invention, the first partition wall 3111 may be disposed to extend in the axial direction a along the first upward guide 3211. The first partition wall 3111 may be formed to extend in the axial direction a along the first upward guide 3211, and when the head member 3110 and the body member 3120 are coupled, the head member 3110 and the body member 3120 may be coupled by a method in which the first partition wall 3111 covers an outer surface of the first upward guide 3211, coupled by a method in which the first partition wall 3111 is fitted into an inner surface of the first upward guide 3211, or coupled by a method in which the first partition wall 3111 is seated on an upper end of the first upward guide 3211. In other words, since the first partition wall 3111 is disposed to extend in the axial direction along the first upward guide, it is possible to effectively prevent the discharged first purified water from being mixed with the received raw water, thereby improving user satisfaction through the improvement in water quality of the finally discharged third purified water C3.

In addition, as illustrated in FIGS. 22 and 23, in the water purifier provided with the composite filter according to still another embodiment of the present invention, the second partition wall 3112 may be disposed to extend in the axial direction a along the third upward guide 3241. The second partition wall 3112 may be formed to extend in the axial direction a along the third upward guide 3241, and when the head member 3110 and the body member 3120 are coupled, the head member 3110 and the body member 3120 may be coupled by a method in which the second partition wall 3112 covers an outer surface of the third upward guide 3241, coupled by a method in which the second partition wall 3112 is fitted into an inner surface of the third upward guide 3241, or coupled by a method in which the second partition wall 3112 is seated on an upper end of the third upward guide 3241. In other words, since the second partition wall 3112 is disposed to extend in the axial direction a along the third upward guide 3241, it is possible to effectively prevent the discharged first purified water C1 from being mixed with the received externally treated water C1', thereby improving user satisfaction through the prevention of a degradation in water quality of the externally treated water C1' and the improvement in water quality of the finally discharged third purified water C3.

Meanwhile, as illustrated in FIGS. 22 and 23, in the water purifier provided with the composite filter according to still another embodiment of the present invention, the third upper cap member 3240 may include a third downward support guide 3242 disposed to extend downward to be coupled to the connecting tube 3231 to prevent the first purified water C1 from being mixed with the externally treated water C1'. The third downward support guide 3242 and the connecting tube 3231 may be disposed to overlap each other in the axial direction a, and an O-ring OR for blocking the flow of the first purified water C1 may be provided between the third downward support guide 3242 and the connecting tube 3231. In other words, by coupling the third downward support guide 3242 formed to extend downward from the third upper cap member 3240 to the connecting tube 3231, it is possible to effectively prevent the discharged first purified water C1 from being mixed with the received externally treated water C1', thereby improving user satisfaction through the prevention of a degradation in water quality of the externally treated water C1' and the improvement in water quality of the finally discharged third purified water C3.

In addition, as illustrated in FIGS. 22 and 23, in the water purifier provided with the composite filter according to still another embodiment of the present invention, the filtering unit 3200 may further include a fourth upper cap member 3250 disposed to be stacked under the third upper cap member 3240 and disposed to be spaced apart from the third upper cap member 3240 so that the externally treated water C1' flows through the externally treated water flow path PC1'. In other words, since the fourth upper cap member 3250 is disposed under the third upper cap member 3240 and disposed to be spaced apart from the third upper cap member 3240 so that the externally treated water flow path PC1' through which the externally treated water C1' flows is formed, it is possible to secure the operational stability of the water purifier as the externally treated water C1' flows stably.

In this case, as illustrated in FIGS. 22 and 23, in the water purifier provided with the composite filter according to still another embodiment of the present invention, a second spacer 3240a extending downward to support an upper surface of the fourth upper cap member 3250 may be provided on a lower surface of the third upper cap member 3240. In other words, since the second spacer 3240a formed to extend downward from the lower surface of the third upper cap member 3240 supports the upper surface of the fourth upper cap member 3250 to stably maintain a separation distance between the third upper cap member 3240 and the fourth upper cap member 3250, it is possible to improve the structural stability of the composite filter.

In addition, as illustrated in FIGS. 22 and 23, in the water purifier provided with the composite filter according to still another embodiment of the present invention, the fourth upper cap member 3250 may include a fourth upward guide 3251 extending upward, and as illustrated in FIG. 24, the fourth upward guide 3251 may be disposed to be spaced apart from the third upward guide 3241 so that the externally treated water flow path PC1' is formed. In other words, since the fourth upward guide 3251 is disposed to be spaced apart from the third upward guide 3241 and the externally treated water flow path PC1' is formed so that the received externally treated water C1' flows smoothly, it is possible to secure the operational stability of the water purifier.

In this case, as illustrated in FIGS. 22 and 23, in the water purifier provided with the composite filter according to still another embodiment of the present invention, the third partition wall 3113 may be disposed to extend in the axial direction a along the fourth upward guide 3251. The third partition wall 3113 may be formed to extend in the axial direction a along the fourth upward guide 3251, and when the head member 3110 and the body member 3120 are coupled, the head member 3110 and the body member 3120 may be coupled by a method in which the third partition wall 3113 covers an outer surface of the fourth upward guide 3251, coupled by a method in which the third partition wall 3113 is fitted into an inner surface of the fourth upward guide 3251, or coupled by a method in which the third partition wall 3113 is seated on an upper end of the fourth upward guide 3251. In other words, since the third partition wall 3113 is disposed to extend in the axial direction a along the fourth upward guide 3251, it is possible to effectively prevent the received externally treated water C1' from being mixed with the discharged residential water W2, thereby improving user satisfaction through the prevention of a degradation in water quality of the externally treated water C1' and the improvement in water quality of the finally discharged third purified water C3.

Figure 25:
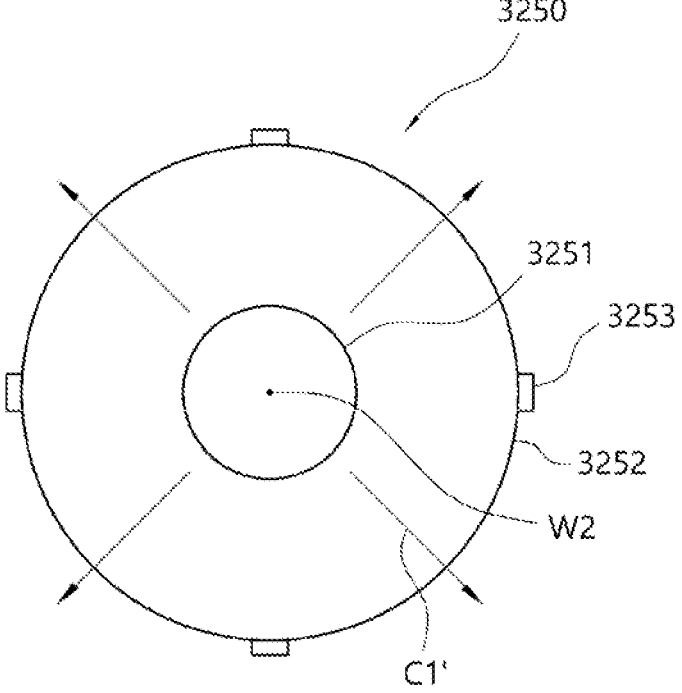
FIG. 25 is a cross-sectional view along line I-I in FIG. 23.
Figure 26:
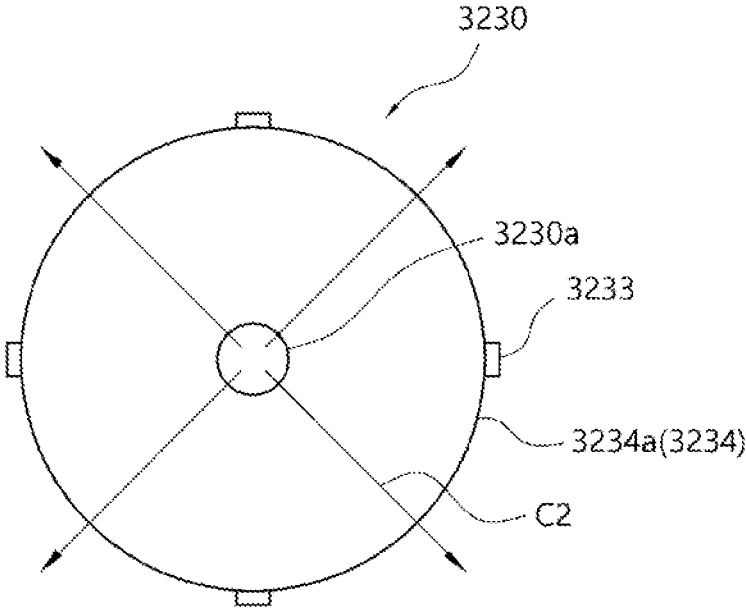
FIG. 26 is a cross-sectional view along line II-II in FIG. 23.
Figure 27:
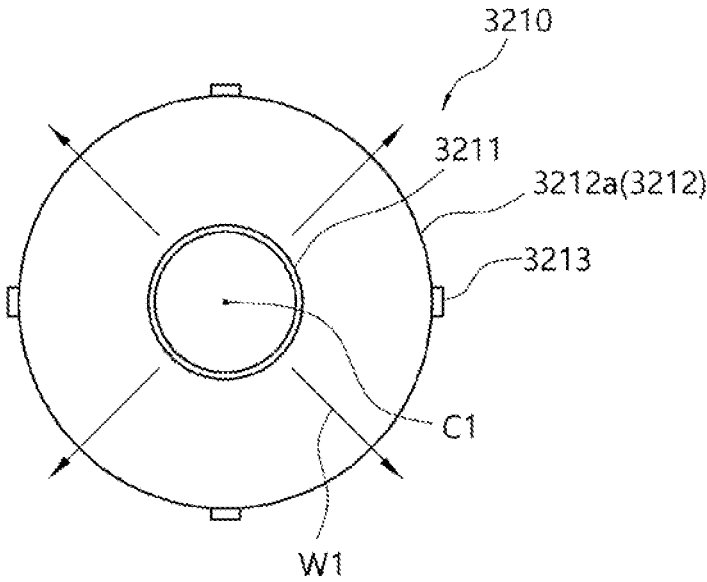
FIG. 27 is a cross-sectional view along line III-III in FIG. 23.

FIG. 25 is a cross-sectional view along line I-I in FIG. 23, FIG. 26 is a cross-sectional view along line II-II in FIG. 23, and FIG. 27 is a cross-sectional view along line III-III in FIG. 23.

Meanwhile, as illustrated in FIGS. 22 and 23, in the water purifier provided with the composite filter according to still another embodiment of the present invention, the fourth upper cap member 3250 may include a fourth downward support guide 3252 disposed to extend downward in the axial direction a to surround the spiral wound type internal filter member 3080. A separation packing PK supported by the fourth downward support guide 3252 may be provided in the spiral wound type internal filter member 3080. In other words, the spiral wound type internal filter member 3080 is supported by the fourth downward support guide 3252, thereby improving the structural stability of the composite filter. As illustrated in FIG. 25, since third support protrusions 3253 formed to extend outward in the radiation direction r may be formed in the fourth upper cap member 3250 and a plurality of third support protrusions 3253 are configured to support an inner surface of the connecting tube 3231 in a state of being disposed to be spaced apart from each other, it is possible to improve structural stability and at the same time, by allowing the received externally treated water C1' to flow smoothly, it is possible to secure the operational stability of the water purifier.

Meanwhile, as illustrated in FIG. 22, in the water purifier provided with the composite filter according to still another embodiment of the present invention, the filtering unit 3200 may further include a central tube 3081 which supports the spiral wound type internal filter member 3080 to be wound spirally and in which second purified water through holes 3081a are formed so that the second purified water C2 flows into the filtering unit 3200, and the second lower cap member 3230 may include a second through hole 3230a disposed so that the central tube 3081 passes therethrough to allow the second purified water C2 flowing through the central tube 3081 to flow downward. A lower portion of the central tube 3081 is supported by the lower surface of the housing unit 3100 in a state of passing through the second through hole 3230a. A through portion TH1 passing through the second through hole 3230a is formed in the central tube 3081, a second purified water through hole 3081a is also formed in the through portion TH1, and the second purified water C2 flowing into the central tube 3081 through the second purified water through hole 3081a formed in a non-through portion TH2 of the central tube 3081 flows to a lower portion of the central tube 3081 and then flows to a lower portion of the second lower cap member 3230 through the second purified water through hole 3081a formed in the through portion TH1. In other words, since the second purified water C2 flows into the central tube 3081 through the second purified water through hole 3081a in a state in which the spiral wound type internal filter member 3080 is supported to be spirally wound around the central tube 3081, it is possible to improve structural stability, and since the central tube 3081 is disposed to pass through the second lower cap member 3230, it is possible to allow the second purified water C2 to stably flow to the lower portion of the second lower cap member 3230, thereby improving the operational stability of the water purifier.

In this case, as illustrated in FIGS. 22 and 23, in the water purifier provided with the composite filter according to still another embodiment of the present invention, the second lower cap member 3230 may include a second downward guide 3232 extending downward, and the second downward guide 3232 may include a third through hole 3232a through which the second purified water C2 flowing to the lower portion of the second lower cap member 3230 flows. As described above, the second purified water C2 flowing to the lower portion of the second lower cap member 3230 flows outward in the radial direction r from a central portion in the radial direction r and then flows to the post-treatment internal filter member 3090 through the periphery of the second lower cap member 3230. As illustrated in FIG. 26, since second support protrusions 3233 formed to extend outward in the radiation direction r may be formed in the second lower cap member 3230 and a plurality of second support protrusions 3233 are configured to support an inner surface of the body member 3120 of the housing unit 3100 in a state of being spaced apart from each other, it is possible to improve structural stability and at the same time, allow the second purified water C2 to flow smoothly. A second upward support guide 3234 extending upward in the axial direction a may be formed in the second lower cap member 3230. The second upward support guide 3234 may include a 2-1 upward support guide 3234a disposed outward in the radial direction r and a 2-2 upward support guide 3234b disposed inward in the radial direction r to fix the post-treatment internal filter member 3090. As described above, when the second upward support guide 3234 is formed, the post-treatment internal filter member 3090 is fixed stably, thereby improving the durability of the water purifier. In addition, the post-treatment internal filter member 3090 is subjected to the sub assembly through the second upper cap member 3220 and the second lower cap member 3230, thereby improving workability. In other words, since the second downward guide 3232 supports the lower surface of the housing unit 3100, a separation state between the second lower cap member 3230 and the lower surface of the housing unit 3100 is maintained stably, and the second purified water C2 flowing to the lower portion of the second lower cap member 3230 may smoothly flow through the third through hole 3232a formed in the second downward guide 3232, thereby securing the operational stability of the water purifier.

Meanwhile, as illustrated in FIGS. 22 and 23, in the water purifier provided with the composite filter according to still another embodiment of the present invention, the filtering unit 3200 may further include a first lower cap member 3260 on which the pre-treatment internal filter member 3060 is fixedly disposed, and the first lower cap member 3260 may include a third spacer 3260a disposed to be stacked on the second upper cap member 3220 and, as illustrated in FIG. 24, extending downward to be supported by an upper surface of the second upper cap member 3220 so that the third purified water flow path PC3 through which the third purified water C3 flows is formed. A first upward support guide 3261 extending upward in the axial direction a may be formed in the first lower cap member 3260. The first upward support guide 3261 may include a 1-1 upward support guide 3261a disposed outward in the radial direction r and a 1-2 upward support guide 3261b disposed inward in the radial direction r to fix the pre-treatment internal filter member 3060. As described above, when the first upward support guide 3261 is formed, the pre-treatment internal filter member 3060 is fixed stably, thereby improving the durability of the water purifier. In other words, since the pre-treatment internal filter member 3060 may be fixed by a method of arranging the first upper cap member 3210 and the first lower cap member 3260 above and under the pre-treatment internal filter member 3060, respectively, it is possible to enable the modularization of the composite filter through the sub assembly process, thereby improving workability, and since the third spacer 3260a supported by the upper surface of the second upper cap member 3220 is formed to extend downward from the lower surface of the first lower cap member 3260, it is possible to allow the third purified water C3 to smoothly flow while the distance between the upper and lower surfaces of the first lower cap member 3260, thereby securing the operational stability of the water purifier.

In addition, as illustrated in FIGS. 22 and 23, in the water purifier provided with the composite filter according to still another embodiment of the present invention, the filtering unit 3200 may further include a fifth upper cap member 3270 disposed to be stacked above the first upper cap member 3210 and as illustrated in FIG. 24, disposed to be spaced apart from the first upper cap member 3210 so that the raw water W1 flows through the raw water flow path PW1, and the fifth upper cap member 3270 may include a fourth spacer 3270a extending downward to be supported by the upper surface of the first upper cap member 3210. As illustrated in FIG. 27, since first support protrusions 3213 formed to extend outward in the radiation direction r may be formed in the first upper cap member 3210 and a plurality of first support protrusions 3213 are configured to support an inner surface of the fifth upper cap member 3270 in a state of being spaced apart from each other, it is possible to improve structural stability and at the same time, allow the received raw water W1 to flow smoothly. In other words, since the fifth upper cap member 3270 is disposed under the first upper cap member 3210 and disposed to be spaced apart from the first upper cap member 3210 so that the raw water flow path PW1 through which the raw water W1 flows is formed, it is possible to secure the operational stability of the water purifier as the raw water W1 flows stably.

In this case, as illustrated in FIGS. 22 and 23, in the water purifier provided with the composite filter according to still another embodiment of the present invention, the fifth upper cap member 3270 may include a fifth upward guide 3271 extending upward and as illustrated in FIG. 24, the fifth upward guide 3271 may be disposed to be spaced apart from the first upward guide 3211 so that the raw water flow path PW1 is formed. In other words, since the fifth upward guide 3271 is disposed to be spaced apart from the first upward guide 3211 and the raw water flow path PW1 is formed so that the received raw water W1 flows smoothly, it is possible to secure the operational stability of the water purifier.

In this case, as illustrated in FIGS. 22 and 23, in the water purifier provided with the composite filter according to still another embodiment of the present invention, the fourth partition wall 3114 may be disposed to extend in the axial direction a along the fifth upward guide 3271. The fourth partition wall 3114 may be formed to extend in the axial direction a along the fifth upward guide 3271, and when the head member 3110 and the body member 3120 are coupled, the head member 3110 and the body member 3120 may be coupled by a method in which the fourth partition wall 3114 covers an outer surface of the fifth upward guide 3271, coupled by a method in which the fourth partition wall 3114 is fitted into an inner surface of the fifth upward guide 3271, or coupled by a method in which the fourth partition wall 3114 is seated on an upper end of the fifth upward guide 3271. In other words, since the fourth partition wall 3114 is disposed to extend in the axial direction a along the fifth upward guide 3271, it is possible to effectively prevent the received externally treated water C1' from being mixed with the discharged residential water W2, thereby improving user satisfaction through the prevention of a degradation in water quality of the externally treated water C1' and the improvement in water quality of the finally discharged third purified water C3.

In addition, as illustrated in FIGS. 22 and 23, in the water purifier provided with the composite filter according to still another embodiment of the present invention, the fifth upper cap member 3270 may include a fifth downward support guide 3272 extending downward, and the fifth downward support guide 3272 may be disposed to extend to the first lower cap member 3260. In other words, since the fifth downward support guide 3272 is disposed to extend to the first lower cap member 3260, it is possible to prevent the received raw water W1 from being mixed with the discharged third purified water C3, thereby securing the operational stability of the water purifier.

Figure 28:
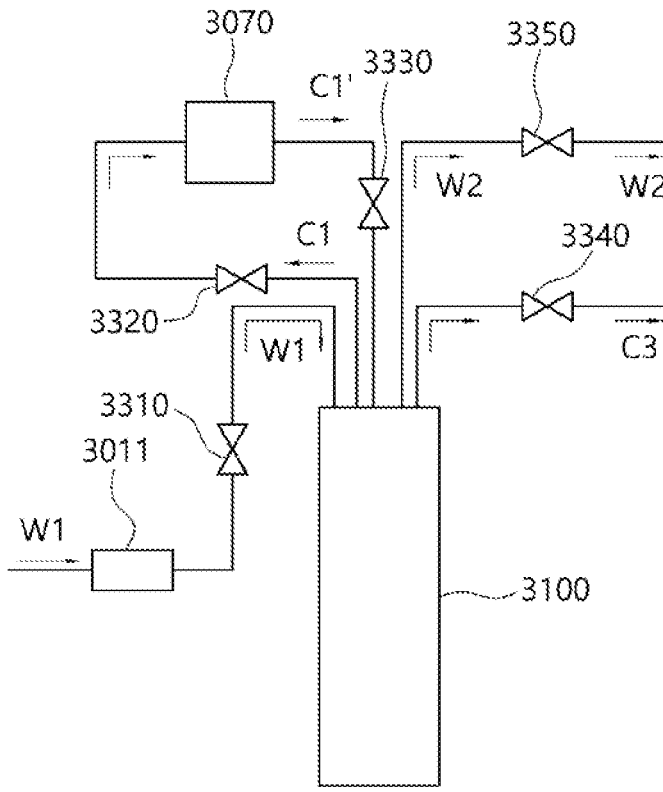
FIG. 28 is a configuration diagram illustrating an entire water piping diagram of the water purifier provided with the composite filter according to still another embodiment of the present invention.

FIG. 28 is a configuration diagram illustrating an entire water piping diagram of the water purifier provided with the composite filter according to still another embodiment of the present invention.

Meanwhile, as illustrated in FIG. 28, the water purifier provided with the composite filter according to still another embodiment of the present invention may further include a valve unit 3300 for controlling the flows of the raw water W1, the first purified water C1, the externally treated water C1', the third purified water C3, and the residential water W2, and a control unit 3400 for controlling an operation of the valve unit 3300. The valve unit 3300 may include a first valve 3310 for controlling the flow of the raw water W1, a second valve 3320 for controlling the flow of the first purified water C1, a third valve 3330 for controlling the flow of the externally treated water C1', a fourth valve 3340 for controlling the flow of the third purified water C3, and a fifth valve 3350 for controlling the flow of the residential water W2. In this case, the received raw water W1 flows in a state in which a pressure is reduced while passing through a pressure reducing valve 3011. In other words, the control unit 3400 may control the flows of the raw water W1, the first purified water C1, the externally treated water C1', the third purified water C3, and the residential water W2 by controlling the valve unit 3300 and can effectively prevent these fluids from flowing back, thereby securing product reliability.

As described above, in the water purifier provided with the composite filter according to the present invention, as the water purifier may not only receive the raw water W1, discharge the first purified water C1, receive the externally treated water C1', and discharge the third purified water C3 but also discharge the residential water W2, it is possible to enable the implementation of the additional function in the process in which the raw water W1 passes through the composite filter, by constituting the composite filter by integrating the spiral wound type internal filter member 3080, it is possible to improve the user's convenience, by providing the first to fourth partition walls 3111, 3112, 3113, and 3114 in the head member 3110 of the housing unit 3100 so that the independent flow paths for preventing the raw water W1, the first purified water C1, the externally treated water C1', the third purified water C3, and the residential water W2 from being mixed are formed to concentrate the tubes through which the raw water W1, the first purified water C1, the externally treated water C1', the third purified water C3, and the residential water W2 flow on an upper portion of the composite filter, it is possible to enhance the degree of freedom in layout design of other portions, and when the composite filter is manufactured using the previously manufactured spiral wound type internal filter member 3080 by arranging the pre-treatment internal filter member 3060 and the post-treatment internal filter member 3090 to be stacked through the first upper cap member 3210 and the second upper cap member 3220 and arranging the spiral wound type internal filter member 3080 inside these internal filter members in the radial direction r in the filtering unit 3200, it is possible to improve productivity.

With the above configuration, in a water purifier provided with a composite filter according to one aspect of the present invention, it is possible to enable the implementation of an additional function using an external treatment member in a process in which raw water passes through the composite filter as the water purifier can not only receive the raw water, discharge second purified water, receive externally treated water, and discharge third purified water, but also discharge residential water, improve a user's convenience by constituting the composite filter by integrating three internal filter members including a spiral wound type filter member to facilitate the miniaturization and replacement of the water purifier, improve productivity by constituting the composite filter by a method of modularizing each filter through a first module including a pre-treatment internal filter and the spiral wound type internal filter and a second module including a post-treatment internal filter member, improve productivity by constituting the composite filter by a method of stacking the first module and the second module, secure operational stability of the water purifier by arranging a discharge tube member to pass through a central portion of the first module so that the third purified water generated from the second module disposed under the first module is discharged to the outside to prevent the third purified water from being mixed with the second purified water, and, in addition, further improve a degree of freedom in layout design of other portions by providing first to fourth partition walls in a head member of a housing unit so that independent flow paths for preventing the raw water, the second purified water, the externally treated water, the third purified water, and the residential water from being mixed are formed to concentrate tubes through which the raw water, the second purified water, the externally treated water, the third purified water, and the residential water flow on an upper portion of the composite filter.

In the water purifier provided with the composite filter according to one embodiment of the present invention, it is possible to enhance operation reliability through a smooth flow of second purified water while a second purified flow path is maintained stably by arranging a spiral wound type internal filter member to be spirally wound around a central tube and forming a second purified water through hole so that the second purified water flows through the second purified water flow path in the central tube, and arranging a discharge tube member inserted to pass through a central portion of the central tube to be spaced a predetermined distance from the central tube.

In the water purifier provided with the composite filter according to one embodiment of the present invention, it is possible to enhance the operational stability of the water purifier by arranging a fourth partition wall to extend in an axial direction along a discharge tube member to effectively prevent discharged third purified water from being mixed with discharged second purified water.

In the water purifier provided with the composite filter according to one embodiment of the present invention, it is possible to enhance the operational stability of the water purifier by arranging a third partition wall to extend in an axial direction along a central tube to effectively prevent discharged second purified water from being mixed with discharged residential water.

In the water purifier provided with the composite filter according to one embodiment of the present invention, it is possible to enhance the operational stability of the water purifier by discharging discharged residential water to the outside through a residential water flow path formed between a first upward guide provided in a first upper cap member and a central tube to prevent the discharged residential water from being mixed with received raw water or discharged second purified water.

In the water purifier provided with the composite filter according to one embodiment of the present invention, it is possible to enhance the operational stability of the water purifier by arranging a second partition wall to extend in an axial direction along a first upward guide to effectively prevent received raw water from being mixed with discharged residential water.

In the water purifier provided with the composite filter according to one embodiment of the present invention, it is possible to enhance workability by fixing a pre-treatment internal filter member by a method of respectively arranging a first upper cap member and a first lower cap member above and under the pre-treatment internal filter member to enable the modularization of a first module through a sub assembly process.

In the water purifier provided with the composite filter according to one embodiment of the present invention, it is possible to improve structural stability by allowing an internal guide to support an inner surface of a pre-treatment internal filter member and enhance the operational stability of the water purifier as first purified water smoothly flows into the water purifier through a first purified water through hole formed in the internal guide.

In the water purifier provided with the composite filter according to one embodiment of the present invention, it is possible to enhance the structural stability of a first module by arranging an internal guide to connect a first upper cap member to a first lower cap member.

In the water purifier provided with the composite filter according to one embodiment of the present invention, it is possible to enhance the operational stability of the water purifier by stably forming a first purified water flow path through which first purified water flows between an internal guide and a spiral wound type internal filter member because the internal guide is disposed to be spaced apart from an outer surface of the spiral wound type internal filter member and allowing the first purified water flowing into the water purifier through a first purified water through hole formed in the internal guide to stably flow to a lower portion of the spiral wound type internal filter member because the first purified water flow path is formed to extend to the lower portion of the spiral wound type internal filter member.

In the water purifier provided with the composite filter according to one embodiment of the present invention, it is possible to enhance user satisfaction by securing a smooth flow of received raw water by arranging a second upper cap member to be spaced apart from an upper portion of a first upper cap member to stably form a raw water flow path and prevent raw water flowing into a first module from being mixed with externally treated water received while discharged to the outside of the first module to prevent a degradation in water qualities of the externally treated water and third purified water by arranging a second downward support guide to extend to a first lower cap member.

In the water purifier provided with the composite filter according to one embodiment of the present invention, it is possible to enhance product reliability by securing a raw water flow path so that received raw water flows through a periphery of a first upper cap member by providing first support protrusions formed to protrude outward in a radial direction from an outer circumferential surface of a first upper cap member to allow the first upper cap member to support an inner surface of a second upper cap member and improving a flow of the raw water by arranging the first support protrusions at an equal distance to allow the raw water to equally flow in a circumferential direction of the first upper cap member.

In the water purifier provided with the composite filter according to one embodiment of the present invention, it is possible to enhance the operational stability of the water purifier by allowing received raw water to flow through a raw water flow path formed between a second upward guide provided in a second upper cap member and a first upward guide provided in a first upper cap member to prevent the received raw water from being mixed with received externally treated water or discharged residential water.

In the water purifier provided with the composite filter according to one embodiment of the present invention, it is possible to enhance the operational stability of the water purifier by arranging a first partition wall to extend in an axial direction along a second upward guide to effectively prevent received raw water from being mixed with received externally treated water.

In the water purifier provided with the composite filter according to one embodiment of the present invention, it is possible to improve workability by enabling a sub assembly of a second module through a third upper cap member and a third lower cap member, and enhance productivity by arranging a discharge tube member to pass through the third upper cap member while extending upward from the third lower cap member to stably form a third purified water flow path in a process in which a first module and the second module are disposed to be stacked.

In the water purifier provided with the composite filter according to one embodiment of the present invention, it is possible to enhance productivity by simply coupling a first module to a second module by a method of coupling an upward rib extending upward from a connector body to a central tube in a state in which the connector body of a connector member is fixedly press-fitted into a first lower cap member and coupling a downward rib extending downward from the connector body to a third upper cap member.

In the water purifier provided with the composite filter according to one embodiment of the present invention, it is possible to improve productivity by forming a third upward guide to extend upward in an axial direction to facilitate the coupling between a connector member and a third upper cap member, and in particular, enhance productivity by enabling stable coupling even when a worker couples a first module to a second module after flipping over the connector member in a process of coupling the first module to the second module using the connector member because an upward rib and a downward rib can be formed in a symmetrical shape when the third upward guide is formed to have an outer diameter that is the same as a diameter of a central tube.

In the water purifier provided with the composite filter according to one embodiment of the present invention, it is possible to enhance product reliability by controlling a valve unit through a control unit to control flows of raw water, purified water, and residential water and effectively preventing these fluids from flowing back.

In a water purifier provided with a composite filter according to another aspect of the present invention, it is possible to enable the implementation of an additional function using an external filter in a process in which raw water passes through the composite filter as the water purifier can receive raw water, discharge first purified water, receive second purified water, and discharge third purified water, as well as discharge residential water, enhance a user's convenience by constituting the composite filter by integrating a spiral wound type internal filter member such as a reverse osmosis filter or a hollow fiber membrane filter, enhance a degree of freedom in layout design of other portions by providing first to fourth partition walls in a head member of a housing unit so that independent flow paths for preventing the raw water, the purified water, and the residential water from being mixed are formed to concentrate tubes through which the raw water, the purified water, and the residential water flow on an upper portion of the composite filter, enable miniaturization by arranging a first upper cap member and a second upper cap member to be stacked and forming a first through hole in the first upper cap member so that discharged residential water flows through a residential water flow path formed between the first upper cap member and the second upper cap member in a filtering unit to reduce a height of the composite filter in an axial direction, and enhance productivity through configuration simplification.

The water purifier provided with the composite filter according to another embodiment of the present invention can allow discharged first purified water to flow into a first upward guide formed in a first upper cap member and discharged residential water to flow into a second upward guide formed in a second upper cap member, can form an independent flow path in which the first purified water and the residential water are not mixed by arranging a first upper cap member and a second upper cap member to be spaced a predetermined distance from each other so that a residential water flow path is formed, and can enhance productivity through configuration simplification.

In the water purifier provided with the composite filter according to another embodiment of the present invention, it is possible to enhance the operational stability of the water purifier by improving the durability of the water purifier by stably fixing a spiral wound type internal filter member through a first downward guide formed to extend downward from a lower surface of a first upper cap member and allowing the residential water generated through the spiral wound type internal filter member to be discharged through a first through hole.

In the water purifier provided with the composite filter according to another embodiment of the present invention, it is possible to enhance productivity through configuration simplification by arranging a third upper cap member and a fourth upper cap member to be stacked and allowing second purified water received from the outside to flow through a second purified water flow path formed between the third upper cap member and the fourth upper cap member in a state in which a post-treatment internal filter member is fixedly disposed under the third upper cap member.

The water purifier provided with the composite filter according to another embodiment of the present invention can allow discharged third purified water to flow into a third upward guide formed in a third upper cap member and received second purified water to flow into a fourth upward guide formed in a fourth upper cap member, can form an independent flow path in which the second purified water and the third purified water are not mixed by arranging the third upper cap member and the fourth upper cap member to be spaced a predetermined distance from each other so that a second purified flow path is formed, and enhance productivity through configuration simplification.

In the water purifier provided with the composite filter according to another embodiment of the present invention, it is possible to enhance the durability of the water purifier by forming a post-treatment internal filter to be stably fixed through a third downward guide formed to extend downward from a lower surface of a third upper cap member.

In the water purifier provided with the composite filter according to another embodiment of the present invention, it is possible to enhance the durability of the water purifier by forming a fourth downward guide formed to extend downward from a lower surface of a fourth upper cap member to extend downward to surround an outer circumferential surface of a third upper cap member and a post-treatment internal filter member to be stably fixed by arranging the fourth downward guide to extend to an outer circumferential surface of a second upper cap member.

In the water purifier provided with the composite filter according to another embodiment of the present invention, it is possible to improve the durability of the water purifier by stably fixing a post-treatment internal filter member through a lower guide formed to extend upward from an upper surface of a lower cap member, and enhance workability by being configured to enable the modularization of the composite filter through a sub assembly process by fixing the post-treatment internal filter member can be fixed through third and fourth upper cap members and the lower cap member.

In the water purifier provided with the composite filter according to another embodiment of the present invention, it is possible to enhance the operational stability of the water purifier while first purified water and residential water are stably generated in a separated state by forming a raw water flow path between a body member and a spiral wound type internal filter member and allowing raw water to flow to a lower portion of the spiral wound type internal filter member and then pass through the spiral wound type internal filter member because the spiral wound type internal filter member is spaced apart from a lower surface of the body member so that the raw water flow path is formed to extend to the lower portion of the spiral wound type internal filter member.

In the water purifier provided with the composite filter according to another embodiment of the present invention, it is possible to enhance operational stability through a smooth flow of first purified water by providing a central tube on an inner circumferential surface of a spiral wound type internal filter member so that the spiral wound type internal filter member is disposed to be spirally wound around the central tube, and at the same time, a first purified water flow path formed inside the spiral wound type internal filter member is stably maintained.

In the water purifier provided with the composite filter according to another embodiment of the present invention, it is possible to enhance product reliability by securing a raw water flow path so that raw water received through an upper portion of a housing unit flows to a filtering unit by forming first support protrusions formed to protrude outward in a radial direction from an outer circumferential surface of a fourth upper cap member to support an inner surface of a body member and improving a flow of the raw water by arranging the first support protrusions at an equal distance to allow the raw water to equally flow in a circumferential direction of the fourth upper cap member.

In the water purifier provided with the composite filter according to another embodiment of the present invention, it is possible to enhance product reliability by controlling a valve unit through a control unit to control flows of raw water, purified water, and residential water and effectively preventing these fluids from flowing back.

In a water purifier provided with a composite filter according to still another aspect of the present invention, it is possible to enable the implementation of an additional function using an external treatment member in a process in which raw water passes through the composite filter as the water purifier can not only receive the raw water, discharge first purified water, receive externally treated water, and discharge third purified water, but also discharge residential water, improve a user's convenience by constituting the composite filter by integrating a spiral wound type internal filter member, and enhancing a degree of freedom in layout design of other portions by providing first to fourth partition walls in a head member of a housing unit so that independent flow paths for preventing the raw water, the first purified water, the externally treated water, the third purified water, and the residential water from being mixed are formed to concentrate tubes through which the raw water, the first purified water, the externally treated water, the third purified water, and the residential water flow on an upper portion of the composite filter, and enhance productivity by manufacturing the composite filter using a previously manufactured spiral wound type internal filter member by arranging a pre-treatment internal filter member and a post-treatment internal filter member to be stacked through a first upper cap member and a second upper cap member in a filtering unit and arranging a spiral wound type internal filter member inside the internal filter members in a radial direction.

In the water purifier provided with the composite filter according to still another embodiment of the present invention, it is possible to enhance the operational stability of the water purifier by providing a connecting tube in a second lower cap member for fixing a post-treatment internal filter member and a spiral wound type internal filter member and forming the connecting tube to extend in an axial direction inside a pre-treatment internal filter member and the post-treatment internal filter member to prevent first purified water passing through the pre-treatment internal filter member and third purified water passing through the post-treatment internal filter member from being mixed with received externally treated water.

In the water purifier provided with the composite filter according to still another embodiment of the present invention, it is possible to enhance the operational stability of the water purifier as first purified water is stably discharged by arranging a third upper cap member under a first upper cap member and arranging the third upper cap member to be spaced apart from the first upper cap member so that a first purified water flow path through which the first purified water flows is formed.

In the water purifier provided with the composite filter according to still another embodiment of the present invention, it is possible to enhance the structural stability of the composite filter by supporting an upper surface of a third upper cap member by a first spacer formed to extend downward from a lower surface of a first upper cap member to stably maintain a separation distance between the first upper cap member and the third upper cap member.

In the water purifier provided with the composite filter according to still another embodiment of the present invention, it is possible to enhance the operational stability of the water purifier by forming a first purified water flow path to extend while a first upward guide and a third upward guide are disposed to be spaced apart from each other so that first purified water is discharged smoothly.

In the water purifier provided with the composite filter according to still another embodiment of the present invention, it is possible to enhance user satisfaction through the improvement in water quality of finally discharged third purified water by arranging a first partition wall to extend in an axial direction along a first upward guide to effectively prevent discharged first purified water from being mixed with received raw water.

In the water purifier provided with the composite filter according to still another embodiment of the present invention, it is possible to enhance user satisfaction through the prevention of a degradation in water quality of externally treated water and the improvement in water quality of finally discharged third purified water by arranging a second partition wall to extend in an axial direction along a third upward guide to effectively prevent discharged first purified water from being mixed with received externally treated water.

In the water purifier provided with the composite filter according to still another embodiment of the present invention, it is possible to enhance user satisfaction through the prevention of a degradation in water quality of externally treated water and the improvement in water quality of finally discharged third purified water by coupling a third downward support guide formed to extend downward from a third upper cap member to a connecting tube to effectively prevent discharged first purified water from being mixed with the received externally purified water.

In the water purifier provided with the composite filter according to still another embodiment of the present invention, it is possible to enhance the operational stability of the water purifier as externally treated water stably flows by arranging a fourth upper cap member under a third upper cap member and arranging the fourth upper cap member to be spaced apart from the third upper cap member so that an externally treated water flow path through which the externally treated water flows is formed.

In the water purifier provided with the composite filter according to still another embodiment of the present invention, it is possible to enhance the structural stability of the composite filter by supporting an upper surface of a fourth upper cap member by a second spacer formed to extend downward from a lower surface of a third upper cap member to stably maintain a separation distance between the third upper cap member and the fourth upper cap member.

In the water purifier provided with the composite filter according to still another embodiment of the present invention, it is possible to enhance the operational stability of the water purifier by arranging a fourth upward guide and a third upward guide to be spaced apart from each other to form an externally treated water flow path to smoothly discharge received externally treated water.

In the water purifier provided with the composite filter according to still another embodiment of the present invention, it is possible to enhance user satisfaction through the prevention of a degradation in water quality of externally treated water and the improvement in water quality of finally discharged third purified water by arranging a third partition wall to extend in an axial direction along a fourth upward guide to effectively prevent the received externally treated water from being mixed with discharged residential water.

In the water purifier provided with the composite filter according to still another embodiment of the present invention, it is possible to enhance the structural stability of the composite filter by supporting a spiral wound type internal filter member by a fourth downward support guide.

In the water purifier provided with the composite filter according to still another embodiment of the present invention, it is possible to improve the structural stability by allowing second purified water to flow into a central tube through a second purified water through hole in a state in which a spiral wound type internal filter member is supported to be spirally wound around the central tube, and enhance the operational stability of the water purifier by arranging the central tube to pass through a second lower cap member to allow the second purified water to stably flow to a lower portion of a second lower cap member.

In the water purifier provided with the composite filter according to still another embodiment of the present invention, it is possible to enhance operational stability of the water purifier by stably maintaining a separation state between a second lower cap member and a lower surface of a housing unit by allowing a second downward guide to support the lower surface of the housing unit and allowing the second purified water flowing to a lower portion of the second lower cap member to smoothly flow through a third through hole formed in the second downward guide.

In the water purifier provided with the composite filter according to still another embodiment of the present invention, it is possible to improve workability by fixing a pre-treatment internal filter member by a method of arranging a first upper cap member and a first lower cap member above and under the pre-treatment internal filter member, respectively to enable the modularization of the composite filter through a sub assembly process, and enhance the operational stability of the water purifier by forming a third spacer supported by an upper surface of a second upper cap member to extend downward from a lower surface of the first lower cap member to allow third purified water to smoothly flow while a distance between the first lower cap member and the second upper cap member is maintained.

In the water purifier provided with the composite filter according to still another embodiment of the present invention, it is possible to enhance the operational stability of the water purifier as raw water stably flows by arranging a fifth upper cap member above a first upper cap member and arranging the fifth upper cap member to be spaced apart from the first upper cap member so that a raw water flow path through which the raw water flows is formed.

In the water purifier provided with the composite filter according to still another embodiment of the present invention, it is possible to enhance the operational stability of the water purifier by arranging a fifth upward guide to be spaced apart from a first upward guide to form a raw water flow path to allow received raw water to flow smoothly.

In the water purifier provided with the composite filter according to still another embodiment of the present invention, it is possible to enhance user satisfaction through the prevention in a degradation in water quality of externally treated water and the improvement in water quality of finally discharged third purified water by arranging a fourth partition wall to extend in an axial direction along a fifth upward guide to effectively prevent the received externally treated water from being mixed with discharged residential water.

In the water purifier provided with the composite filter according to still another embodiment of the present invention, it is possible to enhance the operational stability of the water purifier by arranging a fifth downward support guide to extend from a first upper cap member to a first lower cap member to prevent received raw water from being mixed with discharged third purified water.

In the water purifier provided with the composite filter according to still another embodiment of the present invention, it is possible to enhance product reliability by controlling a valve unit through a control unit to control flows of raw water, first purified water, externally treated water, third purified water, and residential water and effectively preventing these fluids from flowing back.

Although embodiments of the present invention have been described above, the spirit of the present invention is not limited to the embodiments presented in the specification, and those skilled in the art who understand the spirit of the present invention can easily propose other embodiments by the addition, change, deletion, or the like of the component within the scope of the same spirit, but this will also be included in the scope of the spirit of the present invention.

What is claimed is:

1. A water purifier provided with a composite filter, comprising:

a housing unit including a raw water receiving port through which raw water is received, a second purified water discharging port through which filtered second purified water is discharged, an externally treated water receiving port through which externally treated water generated while treating the second purified water externally is received, a third purified water discharging port through which filtered third purified water is discharged, and a residential water discharging port through which residential water generated in a filtering process is discharged; and a filtering unit including a pre-treatment internal filter member disposed inside the housing unit to filter the raw water and generate first purified water, a spiral wound type internal filter member disposed inside the housing unit to filter the first purified water and generate the second purified water, an external treatment member disposed outside the housing unit to treat the second purified water and generate the externally treated water, and a post-treatment internal filter member disposed inside the housing unit to filter the received externally treated water and generate the third purified water, wherein the housing unit includes a head member including a first partition wall for preventing the raw water from being mixed with the externally treated water, a second partition wall for preventing the raw water from being mixed with the residential water, a third partition wall for preventing the second purified water from being mixed with the residential water, and a fourth partition wall for preventing the second purified water from being mixed with the third purified water, and a body member which extends from the head member and in which the filtering unit is disposed, the filtering unit includes a first module in which the pre-treatment internal filter member and the spiral wound type internal filter member are provided sequentially, and a second module disposed to be stacked under the first module and provided with the post-treatment internal filter member, and the second module includes a discharge tube member disposed to pass through a central portion of the first module so that the third purified water is discharged to the outside.

2. The water purifier of claim 1, wherein the first module includes a central tube which supports the spiral wound type internal filter member to be wound spirally and in which a second purified water through hole is formed so that the second purified water flows therein, and the discharge tube member is disposed to pass through a central portion of the central tube and disposed to be spaced a predetermined distance from the central tube so that a second purified water flow path through which the second purified water flows is formed between the central tube and the discharge tube member.

3. The water purifier of claim 2, wherein the fourth partition wall is disposed to extend in an axial direction along the discharge tube member.

4. The water purifier of claim 2, wherein the third partition wall is disposed to extend in an axial direction along the central tube.

5. The water purifier of claim 2, wherein the first module includes a first upper cap member outside which the pre-treatment internal filter member is disposed in a radial direction and inside which the spiral wound type internal filter member is disposed in the radial direction, and the first upper cap member includes a first upward guide disposed to be spaced a predetermined distance from the central tube so that a residential water flow path through which the discharged residential water flows is formed.

6. The water purifier of claim 5, wherein the second partition wall is disposed to extend in an axial direction along the first upward guide.

7. The water purifier of claim 5, wherein the first module further includes a first lower cap member on which the pre-treatment internal filter member is disposed fixedly.

8. A water purifier provided with a composite filter, comprising:

a housing unit including a raw water receiving port through which raw water is received, a first purified water discharging port through which filtered first purified water is discharged, a second purified water receiving port through which externally filtered second purified water is received, a third purified water discharging port through which filtered third purified water is discharged, and a residential water discharging port through which residential water generated in a filtering process is discharged; and a filtering unit including a spiral wound type internal filter member disposed inside the housing unit to filter the raw water and generate the first purified water, an external filter member disposed outside the housing unit to filter the first purified water and generate the second purified water, and a post-treatment internal filter member disposed inside the housing unit to filter the second purified water and generate the third purified water, wherein the housing unit includes a head member including a first partition wall for preventing the raw water from being mixed with the second purified water, a second partition wall for preventing the second purified water from being mixed with the third purified water, a third partition wall for preventing the third purified water from being mixed with the residential water, and a fourth partition wall for preventing the residential water from being mixed with the first purified water, and a body member which extends from the head member and in which the filtering unit is disposed, the filtering unit includes a first upper cap member under which the spiral wound type internal filter member is fixedly disposed, and a second upper cap member disposed to be spaced a predetermined distance from an upper surface of the first upper cap member so that a residential water flow path through which the residential water discharged from the spiral wound type internal filter member flows is provided, and the first upper cap member includes a first through hole allowing an inside of the spiral wound type internal filter member to communicate with the residential water flow path so that the residential water discharged from the spiral wound type internal filter member disposed under the first upper cap member flows through the residential water flow path.

9. The water purifier of claim 8, wherein the first upper cap member includes a first upward guide extending upward so that the first purified water flows, the second upper cap member includes a second upward guide extending upward so that the residential water flows, and the first upward guide and the second upward guide are disposed to be spaced a predetermined distance from each other so that the residential water flow path is formed to extend.

10. The water purifier of claim 8, wherein the first upper cap member includes a first downward guide extending downward so that the spiral wound type internal filter member is disposed fixedly.

11. The water purifier of claim 8, wherein the filtering unit includes a third upper cap member disposed to be stacked to allow the post-treatment internal filter member to be fixed in a state of being disposed on the second upper cap member, and a fourth upper cap member disposed to be spaced a predetermined distance from an upper surface of the third upper cap member so that a second purified water flow path through which the externally received second purified water flows is provided.

12. The water purifier of claim 8, wherein a raw water flow path through which the raw water flows is provided between an inner circumferential surface of the body member and an outer circumferential surface of the spiral wound type internal filter member, and the spiral wound type internal filter member is disposed to be spaced apart from a lower surface of the body member so that the raw water flow path is formed to extend inward in a radial direction to a lower portion of the spiral wound type internal filter member.

13. The water purifier of claim 12, wherein a central tube which supports the spiral wound type internal filter member to be wound spirally and in which a second through hole is formed so that the first purified water flows through a first purified water flow path formed inside the spiral wound type internal filter member is provided on an inner circumferential surface of the spiral wound type internal filter member.

14. A water purifier provided with a composite filter, comprising:

a housing unit including a raw water receiving port through which raw water is received, a first purified water discharging port through which filtered first purified water is discharged, an externally treated water receiving port through which externally treated water generated while treating the first purified water externally is received, a third purified water discharging port through which filtered third purified water is discharged, and a residential water discharging port through which residential water generated in a filtering process is discharged; and a filtering unit including a pre-treatment internal filter member disposed inside the housing unit to filter the raw water and generate the first purified water, an external treatment member disposed outside the housing unit to filter the first purified water and generate the externally treated water, a spiral wound type internal filter member disposed inside the housing unit to filter the externally treated water and generate the second purified water, and a post-treatment internal filter member disposed inside the housing unit to filter the second purified water and generate the third purified water and disposed to be stacked under the pre-treatment internal filter member, wherein the housing unit includes a head member including a first partition wall for preventing the raw water from being mixed with the first purified water, a second partition wall for preventing the first purified water from being mixed with the externally treated water, a third partition wall for preventing the externally treated water from being mixed with the residential water, and a fourth partition wall for preventing the third purified water from being mixed with the raw water, and a body member which extends from the head member and in which the filtering unit is disposed, and the filtering unit includes a first upper cap member under which the pre-treatment internal filter member disposed outward in a radial direction and the spiral wound type internal filter member disposed inward in the radial direction are disposed, and a second upper cap member under which the post-treatment internal filter member disposed outward in the radial direction is disposed and through which the spiral wound type internal filter member disposed inward in the radial direction is disposed to pass.

15. The water purifier of claim 14, wherein the filtering unit further includes a second lower cap member on which the post-treatment internal filter member and the spiral wound type internal filter member are fixedly disposed, and the second lower cap member includes a connecting tube disposed outside the spiral wound type internal filter member in the radial direction to prevent the first purified water and the third purified water from being mixed with the externally treated water.

16. The water purifier of claim 15, wherein the filtering unit further includes a third upper cap member disposed to be stacked under the first upper cap member and disposed to be spaced apart from the first upper cap member so that the first purified water is discharged to the outside through a first purified water flow path.

17. The water purifier of claim 16, wherein a first spacer extending downward to support an upper surface of the third upper cap member is provided on a lower surface of the first upper cap member.

18. The water purifier of claim 16, wherein the first upper cap member includes a first upward guide extending upward, the third upper cap member includes a third upward guide extending upward, and the first upward guide and the third upward guide are disposed to be spaced from each other so that the first purified water flow path is formed.

19. The water purifier of claim 16, wherein the third upper cap member includes a third downward support guide disposed to extend downward to be coupled to the connecting tube to prevent the first purified water from being mixed with the externally treated water.

20. The water purifier of claim 16, wherein the filtering unit further includes a central tube which supports the spiral wound type internal filter member to be wound spirally and in which a second purified water through hole is formed so that the second purified water flows therein, and the second lower cap member includes a second through hole through which the central tube is disposed to pass so that the second purified water flowing through the central tube flows downward.

* * * * *